US010708126B2

(12) United States Patent
Singla et al.

(10) Patent No.: US 10,708,126 B2
(45) Date of Patent: Jul. 7, 2020

(54) CLOUD-BASED CONTROL OF A WI-FI NETWORK

(71) Applicant: Plume Design, Inc., Palo Alto, CA (US)

(72) Inventors: Aman Singla, Saratoga, CA (US); Paul White, Burlingame, CA (US); Adam Hotchkiss, Burlingame, CA (US); Balaji Rengarajan, Campbell, CA (US); William McFarland, Portola Valley, CA (US); Sameer Vaidya, Saratoga, CA (US); Evan Jeng, Los Altos Hills, CA (US); Murugesan Guruswamy, San Jose, CA (US)

(73) Assignee: Plume Design, Inc., Palo Alto, CA (US)

(*) Notice: Subject to any disclaimer, the term of this patent is extended or adjusted under 35 U.S.C. 154(b) by 261 days.

(21) Appl. No.: 15/463,321

(22) Filed: Mar. 20, 2017

(65) Prior Publication Data

US 2017/0272317 A1 Sep. 21, 2017

Related U.S. Application Data

(60) Provisional application No. 62/310,589, filed on Mar. 18, 2016, provisional application No. 62/310,594, (Continued)

(51) Int. Cl.
| | |
|---|---|
| *H04L 12/24* | (2006.01) |
| *H04W 12/06* | (2009.01) |
| *H04L 29/08* | (2006.01) |
| *H04W 24/08* | (2009.01) |
| *H04W 84/12* | (2009.01) |

(52) U.S. Cl.
CPC .......... *H04L 41/0806* (2013.01); *H04L 41/12* (2013.01); *H04L 67/02* (2013.01); *H04W 12/06* (2013.01); *H04W 24/08* (2013.01); *H04W 84/12* (2013.01)

(58) Field of Classification Search
CPC ..... H04L 41/0806; H04L 67/02; H04L 41/12; H04W 12/06; H04W 24/08; H04W 84/12
See application file for complete search history.

(56) References Cited

U.S. PATENT DOCUMENTS

| | | |
|---|---|---|
| 7,315,533 B2 | 1/2008 | Theobold et al. |
| 7,414,978 B2 | 8/2008 | Lun et al. |

(Continued)

OTHER PUBLICATIONS

Netgear genie Apps. Aug. 2012. (Year: 2012).*
Jun. 26, 2017 International Search Report for International Application PCT/US2017/023130.

*Primary Examiner* — Scott B Christensen
(74) *Attorney, Agent, or Firm* — Clements Bernard Walker; Lawrence A. Baratta, Jr.

(57) ABSTRACT

Systems and methods implemented by a cloud-based controller to control a Wi-Fi network with a plurality of access points include obtaining measurements from the Wi-Fi network; determining a configuration of the Wi-Fi network based on the measurements, wherein the configuration comprises a topology of the Wi-Fi network and the topology comprises the plurality of access points selectively interconnected to one another via backhaul links; and providing the configuration to the Wi-Fi network for implementation thereof.

20 Claims, 39 Drawing Sheets

Related U.S. Application Data filed on Mar. 18, 2016, provisional application No. 62/310,596, filed on Mar. 18, 2016, provisional application No. 62/310,598, filed on Mar. 18, 2016, provisional application No. 62/310,599, filed on Mar. 18, 2016, provisional application No. 62/310,603, filed on Mar. 18, 2016, provisional application No. 62/310,605, filed on Mar. 18, 2016, provisional application No. 62/310,609, filed on Mar. 18, 2016, provisional application No. 62/310,613, filed on Mar. 18, 2016, provisional application No. 62/310,617, filed on Mar. 18, 2016.

(56) References Cited

U.S. PATENT DOCUMENTS

| | | |
|---|---|---|
| 7,953,403 B2 | 5/2011 | Nientiedt |
| 8,798,021 B2 | 8/2014 | Mangalvedhe et al. |
| 9,060,279 B2 | 6/2015 | Ganu et al. |
| 9,066,251 B2 | 6/2015 | Madan et al. |
| 9,131,391 B2 | 9/2015 | Madan et al. |
| 9,131,392 B2 | 9/2015 | Madan et al. |
| 9,420,528 B2 | 8/2016 | Madan et al. |
| 9,497,700 B2 | 11/2016 | Madan et al. |
| 9,510,214 B1 | 11/2016 | Balasubramaniam et al. |
| 9,516,579 B1 | 12/2016 | Diner et al. |
| 10,057,813 B1 * | 8/2018 | Likar .................... H04W 28/18 |
| 2006/0258395 A1 | 11/2006 | Cave et al. |
| 2007/0149172 A1 | 6/2007 | Dickinson |
| 2007/0206537 A1 * | 9/2007 | Cam-Winget ........ H04L 63/162 370/331 |
| 2007/0242621 A1 | 10/2007 | Nandagopalan et al. |
| 2009/0257380 A1 | 10/2009 | Meier |
| 2009/0279427 A1 | 11/2009 | Ji et al. |
| 2009/0316585 A1 | 12/2009 | Srinivasan |
| 2009/0323632 A1 | 12/2009 | Nix |
| 2010/0029282 A1 | 2/2010 | Stamoulis et al. |
| 2010/0232317 A1 * | 9/2010 | Jing .................... H04L 12/2807 370/254 |
| 2011/0039554 A1 | 2/2011 | Bims |
| 2011/0119370 A1 | 5/2011 | Huang et al. |
| 2011/0151886 A1 | 6/2011 | Grayson et al. |
| 2012/0002567 A1 | 1/2012 | Sun et al. |
| 2012/0087268 A1 | 4/2012 | Savoor et al. |
| 2012/0122503 A1 | 5/2012 | Ma et al. |
| 2012/0257585 A1 | 10/2012 | Sydor et al. |
| 2013/0201857 A1 | 8/2013 | Bhargava et al. |
| 2013/0272285 A1 | 10/2013 | Goldsmith et al. |
| 2014/0092765 A1 | 4/2014 | Agarwal et al. |
| 2014/0126410 A1 | 5/2014 | Agarwal et al. |
| 2014/0321325 A1 | 10/2014 | Jing et al. |
| 2014/0328190 A1 | 11/2014 | Lord et al. |
| 2015/0023183 A1 * | 1/2015 | Ilsar ...................... H04W 48/16 370/244 |
| 2015/0215832 A1 * | 7/2015 | Fitzpatrick ............ H04W 48/18 455/426.1 |
| 2015/0341797 A1 | 11/2015 | Madan et al. |
| 2016/0080949 A1 | 3/2016 | Chandrasekhar et al. |
| 2018/0254955 A1 * | 9/2018 | Ranjan .................... H04L 41/12 |

* cited by examiner

GATEWAY NODE CONNECTION TO CLOUD SERVICE
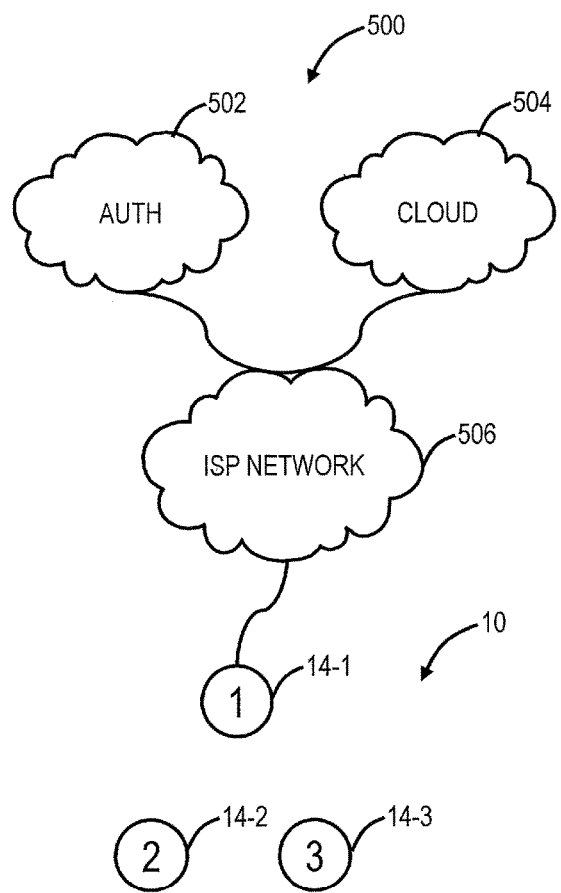
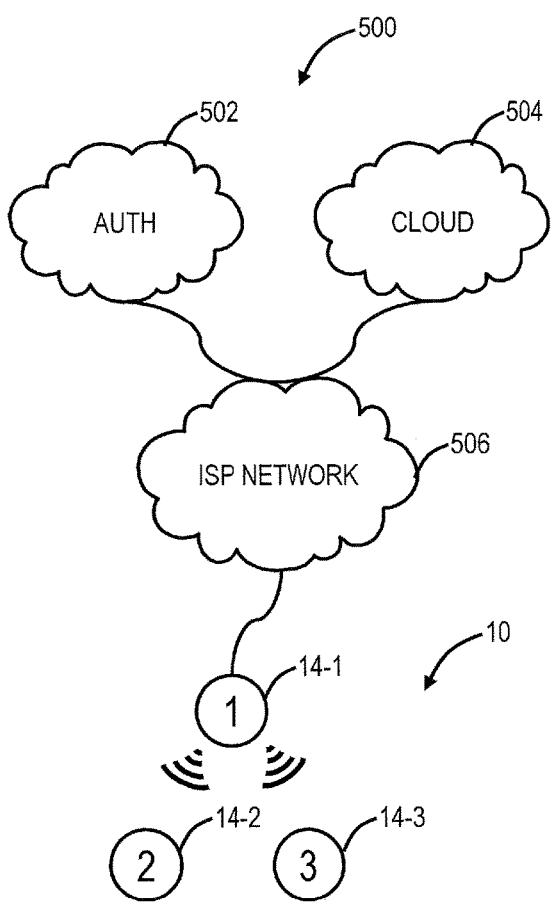
*FIG. 10A*     *FIG. 10B*

NODE ONBOARDS TO THE DISTRIBUTED WI-FI SYSTEM
AND STARTS PROVISIONING WI-FI SERVICE
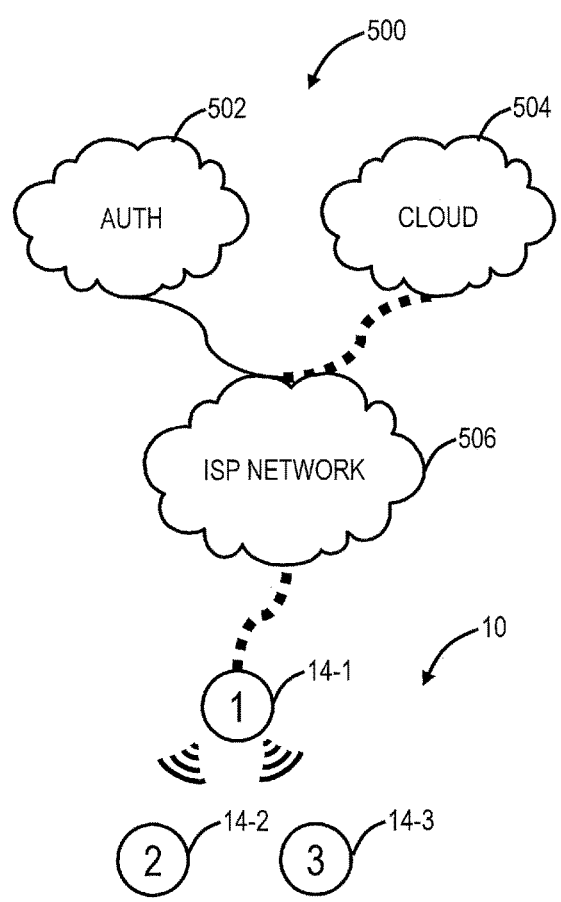
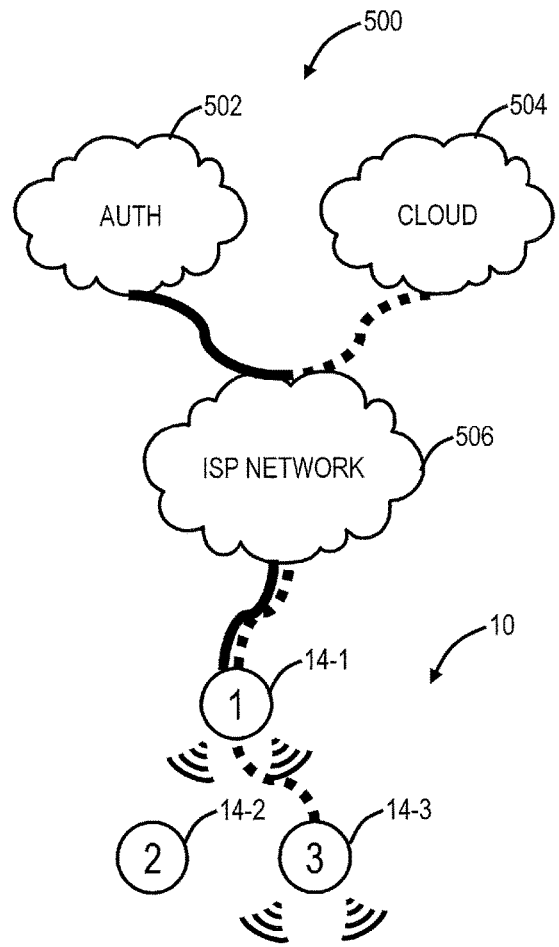
*FIG. 11A*  *FIG. 11B*

Spread Remaining Pods
To ensure the best performance, plug the remaining Pods in each of your rooms and connecting spaces like hallways.
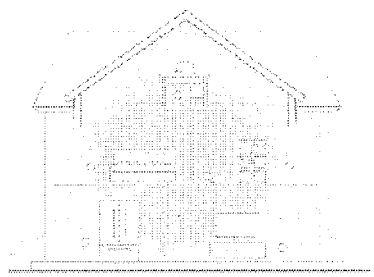
Looking for 2 remaining Pods...
FIG. 18
Adding New Pods
Continue plugging in all Pods you want to add.
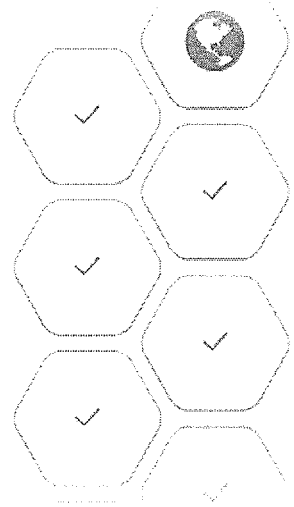
Looking for Pods...
FIG. 19

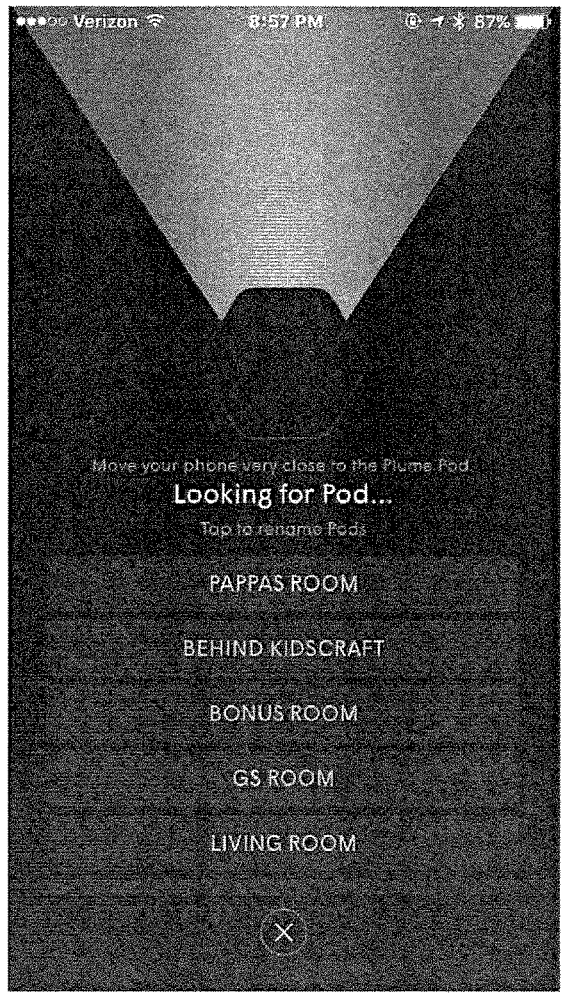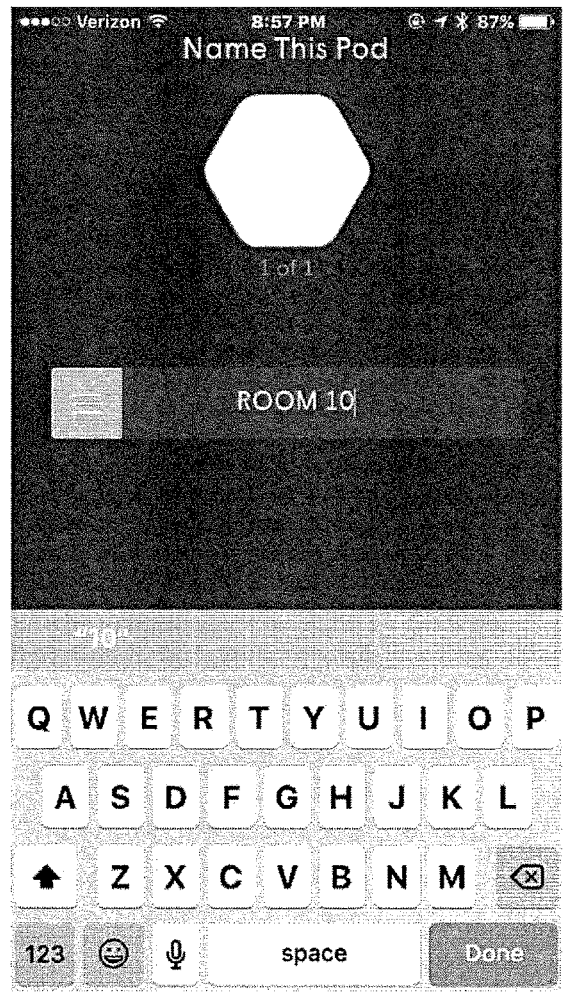
*FIG. 20*  *FIG. 21*

CLOUD-BASED CONTROL OF A WI-FI NETWORK

CROSS-REFERENCE TO RELATED APPLICATION(S)

The present patent/application claims priority to the followings U.S. Provisional Patent Applications all filed on Mar. 18, 2016, each of which is incorporated by reference:

| Ser. No. | Title |
|---|---|
| 62/310,589 | DATA GATHERING TO ENABLE THE OPTIMIZATION OF DISTRIBUTED WI-FI NETWORKS |
| 62/310,594 | DISTRIBUTED WI-FI SETUP |
| 62/310,596 | OPTIMIZATION OF DISTRIBUTED WI-FI NETWORKS |
| 62/310,598 | CLAIMING NETWORKING DEVICES FOR A HOME NETWORK |
| 62/310,599 | L2 NETWORK TUNNELS FOR WI-FI CLIENT BRIDGING |
| 62/310,603 | METHODS FOR CHANGING TOPOLOGY AND FIRMWARE IN DISTRIBUTED WI-FI NETWORKS |
| 62/310,605 | OPTIMIZATION ON MULTIPLE TIMESCALES IN A DISTRIBUTED WI-FI SYSTEM |
| 62/310,609 | CONTROLLING CLIENTS IN DISTRIBUTED WI-FI NETWORKS |
| 62/310,613 | OPTIMIZATION OF DISTRIBUTED WI-FI NETWORKS ESTIMATION AND LEARNING |
| 62/310,617 | DISTRIBUTED WI-FI NETWORK VISUALIZATION AND TROUBLESHOOTING |

FIELD OF THE DISCLOSURE

The present disclosure generally relates to wireless networking systems and methods. More particularly, the present disclosure relates to data gathering to enable the optimization of distributed Wi-Fi networks.

BACKGROUND OF THE DISCLOSURE

Wi-Fi networks (i.e., Wireless Local Area Networks (WLAN) based on the IEEE 802.11 standards) have become ubiquitous. People use them in their homes, at work, and in public spaces such as schools, cafes, even parks. Wi-Fi provides great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. In fact, Wi-Fi has become the primary connection between user devices and the Internet in the home or other locations. The vast majority of connected devices use Wi-Fi for their primary network connectivity.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems. The first approach is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location. This approach is a fundamentally better approach to achieving better coverage. By placing even a single repeater node in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters. A fully interconnected mesh adds the ability for all the repeaters to be able to communicate with each other, opening the possibility of packets being delivered via multiple hops following an arbitrary pathway through the network.

State of the art mesh or repeaters systems still have many limitations. Because the systems depend on localized control, they configure themselves to use the same frequency for all the backhaul communication between the repeaters or mesh nodes. This creates a severe system capacity problem.

Consider a system that requires three hops through the network to get its packet to the destination. Since all three hops are on the same frequency channel, and because only one Wi-Fi radio can transmit at a time on a given channel among devices that are in range (where range is determined by the long range of the lowest supported data rate), only one hop can be active at a time. Therefore, for this example, delivering a packet via three hops would consume three times the airtime on the one channel as delivering the packet directly. In the first hop, when the packet is moving from the Wi-Fi gateway to the first mesh node, all the other links in the house would need to stay silent. Similarly, as the packet is later sent from the first mesh node to a second mesh node, no other Wi-Fi devices in the home could transmit. Finally, the same would be true as the packet is moved from the second mesh node to the final destination. In all, the use of three hop repeating has reduced the network capacity by a factor of three. And, as with the case of a single access point, the repeater or mesh approach does nothing to help with the problems of interference or congestion. As before, the technique actually increases interference, as a single packet transmission becomes three separate transmissions, taking a total of 3x the airtime, generating 3x the interference to neighboring Wi-Fi networks.

BRIEF SUMMARY OF THE DISCLOSURE

In an exemplary embodiment, a method for gathering data by an access point in a Wi-Fi system for optimization includes periodically or based on command from a cloud-based system performing one or more of i) obtaining on-channel scanning data while operating on a home channel and ii) switching off the home channel and obtaining off-channel scanning data for one or more off-channels; and providing measurement data based on one or more of the on-channel scanning data and the off-channel scanning data to the cloud-based system for use in the optimization of the Wi-Fi system, wherein the measurement data includes one or more of raw data and processed data. When the measurement data is the processed data, the method can further include determining a division of time that the home channel is divided based on a combination of direct measurements and computations based on the direct measurements. When measurement data is the processed data, the method can further include determining delays of packets over the Wi-Fi system through one of direct measurements and statistics of delay at the access point. The measurement data can include a plurality of Received Signal Strength Indicators (RSSI), achievable data rates, capacity, load, error rates, delays, interference, and fractions of time spent transmitting and receiving.

BRIEF DESCRIPTION OF THE DRAWINGS

The present disclosure is illustrated and described herein with reference to the various drawings, in which like reference numbers are used to denote like system components/method steps, as appropriate, and in which:

FIG. 10A is a network diagram of a network where the distributed Wi-Fi system of FIG. 1 is initially connected to external services;

FIG. 10B is a network diagram of the network of FIG. 10A where a gateway access point is configured by the external services;

FIG. 11A is a network diagram of the network of FIGS. 10A and 10B where the gateway access point onboards other access points and starts provisioning Wi-Fi service;

FIG. 11B is a network diagram of the network of FIGS. 10A, 10B, and 11A where another access point onboards other access points and starts provisioning Wi-Fi service;

FIG. 18 is a screenshot of the mobile app looking for access points ("pods");

FIG. 19 is a screenshot of the mobile app having found access points;

FIG. 20 is a screenshot of the mobile app looking for an access point for purposes of uniquely identifying the access point;

FIG. 21 is a screenshot of the mobile app uniquely naming the access point;

DETAILED DESCRIPTION OF THE DISCLOSURE

Figure 1:
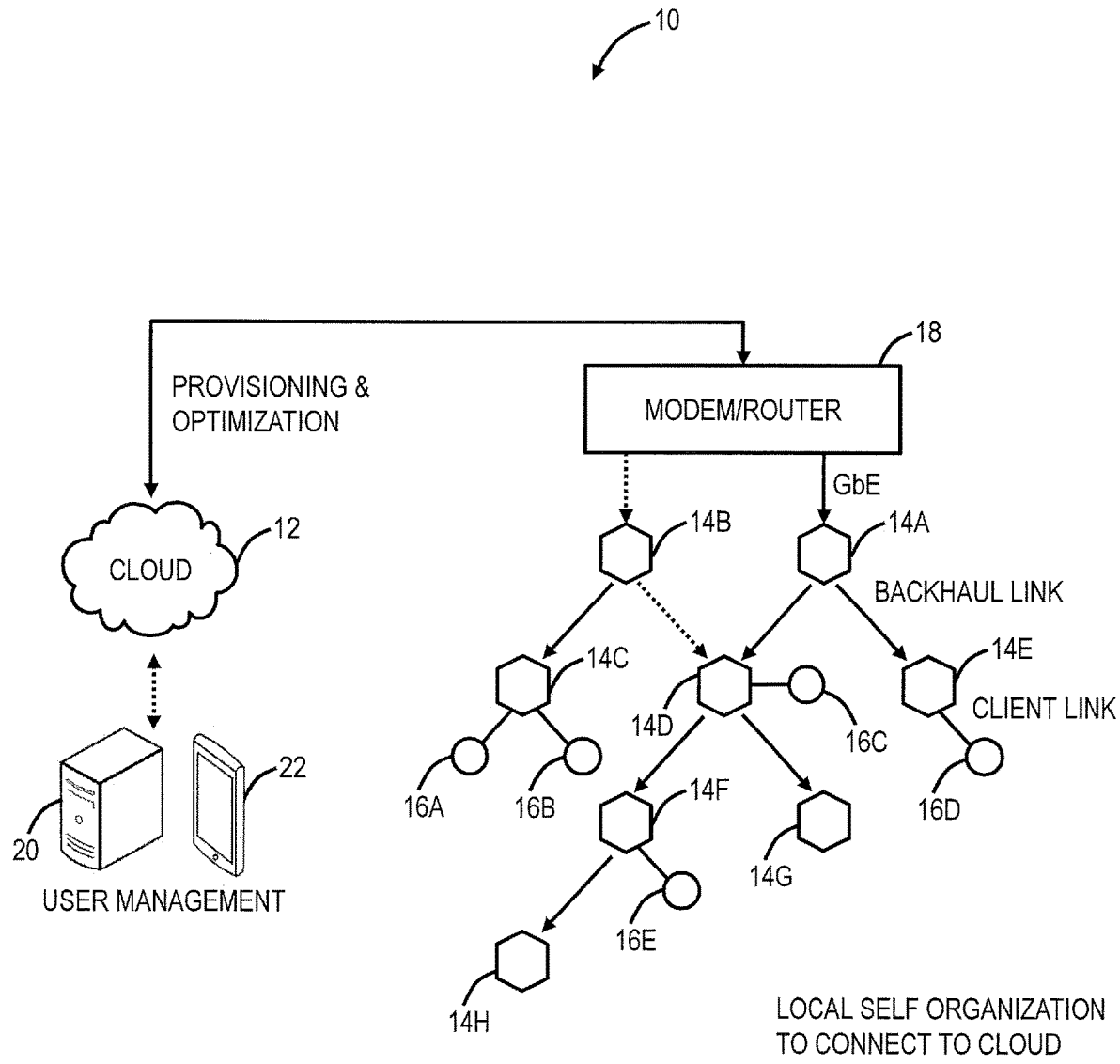
FIG. 1 is a network diagram of a distributed Wi-Fi system with cloud-based control.

Again, in various exemplary embodiments, the present disclosure relates to data gathering systems and methods to enable the optimization of distributed Wi-Fi networks. It is an objective of the systems and methods to provide a Wi-Fi network with superior performance relative to Wi-Fi networks with a single AP, with repeaters, or with multiple mesh nodes. The systems and methods include a distributed Wi-Fi system with a plurality of access points (nodes) which are self-optimizing based on cloud-based control. This self-optimization adapts the topology and configuration of the plurality of access points in real-time based on the operating environment. The plurality of access points communicate with one another via backhaul links and to Wi-Fi client devices via client links, and the each of the backhaul links and each of the client links may use different channels based on the optimization, thereby avoiding the aforementioned limitations in Wi-Fi mesh or repeater systems. In an exemplary aspect, the distributed Wi-Fi system includes a relatively large number of access points (relative to conventional deployments including Wi-Fi mesh or repeater systems). For example, the large number of access points can be 6 to 12 or more in a typical residence. With a large number of access points, the distance between any two access points is small, on a similar scale as the distance between an access point and Wi-Fi client device. Accordingly, signal strength is maintained avoiding coverage issues, and with the optimization of the topology and configuration, congestion and interference are minimized. Thus, the distributed Wi-Fi system addresses all three of the aforementioned limitations in conventional Wi-Fi systems.

The distributed Wi-Fi setup systems and methods describe various approaches for how access points, i.e., nodes in the distributed Wi-Fi system, are initiated into the network. That is, the distributed Wi-Fi setup systems and methods describe how nodes initially communicate to the cloud. The distributed Wi-Fi setup systems and methods describe an onboarding process for nodes in the distributed Wi-Fi system. The distributed Wi-Fi setup systems and methods address the problem of establishing secure and reliable connections between nodes in a distributed Wi-Fi solution controlled from the cloud by an external provisioning application. It is applicable in several scenarios. It can be used for the initial process of establishing the distributed Wi-Fi system. It can be used when a new node is added into an existing network. It can be used when changing the topology of the network, as the connections between nodes are reorganized. It also can be used to re-establish the network if the network is disrupted by a power outage or other event.

The distributed Wi-Fi setup systems and methods describe various approaches for how access points, i.e., nodes in the distributed Wi-Fi system, are discovered, claimed, and segmented in the distributed Wi-Fi system. Specifically, the systems and methods utilize a mobile device, user device, Wi-Fi client device, etc. (collectively referred to as a mobile device) to discover and claim each node (access point) in the distributed Wi-Fi system and to communicate to a cloud service which acts as a cloud controller for the distributed Wi-Fi system. The mobile device can communicate to the node using local or personal wireless area networks, such as Bluetooth and to the cloud controller using a separate network such as Long Term Evolution (LTE).

The optimization systems and methods receive inputs from the distributed Wi-Fi system, perform optimization, and provide outputs including operational parameters for the distributed Wi-Fi system. The inputs can include a plurality of traffic loads required by each Wi-Fi client device, signal strength and data rate for each possible link, packet error rates on each link, strength and load of in network interferers, and strength and load of out of network interferers. The outputs can include a plurality of channel and bandwidth (BW) selection, routes and topology, Request to Send/Clear to Send (RTS/CTS) settings, Transmitter (TX) power, clear channel assessment, client association steering, band steering, QoS parameters including Enhanced Distributed Coordination Function (EDCF) priority and Arbitration Inter-Frame Spacing (AIFS), and Wi-Fi contention window settings. The optimization can be based on the inputs to maximize an objective function that can be defined in a wide variety of ways, to reflect real world performance and usage preferences. In particular, an objective function that maximizes excess capacity for a load ratio considering a load desired by each Wi-Fi client device is beneficial. The optimization objective can also include a penalty for new topologies that would be disruptive to the operation of the Wi-Fi network to implement. The outputs of the optimizer can include operational parameters for the Wi-Fi system based on the optimization.

Distributed Wi-Fi System

Referring to FIG. 1, in an exemplary embodiment, a network diagram illustrates a distributed Wi-Fi system 10 with cloud-based 12 control. The distributed Wi-Fi system 10 can operate in accordance with the IEEE 802.11 protocols and variations thereof. The distributed Wi-Fi system 10 includes a plurality of access points 14 (labeled as access points 14A-14H) which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, or any network-enabled device. For external network connectivity, one or more of the access points 14 can be connected to a modem/router 18 which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely such as through an application ("app") running on a user device 22. The running of the distributed Wi-Fi system 10, therefore, becomes what is commonly known as a "cloud service." The servers 20 are configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an exemplary aspect, the distributed Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation which relies on local configuration such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an exemplary gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
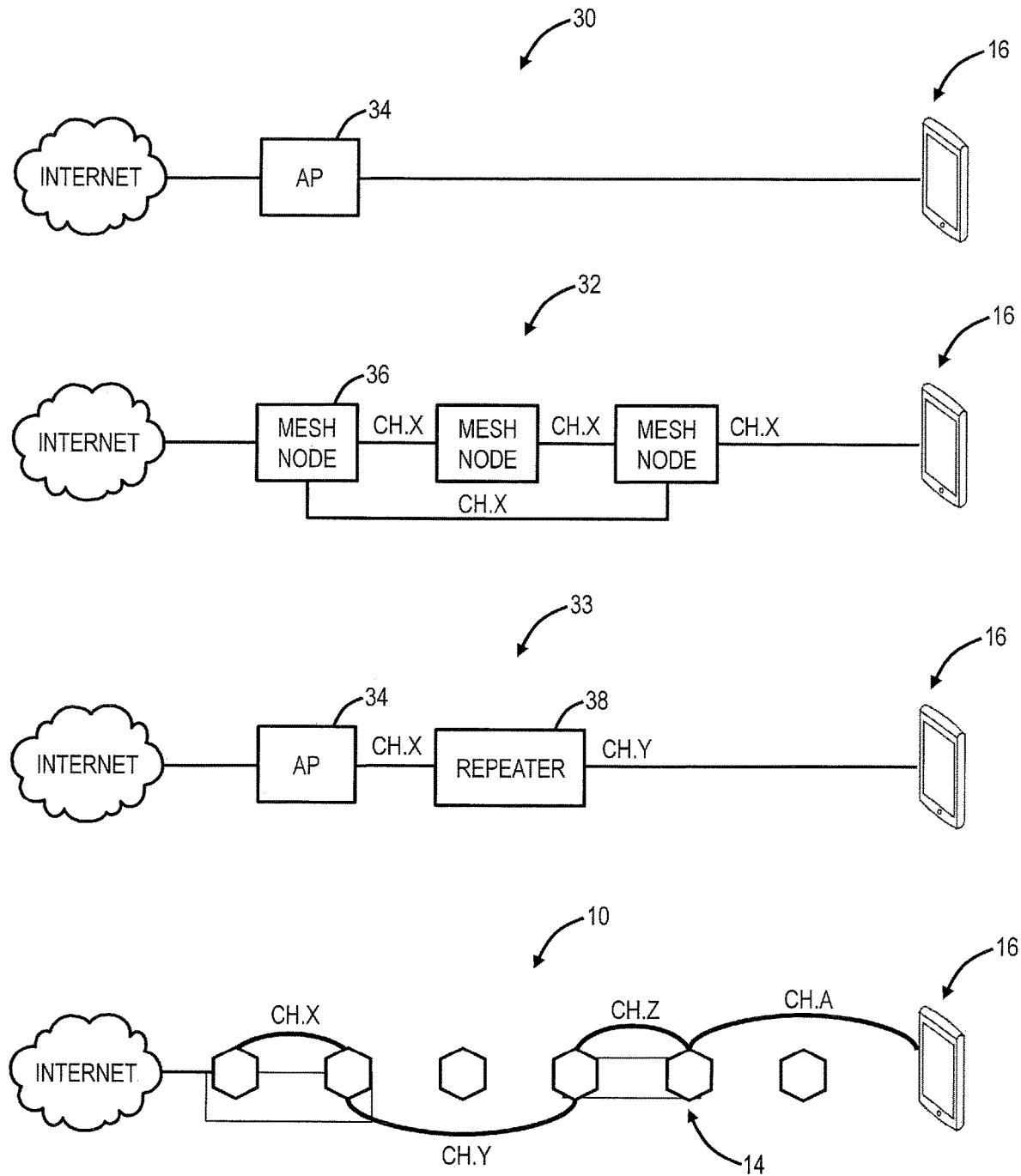
FIG. 2 is a network diagram of differences in operation of the distributed Wi-Fi system of FIG. 1 relative to a conventional single access point system, a Wi-Fi mesh network, and a Wi-Fi repeater system.

Referring to FIG. 2, in an exemplary embodiment, a network diagram illustrates differences in operation of the distributed Wi-Fi system 10 relative to a conventional single access point system 30, a Wi-Fi mesh network 32, and a Wi-Fi repeater network 33. The single access point system 30 relies on a single, high-powered access point 34 which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36 which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Chs. X, Y, Z, A), and, also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33 which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an exemplary aspect, the servers 20 in the cloud 12 are configured to optimize channel selection for the best user experience.

Configuration and Optimization Process for the Distributed Wi-Fi System

Figure 3:
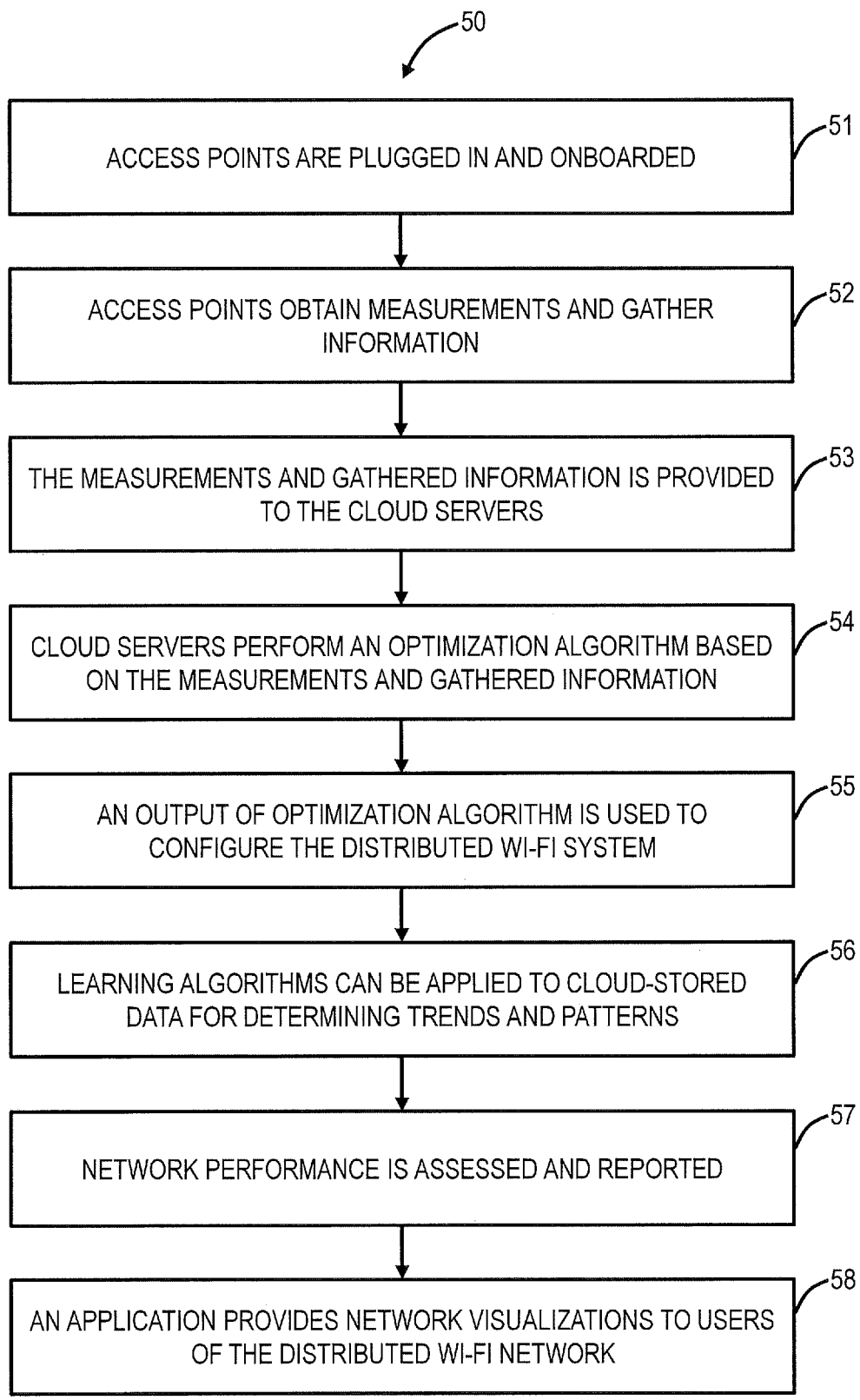
FIG. 3 is a flowchart of a configuration and optimization process for the distributed Wi-Fi system of FIG. 1.

Referring to FIG. 3, in an exemplary embodiment, a flowchart illustrates a configuration and optimization process 50 for the distributed Wi-Fi system 10. Specifically, the configuration and optimization process 50 includes various steps 51-58 to enable efficient operation of the distributed Wi-Fi system 10. These steps 51-58 may be performed in a different order and may be repeated on an ongoing basis, allowing the distributed Wi-Fi system 10 to adapt to changing conditions. First, each of the access points 14 are plugged in and onboarded (step 51). In the distributed Wi-Fi system 10, only a subset of the access points 14 are wired to the modem/router 18 (or optionally with a wireless connection to the modem/router 18), and those access points 14 without wired connectivity have to be onboarded to connect to the cloud 12. The onboarding step 51 ensures a newly installed access point 14 connects to the distributed Wi-Fi system 10 so that the access point can receive commands and provide data to the servers 20. The onboarding step 51 can include configuring the access point with the correct Service Set Identifier (SSID) (network ID) and associated security keys. In an exemplary embodiment, the onboarding step 51 is performed with Bluetooth or equivalent connectivity between the access point 14 and a user device 22 allowing a user to provide the SSID, security keys, etc. Once onboarded, the access point 14 can initiate communication over the distributed Wi-Fi system 10 to the servers 20 for configuration.

Second, the access points 14 obtain measurements and gather information to enable optimization of the networking settings (step 52). The information gathered can include signal strengths and supportable data rates between all nodes as well as between all nodes and all Wi-Fi client devices 16. Specifically, the measurement step 52 is performed by each access point 14 to gather data. Various additional measurements can be performed such as measuring an amount of interference, loads (throughputs) required by different applications operating over the distributed Wi-Fi system 10, etc. Third, the measurements and gathered information from the measurement step 52 is provided to the servers 20 in the cloud 12 (step 53). The steps 51-53 are performed on location at the distributed Wi-Fi system 10.

These measurements in steps 52, 53 could include traffic load required by each client, the data rate that can be maintained between each of the nodes and from each of the nodes to each of the clients, the packet error rates in the links between the nodes and between the nodes and the clients, and the like. In addition, the nodes make measurements of the interference levels affecting the network. This includes interference from other cloud controlled distributed Wi-Fi systems ("in-network interferers"), and interference coming from devices that are not part of the controllable network ("out-of-network interferers). It is important to make a distinction between these types of interferers. In-network interferers can be controlled by the cloud system, and therefore can be included in a large optimization over all in-network systems. Out of network interferers cannot be controlled from the cloud, and therefore their interference cannot be moved to another channel or otherwise changed. The system must adapt to them, rather than changing them. These out-of-network interferers include Wi-Fi networks that are not cloud controlled and non-Wi-Fi devices that transmit in the frequencies used by Wi-Fi such as Bluetooth devices, baby monitors, cordless phones, etc.

Another important input is the delay of packets traversing the network. These delays could be derived from direct measurements, time stamping packets as they arrive into the Wi-Fi network at the gateway, and measuring the elapsed time as they depart at the final node. However, such measurement would require some degree of time synchronization between the nodes. Another approach would be to measure the statistics of delay going through each node individually. The average total delay through the network and the distribution of the delays given some assumptions could then be calculated based on the delay statistics through each node individually. Delay can then become a parameter to be minimized in the optimization. It is also useful for the optimization to know the time that each node spends transmitting and receiving. Together with the amount of information transmitted or received, this can be used to determine the average data rate the various links are sustaining.

Fourth, the servers 20 in the cloud 12 use the measurements to perform an optimization algorithm for the distributed Wi-Fi system 10 (step 54). The optimization algorithm outputs the best parameters for the network operation. These include the selection of the channels on which each node should operate for the client links and the backhaul links, the bandwidth on each of these channels that the node should use, the topology of connection between the nodes and the routes for packets through that topology from any source to any destination in the network, the appropriate node for each client to attach to, the band on which each client should attach, etc.

Specifically, the optimization uses the measurements from the nodes as inputs to an objective function which is maximized. A capacity for each link can be derived by examining the amount of data that has been moved (the load), and the amount of time that the medium is busy due to interference. This can also be derived by taking a ratio of the data moved across the link to the fraction of the time that the transmitting queue was busy. This capacity represents the hypothetical throughput that could be achieved if the link was loaded to saturation and was moving as much data as it possibly could.

Fifth, an output of the optimization is used to configure the distributed Wi-Fi system 10 (step 55). The nodes and client devices need to be configured from the cloud based on the output of the optimization. Specific techniques are used to make the configuration fast, and to minimize the disruption to a network that is already operating. The outputs of the optimization are the operational parameters for the distributed Wi-Fi system 10. This includes the frequency channels on which each of the nodes is operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the distributed Wi-Fi system 10. The optimization tries to use the lowest possible channel bandwidth for each link that will support the load required by the various user's applications. By using the narrowest sufficient throughput channels, the maximum number of non-interfering channels are left over for other links within the distributed Wi-Fi system 10.

The optimization generates the outputs from the inputs as described above by maximizing an objective function. There are many different possible objective functions. One objective could be to maximize the total throughput provided to all the clients. This goal has the disadvantage that the maximum total throughput might be achieved by starving some clients completely, in order to improve the performance of clients that are already doing well. Another objective could be to enhance as much as possible the performance of the client in the network in the worst situation (maximize the minimum throughput to a client). This goal helps promote fairness but might trade a very large amount of total capacity for an incremental improvement at the worst client. A preferred approach considers the load desired by each client in a network, and maximizing the excess capacity for that load ratio. The optimization can improve the capacity, as well as shift the capacity between the two APs. The desired optimization is the one that maximizes the excess capacity in the direction of the ratio of the loads. This represents giving the distributed Wi-Fi system 10 the most margin to carry the desired loads, making their performance more robust, lower latency, and lower jitter. This strict optimization can be further enhanced by providing a softer optimization function that weighs assigning capacities with a varying scale. A high utility value would be placed on getting the throughput to be higher than the required load. Providing throughput to a client or node above the required load would still be considered a benefit, but would be weighted much less heavily than getting all the clients/nodes to the load they are requiring. Such a soft weighted optimization function allows for a more beneficial tradeoff of excess performance between devices.

Another set of optimization outputs defines the topology of the distributed Wi-Fi system 10, meaning which nodes connect to which other nodes. The actual route through the distributed Wi-Fi system 10 between two clients or the client and the Internet gateway (modem/router 18) is also an output of the optimization. Again, the optimization attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the system.

Sixth, learning algorithms can be applied to cloud-stored data for determining trends and patterns (step 56). Note, the servers 20 can store the measurements from the nodes, results from the optimizations, and subsequent measurements after associated optimizations. With this data, trends and patterns can be determined and analyzed for various purposes. Because reconfiguring a network takes time and is always at least partially disruptive to active communication, it is beneficial to configure the network for peak load, before that peak load arrives. By learning from the historical data that has already been captured, it is possible to predict the usage and interference that will occur at a future time. Other uses of learning on the captured data include identifying bugs and discovering bugs in the behavior of client devices. Once bugs in the behavior of client devices are discovered, it may be possible to work around those bugs using tools and commands from the infrastructure side of the network.

Seventh, the performance of the network can be assessed and reported to the user or to a service provider whose services are running over Wi-Fi (step 57). Eighth, an application (such as a mobile app operating on the user device 22) can provide a user visibility into the network operation (step 58). This would include the display of network activity and performance metrics. The mobile app can be used to convey information to the user, make measurements, and allow the user to control certain aspects of Wi-Fi the network operation. The mobile app also communicates to the internet over the cellular system to assist in onboarding the nodes when they are first being set up. The mobile phone app, utilizing the cellular system, also provides a way for the Wi-Fi network to communicate with the internet and cloud when the user's normal internet connection is not functioning. This cellular based connection can be used to signal status, notify the service provider and other users, and can even be used to carry data from the home to the internet during the time that the user's normal internet connection is malfunctioning.

The configuration and optimization process 50 is described herein with reference to the distributed Wi-Fi system 10 as an exemplary embodiment. Those skilled in the art will recognize the configuration and optimization process 50 can operate with any type of multiple node Wi-Fi system (i.e., a distributed Wi-Fi network or Wi-Fi system) including the Wi-Fi mesh network 32, the Wi-Fi repeater network 33, etc. For example, cloud-based control can also be implemented in the Wi-Fi mesh network 32, the Wi-Fi repeater network 33, etc. and the various systems and methods described herein can operate as well here for cloud-based control and optimization. Also, the terminology "distributed Wi-Fi network" or "Wi-Fi system" can also apply to the Wi-Fi mesh network 32, the Wi-Fi repeater network 33, etc. whereas the distributed Wi-Fi system 10 is a specific embodiment of a distributed Wi-Fi network. That is the distributed Wi-Fi system 10 is similar to the Wi-Fi mesh network 32, the Wi-Fi repeater network 33, etc. in that it does support multiple nodes, but it does have the aforementioned distinctions to overcome limitations associated with each.

Optimization

Referring to FIG. 3, in an exemplary embodiment, a block diagram illustrates inputs 60 and outputs 62 to an optimization 70. The inputs 60 can include, for example, traffic load required by each client, signal strengths between nodes and between access points 14 (nodes) and Wi-fi client devices 16, data rate for each possible link in the network, packet error rates on each link, strength and load on in-network interferers, and strength and load on out-of-network interferers. Again, these inputs are based on measurements and data gathered by the plurality of access points 14 and communicated to the servers 20 in the cloud 12. The servers 20 are configured to implement the optimization 70. The outputs of the optimization 70 include, for example, channel and bandwidth (BW) selection, routes and topology, Request to Send/Clear to Send (RTS/CTS) settings, Transmitter (TX) power, clear channel assessment thresholds, client association steering, and band steering.

Access Point

Figure 5:
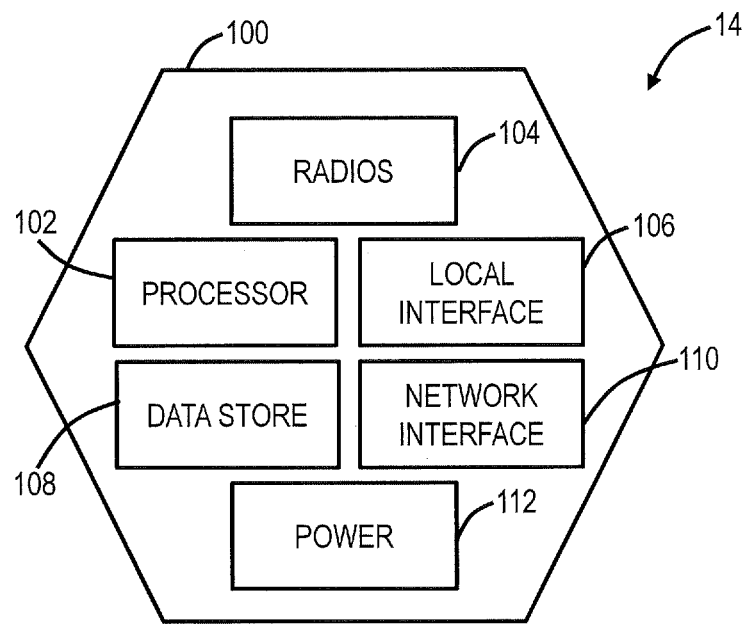
FIG. 5 is a block diagram of functional components of the access point in the distributed Wi-Fi system of FIG. 1.

Referring to FIG. 5, in an exemplary embodiment, a block diagram illustrates functional components of the access point 14 in the distributed Wi-Fi system 10. The access point 14 includes a physical form factor 100 which contains a processor 102, a plurality of radios 104, a local interface 106, a data store 108, a network interface 110, and power 112. It should be appreciated by those of ordinary skill in the art that FIG. 5 depicts the access point 14 in an oversimplified manner, and a practical embodiment may include additional components and suitably configured processing logic to support features described herein or known or conventional operating features that are not described in detail herein.

In an exemplary embodiment, the form factor 100 is a compact physical implementation where the access point 14 directly plugs into an electrical socket and is physically supported by the electrical plug connection to the electrical socket. This compact physical implementation is ideal for a large number of access points 14 distributed throughout a residence. The processor 102 is a hardware device for executing software instructions. The processor 102 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an exemplary embodiment, the processor 102 may include a mobile-optimized processor such as optimized for power consumption and mobile applications.

The radios 104 enable wireless communication in the distributed Wi-Fi system 10. The radios 104 can operate according to the IEEE 802.11 standard. The radios 104 include address, control, and/or data connections to enable appropriate communications on the distributed Wi-Fi system 10. As described herein, the access point 14 includes a plurality of radios to support different links, i.e., backhaul links and client links. The optimization 70 determines the configuration of the radios 104 such as bandwidth, channels, topology, etc. In an exemplary embodiment, the access points 14 support dual band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an exemplary embodiment, the access points 14 can also include the local interface 106 allowing connectivity to the user device 22 (or a Wi-Fi client device 16) for onboarding to the distributed Wi-Fi system 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The network interface 104 may be used to enable the access point 14 communicate to the modem/router 18. Also, the network interface 104 can be used to provide local connectivity to a Wi-Fi client device 16 or user device 22. For example, wiring in a device to an access point 14 can provide network access to a device which does not support Wi-Fi. In an exemplary embodiment, all of the access points 14 in the distributed Wi-Fi system 10 include the network interface 110. In another exemplary embodiment, select access points 14 which connect to the modem/router 18 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 20 via the cloud. The processor 102 and the data store 108 may be configured to implement the various processes, algorithms, methods, techniques, etc. described herein.

Cloud Server and User Device

Figure 6:
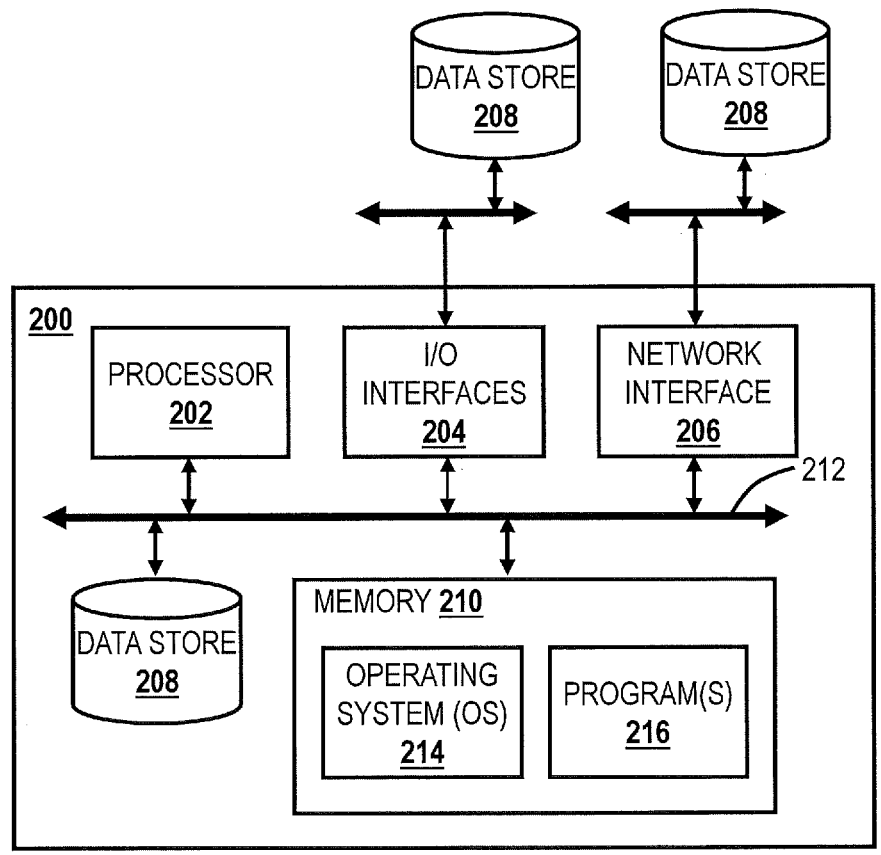
FIG. 6 is a block diagram of functional components of a server, a Wi-Fi client device, or a user device which may be used with the distributed Wi-Fi system of FIG. 1.

Referring to FIG. 6, in an exemplary embodiment, a block diagram illustrates functional components of the server 20, the Wi-Fi client device 16, or the user device 22 which may be used with the distributed Wi-Fi system 10. FIG. 6 illustrates functional components which can form any of the Wi-Fi client device 16, the server 20, the user device 22, or any general processing device. The server 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server 20 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 20, a semiconductor-based microprocessor (in the form of a microchip or chip set), or generally any device for executing software instructions. When the server 20 is in operation, the processor 202 is configured to execute software stored within the memory 210, to communicate data to and from the memory 210, and to generally control operations of the server 20 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 20 to communicate on a network, such as the cloud 12. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 20 such as, for example, an internal hard drive connected to the local interface 212 in the server 20. Additionally, in another embodiment, the data store 208 may be located external to the server 20 such as, for example, an external hard drive connected to the I/O interfaces 204 (e.g., SCSI or USB connection). In a further embodiment, the data store 208 may be connected to the server 20 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization 70.

Data Gathering

Again, in various exemplary embodiments, the systems and methods provide techniques for gathering data and measurements in the distributed Wi-Fi system 10 in the configuration and optimization process 50 for use in the optimization 70. As described herein, the measurements and gathered data from the access points 14 can be referred to as measurements or data collectively. This data can include, without limitation, traffic from/to different clients, signal strengths and data rates used from/to different clients, Wi-Fi channel conditions, performance experienced by different traffic flows, congestion levels on the access points 14, etc. This data is reported to the cloud 12 to the servers 20 both periodically and in an event-driven fashion. The event-driven reporting can be based on crossing an absolute or relative threshold. Further, the reporting frequency can be dynamically adjusted based on thresholds or levels of the parameters being measured. The access points 14 can report the data as raw data, or when the volume of data is large, it can be compressed and reported through statistical measures such as the mean, median, distribution, etc. An objective of the data gathering is to perform the gathering and reporting while minimizing the impact on the performance of active traffic flows that are being carried by the access points 14.

Figure 7:
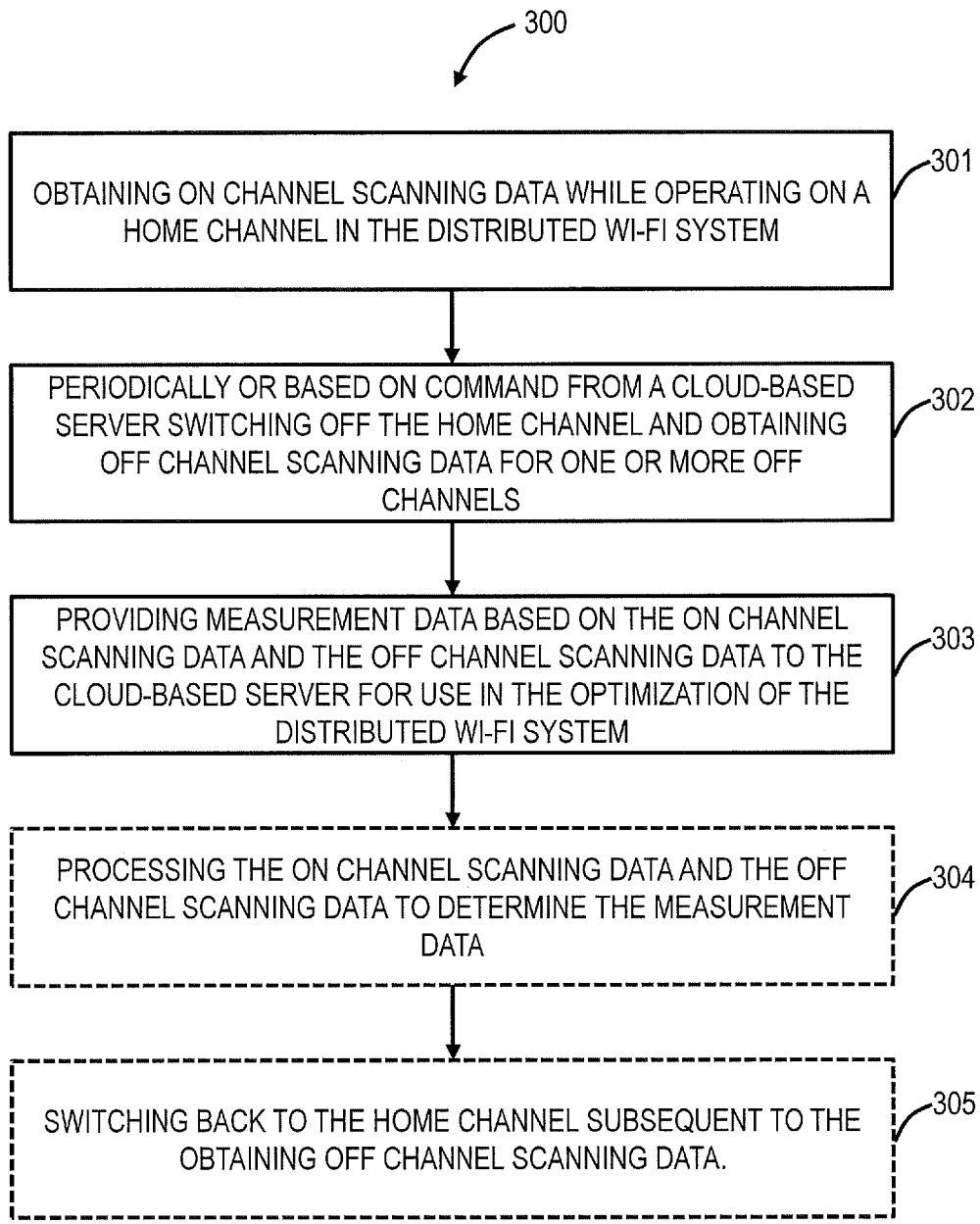
FIG. 7 is a flowchart of a data gathering process by an access point in the distributed Wi-Fi system of FIG. 1.

Referring to FIG. 7, in an exemplary embodiment, a flowchart illustrates a data gathering process 300 by an access point 14 in the distributed Wi-Fi system 10. The data gathering process 300 includes obtaining on-channel scanning data while operating on a home channel in the distributed Wi-Fi system 10 (step 301); periodically or based on command from a cloud-based system switching off the home channel and obtaining off-channel scanning data for one or more off-channels (step 302); and providing measurement data based on the on-channel scanning data and the off-channel scanning to the cloud-based system for use in the optimization of the distributed Wi-Fi system 10 (step 303). As described herein, the home channel is a channel the associated radio 104 is presently operating on based on a current configuration (such as based on a previous optimization 70 or an initial configuration). The home channel can also be for client links or backhaul links. That is, the access point 14 can be operating on a home channel for communication with the clients 16 on a client link as well as on another home channel for communication with other access points 14 in the distributed Wi-Fi system 10, i.e., backhaul links. The cloud-based system can be the servers 20 in the cloud 12.

The data gathering process 300 can further include processing the on-channel scanning data and the off-channel scanning data to determine the measurement data (step 304). This processing is performed locally to the access point 14 to determine measurements which are then transmitted to the server 20. In another exemplary embodiment, the access point 14 can merely transmit the on-channel scanning data and the off-channel scanning data as raw data without processing. However, the processing reduces bandwidth requirements over the distributed Wi-Fi system 10 for the data gathering process 300. Also, the processing can simply include compressing the on-channel scanning data and the off-channel scanning data prior to transmission to the server 20. The processing can include determining a division of time that the home channel is divided based on a combination of direct measurements and computations based on the direct measurements. The processing can include determining delays of packets over the distributed Wi-Fi system through one of direct measurements and statistics of delay at the access point. Finally, the data gathering process 300 can further include switching back to the home channel subsequent to the obtaining off-channel scanning data (step 305).

For illustration purposes, the data gathering process 300 is described with reference to the distributed Wi-Fi system 10. Those skilled in the art will recognize the data gathering process 300 can also operate with other type of Wi-Fi systems such as the Wi-Fi mesh network 32, the Wi-Fi repeater network 33, etc. That is, the data gathering process 300 generally contemplates operation with any multiple access point 14, 34 system and can be implemented by the mesh nodes 36, the access point 34, the repeater 38, etc. Again, the data gathering process 300 is advantageous for cloud-controlled Wi-Fi systems to able intelligent, remote control and optimization.

In an exemplary embodiment, the scanning for either on-channel scanning data or off-channel scanning data can be performed and reported at different channel bandwidths (e.g., 20, 40, 80, 160 MHz). For example, the on-channel scanning can be performed at a different channel bandwidth than what is currently configured on the home channel. Further, the off-channel scanning can be set at any of the different channel bandwidths. For example, the periodic scanning can rotate between the different channel bandwidths to provide the cloud-based system more representative details on how the Wi-Fi system is operating.

The measurement data can include a plurality of Received Signal Strength Indicators (RSSI), achievable data rates, capacity, load, error rates, delays, and fractions of time spent transmitting and receiving. The switching off can be determined based on a load of the access point 14. For example, the process 300 can include monitoring a status of queues in the access point 14 to determine when the load is low for determining the switching off. The process 300 can further include notifying other access points in the distributed Wi-Fi system 10 of the switching off via one of a broadcast frame and an information element in the beacon, with an offset from a Timing Synchronization Function (TSF) timer. Optionally, the access point 14 is lightly loaded compared to at least one additional access point 14 in the distributed Wi-Fi system 10, and wherein the access point 14 is configured to perform the obtaining off-channel scanning data for the at least one additional access point 14. The access point 14 for the off-channel scanning data can send probe requests for a particular Service Set Identifier (SSID) to measure signal strengths to a particular neighbor to reduce the number of probe responses received. The access point 14 for the off-channel scanning data can send frames that spoof another in-network Basic Service Set (BSS) to elicit responses from neighboring access points and clients. The process 300 can further include receiving configuration data from the cloud-based system based on the optimization, wherein the providing measurement data is performed over a statistics channel, and the receiving configuration data is performed over a configuration channel different from the statistics channel.

In another exemplary embodiment, an access point 14 in the distributed Wi-Fi system 10 includes a plurality of radios communicating on the distributed Wi-Fi system; and a processor communicatively coupled to the plurality of radios and configured to cause one or more radios of the plurality of radios to obtain on-channel scanning data while operating on a home channel in the distributed Wi-Fi system; periodically or based on command from a cloud-based system cause the one or more radios to switch off the home channel and obtain off-channel scanning data for one or more off-channels; and providing measurement data based on the on-channel scanning data and the off-channel scanning data to the cloud-based system for use in the optimization of the distributed Wi-Fi system 10.

In a further exemplary embodiment, the distributed Wi-Fi system 10 includes a plurality of access points 14 communicatively coupled to one another and at least one access point communicatively coupled to a gateway providing external communication for the distributed Wi-Fi system 10 and communication to a cloud-based system; wherein each of the plurality of access points 14 are configured to obtain on-channel scanning data while operating on a home channel in the distributed Wi-Fi system; periodically or based on command from a cloud-based system switch off the home channel and obtain off-channel scanning data for one or more off-channels; and provide measurement data based on the on-channel scanning data and the off-channel scanning data to the cloud-based system for use in the optimization of the distributed Wi-Fi system 10.

In yet another exemplary embodiment, a method of gathering data by the access point 14, 34 or mesh node 36 or repeater 38 in a Wi-Fi system includes periodically or based on command from a cloud-based system performing one or more of i) obtaining on-channel scanning data while operating on a home channel and ii) switching off the home channel and obtaining off-channel scanning data for one or more off-channels; and providing measurement data based on one or more of the on-channel scanning data and the off-channel scanning data to the cloud-based system for use in the optimization of the Wi-Fi system, wherein the measurement data comprises one or more of raw data and processed data.

In yet another exemplary embodiment, an access point 14, 34, mesh node 36 or repeater 38 configured to gather data for optimization includes a plurality of radios communicating on the Wi-Fi system; and a processor communicatively coupled to the plurality of radios and configured to: periodically or based on command from a cloud-based system cause the one or more radios to one or more of i) obtain on-channel scanning data while operating on a home channel and ii) switch off the home channel and obtain off-channel scanning data for one or more off-channels; and provide measurement data based on the on-channel scanning data and the off-channel scanning data to the cloud-based system for use in the optimization of the distributed Wi-Fi system, wherein the measurement data comprises one or more of raw data and processed data.

In yet another exemplary embodiment, a Wi-Fi system configured to gather data for optimization includes a plurality of access points communicatively coupled to one another and at least one access point communicatively coupled to a gateway providing external communication for the Wi-Fi system and communication to a cloud-based system; wherein each of the plurality of access points are configured to: periodically or based on command from a cloud-based system perform one or more of i) obtain on-channel scanning data while operating on a home channel and ii) switch off the home channel and obtain off-channel scanning data for one or more off-channels; and provide measurement data based on the on-channel scanning data and the off-channel scanning data to the cloud-based system for use in the optimization of the Wi-Fi system, wherein the measurement data comprises one or more of raw data and processed data.

The access points 14 can periodically or upon receiving a command from the cloud 12 perform off-channel scans with the radio(s) 104 by briefly switching and monitoring a channel other than its home channel and at different channel widths (e. g. 20, 40, 80, and 160 MHz). During the scanning period, the access point 14 can collect information on the busyness of the channel both due to Wi-Fi and non-Wi-Fi transmissions and identify the occupancy levels due to each of the neighboring Basic Service Sets (BSSs). The access point 14 can also measure the signal strengths from neighboring access points 14 and non-associated clients 16 by receiving management frames such as beacons as well as data frames. In order to increase the efficiency of data collection from in-network access points 14 (ones that are part of the distributed Wi-Fi system 10) and clients 16, the access point 14 performing the scan can send frames that spoof another in-network BSS to elicit responses from neighboring access points 14 and clients 16. Alternatively, the neighboring in-network access points 14 can be instructed to transmit to their associated clients 16 eliciting responses that can, in turn, be measured by the scanning access point 14. The access points 14 can also measure the Modulation and Coding Scheme (MCSs) being used between neighboring access points 14 and their clients 16.

To optimize the distributed Wi-Fi system 10, it is beneficial to know the signal strengths from all clients 16 to all access points 14, each of which is a potential place for the clients 16 to associate with. However, some access points 14 have trouble receiving and recording the signal strength of clients 16 that are not associated with them. One way to circumvent this problem is to put the access point 14 doing the scan (whether off-channel or on-channel), into a multiple BSSID mode, and add the neighboring access points 14 BSSIDs to the access point list. Next the access point 14 should be configured not to send acknowledgments. This pair of actions will allow the access point 14 to silently listen to all the client transmissions, even transmissions from clients 16 that are not associated with that access point 14. In an exemplary embodiment, a transmission can be triggered from a Wi-Fi client device 16 from which measurement is desired by the measuring access point 14 transmitting a packet to it from the access point 14 that the Wi-Fi client device 16 is already connected to, i.e., coordination between access points 14 to trigger the Wi-Fi client device 16 to transmit which a different access point 14 is listening to that Wi-Fi client device 16.

While performing off-channel scans, the access point 14 is unable to transmit and receive on its home channel which could potentially disrupt the performance of traffic flows. To mitigate disruption, the access point 14 could perform scans only when they are idle or lightly loaded. Again, this can be based on monitoring a queue associated with the access point 14. Indeed, the multiple access points 14 in a home could be leveraged to infer the interference at heavily loaded nodes from proximate idle or lightly loaded access points 14 whose measurements are highly correlated. In that case, the heavily loaded access point 14 would never need to go off-channel to scan, as surrounding lightly loaded access points 14 would do the off-channel scanning for it. Further, access points 14 could decide to skip or postpone scans based on estimating the probability of packet loss using information on the free memory available to buffer data that arrives during the scanning period. The access points 14 can also notify other in-network access points 14 of their planned absence using a broadcast frame or an information element in the beacon, with an offset from a Timing Synchronization Function (TSF) timer. This ensures that other in-network access points 14 will not attempt to transmit to the access point 14 when it is not on its home channel. Associated client devices 16 could even be forced to connect to a different access point 14 in the vicinity for the duration of the off-channel scan and transitioned back to the original access point 14 after the scan is complete. In order to reduce the amount of time the access point 14 is away from its home channel, it could scan channels sequentially, returning to its home channel between scans. The access points 14 could also perform directed scans by sending probe requests for a particular SSID to measure signal strengths to a particular neighbor. This reduces the amount of time the access point needs to spend off channel, but triggering a response quickly from the neighbor the access point is trying to learn about. In addition, sending probe requests to a particular SSID reduces number of probe responses received, thus reducing the overhead of transmissions and therefore interference on the channel generated by gathering the data. Further, the access point 14, prior to switching off-channel, can move any associated clients 16 to other access points 14. Also, this could be done by the cloud-based system. With no associated clients 16, the access point 14 can perform off-channel scanning without network disruption.

While an access point 14 is on the home channel transmitting and receiving to associated clients 16 (or on the backhaul link transmitting and receiving to other access points 14), it measures the traffic transmitted to and received from each client 16 as well as the MCS rates used, the number of Media Access Control (MAC) Protocol Data Unit (MPDUs) in each aggregate, the packet error rate, the number of missing acknowledgements, etc. While on the home channel, the access point 14 can also listen to transmissions on that same channel that are associated with a different access point 14 operating on that same channel. While on the home channel, operating normally and serving any associated Wi-Fi client devices 16, the access point 16 can also be gathering measurements on all devices operating on that same channel that is within radio range. This includes Wi-Fi client devices 16 as well as other access points 14.

Another important piece of data to gather is the delay of packets traversing the network. These delays could be derived from direct measurements, time stamping packets as they arrive into the distributed Wi-Fi system 10 at the gateway (modem/router 18), and measuring the elapsed time as they depart at the final access point 14. However, such measurement requires some degree of time synchronization between the access points 14. Another approach would be to measure the statistics of delay going through each access point 14 individually. The average total delay through the distributed Wi-Fi system 10, and the distribution of the delays given some assumptions could then be calculated based on the delay statistics through each access point 14 individually. Delay can then become a parameter to be minimized in the optimization 70. These delays should be obtained or derived from the pathway to each client 16 in the distributed Wi-Fi system 10.

The access point 14 measures the occupancy of the transmit queue, measuring the queue length, i.e., the backlog in the transmit queues over time as well as the queue utilization, i.e., the fraction of the time that the queue is non-empty. These measures are well correlated with the performance experienced by the traffic flows carried by the access point 14. The maximum throughput that can be achieved by the access point 14 if the traffic it carried were to be scaled up can be determined as the ratio of the access point's 14 throughput to the queue utilization.

Figure 8:
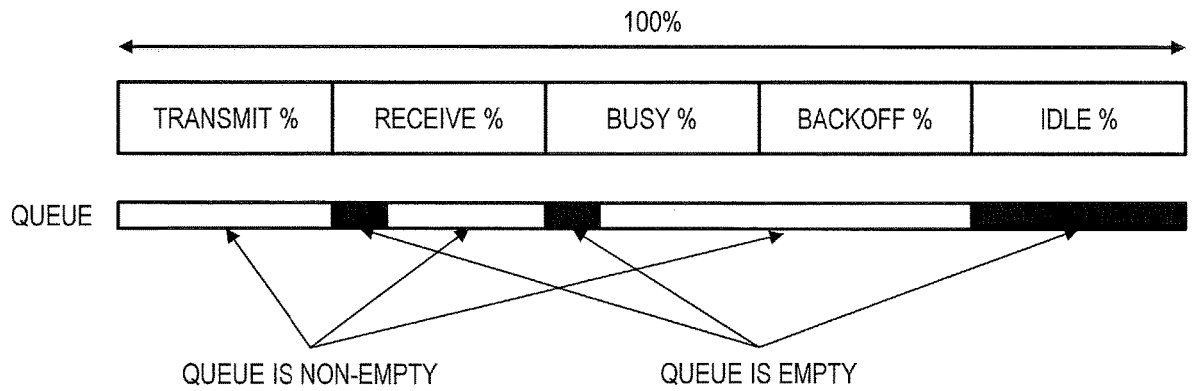
FIG. 8 is a graph of fractions of time-related to a channel, such as the home channel.

Referring to FIG. 8, in an exemplary embodiment, a graph illustrates fractions of time-related to a channel, such as the home channel. On its home channel, the access point 14 can also measure/infer the fractions of time that the channel is busy due to the activity of Wi-Fi transmitters in neighboring networks, i.e., interference (Busy %); the access point 14 spends transmitting (Transmit %); the access point 14 spends receiving from associated clients 16 (Receive %); the access point 14 spends counting down its contention window when the channel is idle, and the node has packets in its transmit queue (Backoff/o); the channel is idle and the access point 14 has an empty transmit queue (Idle %). FIG. 8 illustrates an example of the channel. Understanding how time is distributed across these categories is very useful. The ratio of the access point's 14 throughput to its transmit time fraction corresponds to the effective data rate the access point 14 achieves when it gains access to the channel. The Idle % corresponds to the time that the access point 14 could hypothetically use to transmit data, and is a reflection of the excess capacity available to the access point 14. However, not all these time fractions may be directly measurable at the access point 14 due to implementation limitations. The transmit %, receive %, and busy % may be directly reported by a driver, but the backoff % and idle % cannot be distinguished. Jointly measuring the queue occupancy and channel time fractions over a period of time allows the different time fractions to be separately estimated by leveraging the relationship between the two, see FIG. 8. For instance, the backoff % can be computed as Queue utilization*(100−Receive %−Busy %)−Transmit %.

It is also useful to distinguish the interference due to the access point 14 within the distributed Wi-Fi system 10 that can be centrally controlled from the interference due to nodes outside the distributed Wi-Fi system 10. Data jointly gathered from access points 14 over a time period can be used to estimate the in-network interference using the transmit and receive activity reported by neighboring nodes as well as the signal strength between nodes. Thus, the out of network interference can be estimated by subtracting out the in-network interference from the total measured interference at the access point 14. An example of such a calculation would be to measure the total busy time at one access point 14 in the home. The other access points 14 in the distributed Wi-Fi system 10 in the home could report the time they spent transmitting. The time that all other access points 14 in the home's distributed Wi-Fi system 10 spend transmitting could be subtracted from the busy time at the access point 14 of interest. This would remove all the traffic associated with other access points 14 that are part of the home's distributed Wi-Fi system 10, leaving only the airtime consumed by transmissions from networks in neighboring homes. For the above process to be successful, the channel time fractions must be measured or estimated over an identical time period for all access points 14. One technique that could be employed is the synchronization of data reporting across all access points 14 in the distributed Wi-Fi system 10 so that all access points 14 report statistics for identical time slices. Another technique that could be employed is to aggregate data over a sufficient period of time from all access points 14 and compute statistical measures of the channel time fractions over this period to use for the estimation. This alleviates the need to synchronize the data gathering across the access points 14.

The cloud-based system, i.e., the server 20, is generally configured to use the measurement data for optimization and control of the distributed Wi-Fi system 10. In an exemplary embodiment, the server 20 can be configured to perform analysis of the measurement data from multiple access points 14 at once to derive other measurement data. For example, this can include subtracting the TX time of an access point 14 with the RX time of another access point 14. Here, the measurement data from multiple access points 14 can be time synchronized allowing alignment in the cloud 12 for comparison, analysis, etc. Alternatively, the measurement data from multiple access points 14 can be only coarsely time synchronized such as through averaging over time periods which are much longer than time synchronization uncertainty, and subtracting or otherwise deriving a result from measurements at different access points 14 by working with the values averaged over time.

In order to reduce the volume of data that is collected from the access points 14, redundant information can be omitted, e.g., data on communication between a pair of access points 14 need only be reported by one of them, say the transmitter. Data can also be compressed by sending statistics such as averages, moving averages, histograms, etc. instead of raw data. When raw data is sent, reports can be batched across a long-time period and reported in a compressed format. The volume of data can be further reduced by reducing the frequency of periodic reports and supplementing them with event driven reporting. The cloud 12 could configure nodes with parameters such as absolute thresholds for different quantities (load, capacity, Received Signal Strength Indicator (RSSI), etc.), and the access points 14 could report data only when the thresholds are crossed. Relative thresholds can also be used with access points 14 sending reports only when the new report differs from the one previously sent by at least the specified margin. Alternatively, the thresholds could be used to specify policies that modulate the frequency at which access points 14 gathers and report data. Some measurements that are intrusive or otherwise cumbersome to calculate (e.g., off-channel scans) could be triggered only when a different parameter crosses a specified threshold. Additionally, some statistics could be measured and reported only when explicitly requested by the cloud 12. In this way, any costs due to overheads imposed by data measurement and reporting can be controlled.

In an exemplary embodiment, the access points 14 can continually take measurements, such as every minute or some other configurable time period, but the reporting to the cloud-based system can be done in batches. For example, obtain measurements over X time periods and report the X sets of measurements at once. This approach reduces the frequency of communication to the cloud 12, while still ensuring the cloud-based system gets all of the necessary measurements for optimization. Further, the access point 14 can be configured to compress the measurement data prior to sending to the cloud 12 to reduce the overall bandwidth required. In another exemplary embodiment, to further reduce reporting bandwidth, there can be coordination between access points 14 on what is reported such as to reduce redundancy. For example, it is only necessary to report TX statistics on a given link and not necessary to give the corresponding RX statistics from the partner node on the link since the TX and RX statistics for a given link will be the same and provide the same information.

Separation of Statistics and Configuration-Channel

Figure 9:
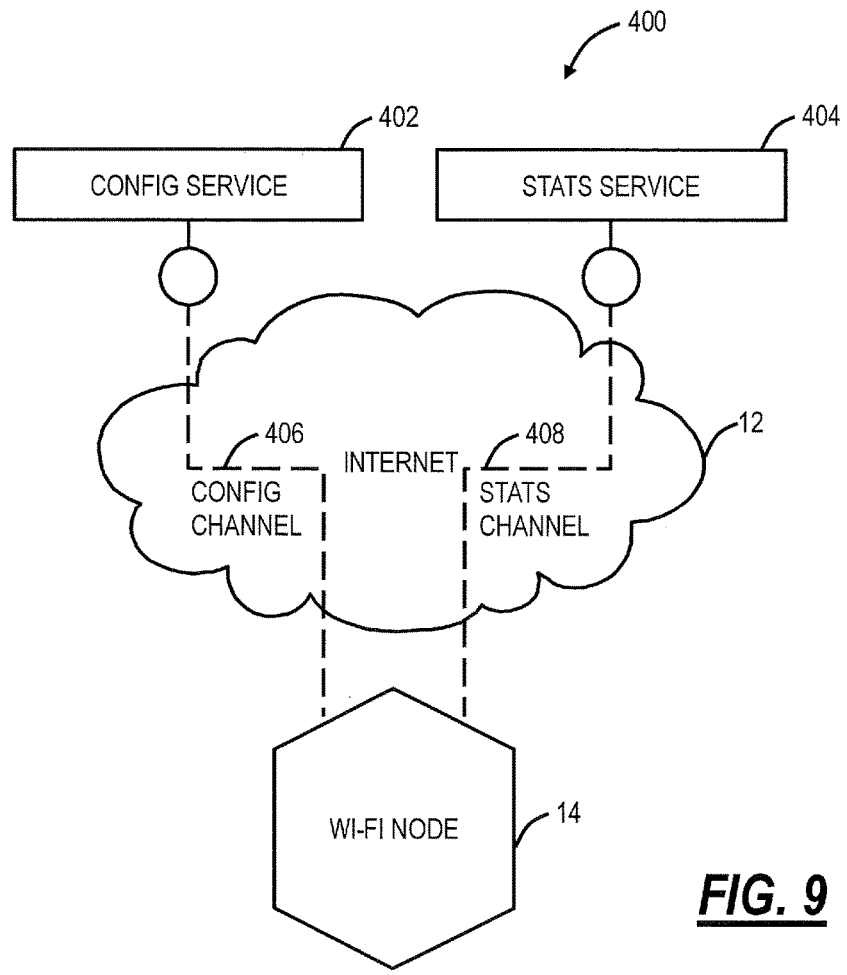
FIG. 9 is a network diagram of a network with an access point in the distributed Wi-Fi system of FIG. 1 communicating with a configuration service and a statistics service in the cloud.

Referring to FIG. 9, in an exemplary embodiment, a network diagram illustrates a network 400 with an access point 14 in the distributed Wi-Fi system 10 communicating with a configuration service 402 and a statistics service 404 in the cloud 12. The data gathered by the access points 14 in the distributed Wi-Fi system 10 as described above needs to be moved into the cloud 12. It is beneficial to do this over a separate channel from the channel used to configure and control the access points 14. This is because managing the access points 14 from the cloud 12 has distinct traffic patterns from collecting data. The configuration of access points 14 is infrequent and must be reliable and transactional, whereas statistics reporting from the access points 14 to the services 402, 404 has large volumes hence must be efficient and can accommodate some loss of data. Hence, the access points 14 can implement different communication channels and approaches for configuration and statistics, namely a configuration channel 406 to the configuration service 402 and a statistics channel 408 to the statistics service 404.

The configuration service 402 and the statistics service 404 are deployed in the cloud 12, such as on the same or different servers 20. The services 402, 404 can be referred to as a cloud-based system which can operate on the servers 20 in the cloud 12. These services 402, 404 can communicate via different protocols as well as be at different locations. Each of the access points 14 in the distributed Wi-Fi system 10 are configured to communicate with both of the services 402, 404, over the configuration channel 406 and the statistics channel 408, respectively. The configuration-channel 406 can use a transaction oriented reliable communication protocol such as Open vSwitch Database Management Protocol (OVSDB) to interact with the configuration service 402. The statistics channel 408 can use an efficient and lightweight communication protocol such as ProtoBuf over Message Queue Telemetry Transport (MQTT) to report statistics (measurement data) to the statistics service 404.

This approach provides several advantages. The configuration of access points 14 is critical activity and does not get impacted due to saturation of traffic or high volume related problems in statistics channel 408. The statistics communication protocol can be selected for high efficiency thereby minimizing management overhead of the access points 14.

Wi-Fi Setup for Establishing Communications

Again, more specifically, the distributed Wi-Fi systems and methods ensure that all access points 14 that provide Wi-Fi client access services in the distributed Wi-Fi system 10 will have a single, secure and reliable data path through the Wi-Fi network to the gateway 18 which has the connection to the cloud 12. One of the problems with the mesh, repeaters, or conventional distributed Wi-Fi approaches is initial network setup. Typically, Wi-Fi network setup requires some sort of manual user interactions, typically to enter Wi-Fi network SSID and password used for inter-node connections. This procedure is cumbersome and prone to errors. The problem is multiplied when multiple nodes must be set up as in mesh, repeater, or distributed Wi-Fi approaches. In addition, connecting to each node using a standard client with Wi-Fi capabilities is sometimes problematic as not all Wi-Fi clients give a user the opportunity to select a device to connect based on the Basic Service Set Identifier (BSSID, equivalent to the MAC address of the specific node or access point). In particular Microsoft Windows does not allow selection of a specific AP to connect to via the BSSID or other means. That limitation puts additional burden on a user with limited technical skills, and only increases time required to complete initial network setup.

A related problem of initial network setup is the amount of data a user needs to enter. Some of the current solutions require entering 48-bit unique Physical (PHY) layer identifier (MAC address) for each device being part of Wi-Fi network. Such operation is not only cumbersome but also susceptible to typos which might lead to catastrophic failure (lack of service). Accordingly, it is an objective of the distributed Wi-Fi systems and methods to provide a simpler and more user-friendly approach.

Referring to FIGS. 10A, 10B, 11A, 11B, and 12, in exemplary embodiments, block diagrams illustrate a network 500 for Wi-Fi setup in the distributed Wi-Fi system 10. The Wi-Fi setup is simple, quick, and efficient using Wi-Fi infrastructure mode connections in a bootstrap process. The Wi-Fi setup includes two external services 502, 504 which connect to the distributed Wi-Fi system 10 via a network 506 (e.g., the Internet, the cloud, an Internet Service Provider (ISP) network, etc.). The external services 502, 504 are available to all Wi-Fi access points 14 which are authorized to become part of the distributed Wi-Fi system 10. The external services 502, 504 include a remote device authentication server and a remote distributed Wi-Fi network controller (cloud). The use of the external services 502, 504 provide significantly reduced user interaction for establishing communication in the distributed Wi-Fi system than conventional approaches.

Figure 12:
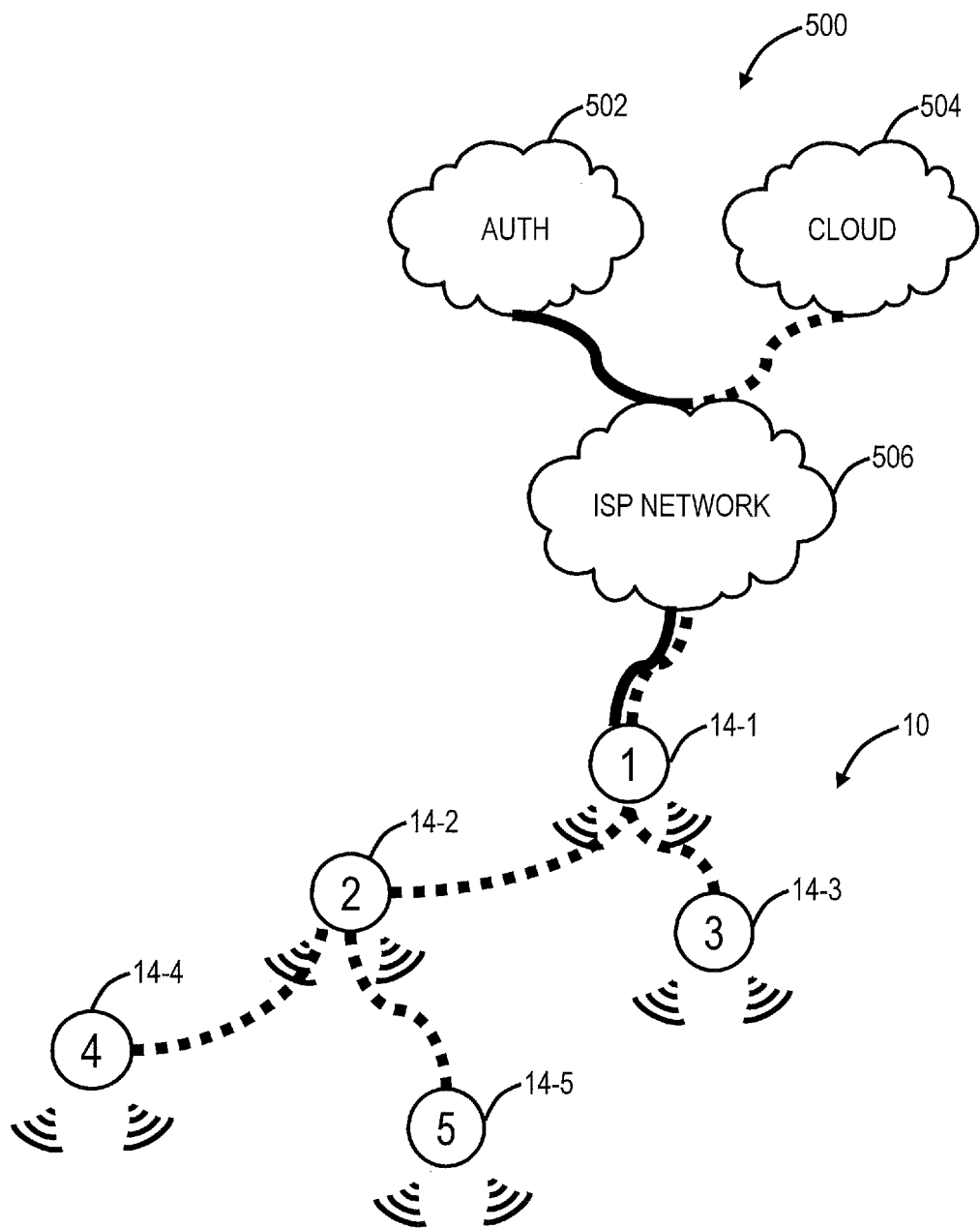
FIG. 12 is a network diagram of the network of FIGS. 10A, 10B, 11A, and 11B where another access point onboards and starts provisioning Wi-Fi service for additional access points.

FIG. 10A illustrates the network 500 where the distributed Wi-Fi system 10 is initially connected to the external services 502, 504. FIG. 10B illustrates the network 500 where a gateway access point 14-1 is configured by the external services 502, 504. FIG. 11A illustrates the network 500 where the gateway access point onboards other access points 14-2, 14-2 and starts provisioning Wi-Fi service. FIG. 11B illustrates the network 500 where the access point 14-3 onboards other access points and starts provisioning Wi-Fi service. FIG. 12 illustrates the network 500 where the access point 14-3 onboards and starts provisioning Wi-Fi service for access points 14-4, 14-5.

The Wi-Fi setup includes the gateway access point 14-1 which connects to the modem/router 18 which connects to the network 506. Once connected, the gateway access point 14-1 connects to the external services 502, 504 and starts provisioning of user Wi-Fi service. A Wi-Fi network topology that does not contain loops is ensured by a bootstrapping process described herein.

As described herein, the distributed Wi-Fi system 10 operates based on coordinated operations of several (usually up to 15) Wi-Fi access points 14 ("AP") controlled by a single entity. The goal of distributed Wi-Fi system 10 is to provide better coverage while retaining similar throughput rates as in case of standard, single-point infrastructure mode Wi-Fi solution. For the sake of simplicity, assume, that only a single wired network access is available to the distributed Wi-Fi system 10, i.e., via the modem/router 18. This might be a DSL or cable connection providing Internet connectivity to the residence where the distributed Wi-Fi system 10 operates. One (randomly selected) access point 14-1 will be connected to ISP network 506 using an Ethernet wired connection associated with the access point 14-1. All other access points 14-2, 14-3, 14-4, 14-5 (sometimes also referred as nodes) are connected either to the gateway access point 14-1 or to one of other access points based on best quality of service criterion. When connecting to an upstream peer each access point 14 is acting as a Wi-Fi STA (Station) client and the parent node is acting as infrastructure mode access point 14. Therefore, based on its role in the distributed Wi-Fi system 10, a single access point 14 might have one of two possible roles: Gateway node (GW) and Wi-Fi node (node).

The gateway node is the access point 14-1 with a single wired Wide Area Network (WAN) connection. It has a critical role in the distributed Wi-Fi system 10 as all user traffic initiated by any Wi-Fi client connected to the distributed Wi-Fi system 10 passes through the gateway node. The gateway node also provides infrastructure mode Wi-Fi services for user Wi-Fi clients, as in the case of standard single entity Wi-Fi solution. It also may provide services like firewall and Network Address Translation (NAT), which is up to user setting. The Wi-Fi node role is to provide Wi-Fi infrastructure mode access for all Wi-Fi clients, as well as Wi-Fi infrastructure mode access for other Wi-Fi access points 14. In some instances, it features a single dual-band Wi-Fi STA connection to parent node for user traffic forwarding to or from gateway node and the outside network.

In the distributed Wi-Fi system 10, a single Wi-Fi network includes several independent access points 14. In order to coordinate operations of all access points 14, a single control entity to which each individual access points 14 is connected is utilized. As described herein, this control entity is implemented as an independent service running outside of the Wi-Fi solution, i.e., the external services 502, 504, and to share this service among (theoretically) unlimited number of distributed Wi-Fi systems 10. This controlling entity can be referred as the cloud 12. Its role is to provision Wi-Fi infrastructure mode parameters, coordinate operations of individual access points 14, prevent access points 14 becoming a part of other private networks and to ensure best possible network performance. Because many aspects of the access point 14 operations are controlled by the cloud services 502, 504, establishing cloud connectivity for each individual access point 14, without cloud assistance (hereafter referred as bootstrapping process) is critical.

The main issues that need to be addressed by the bootstrapping process are: determining the role of the node, i.e., discovering if the node is the gateway node; ensuring that no inter-node connections are established between nodes (parent-child relationship), before the parent is able to reach cloud service and provide general Internet access to Wi-Fi clients; and ensuring that every node will have a single path data path connection to the gateway node.

Figure 13:
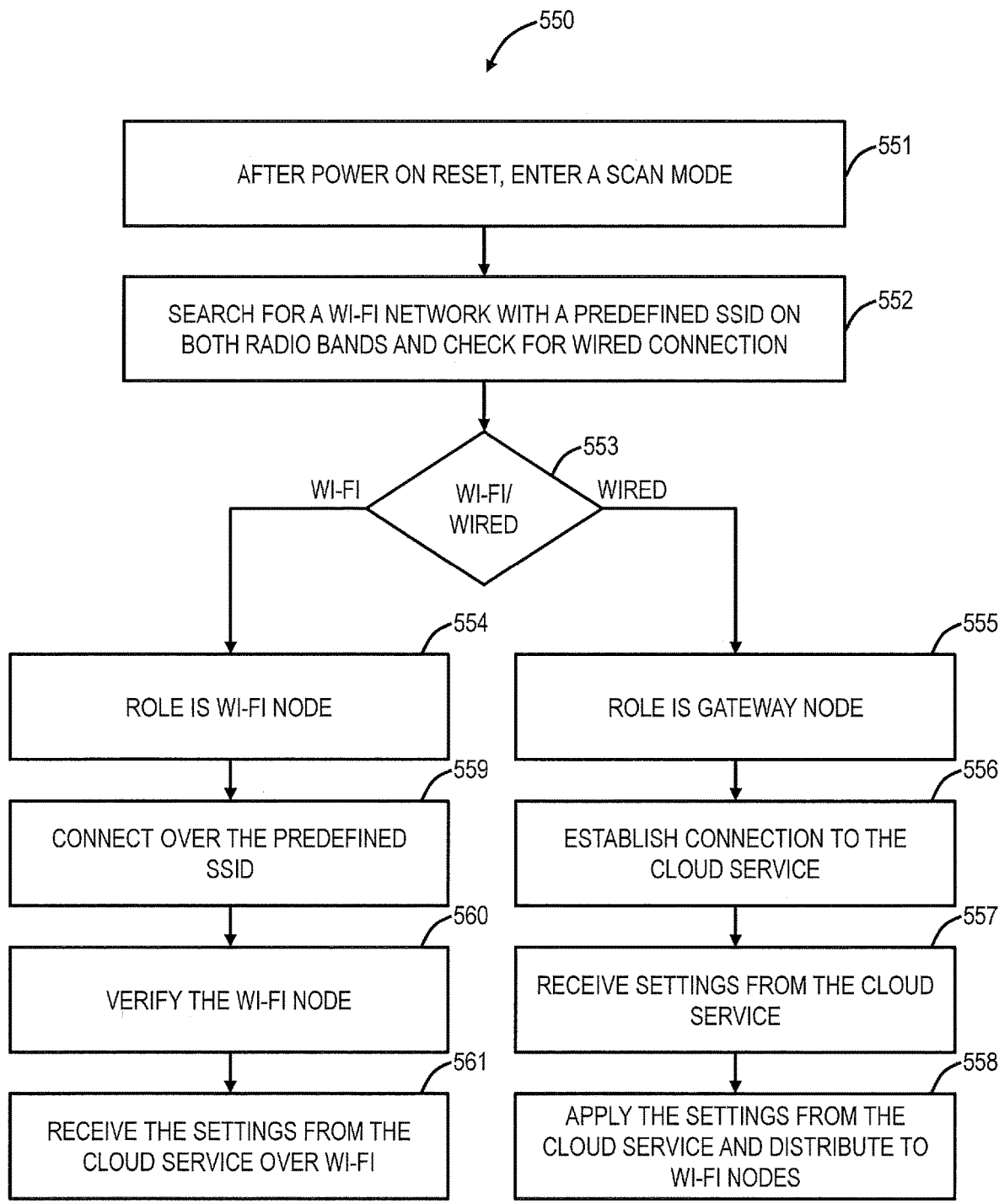
FIG. 13 is a flowchart of a Wi-Fi setup process for establishing communications in the distributed Wi-Fi system.

Referring to FIG. 13, in an exemplary embodiment, a flowchart illustrates a Wi-Fi setup process 550 for establishing communications in the distributed Wi-Fi system 10. The Wi-Fi setup process 550 is described with respect to a single access point 14; those skilled in the art will recognize that all the access points 14 can perform the Wi-Fi setup process 550. After power on reset (e.g., plugging in the access point 14), the access point 14 enters a scan mode (step 551). When the access point 14 is in scan mode, it searches for a Wi-Fi network with a pre-defined SSID on both radio bands, and, in the scan mode, the access point 14 checks for wired connection availability (step 552).

If the access point 14 detects the presence of a Wi-Fi network with the predefined SSID and is able to connect to it (step 553), it assumes the role of a Wi-Fi node (step 554). If the access point 14 detects the presence of a wired connection (step 553), and it is able to get network configuration using the Dynamic Host Configuration Protocol (DHCP) protocol and to establish a connection to cloud controller (i.e., the service 504), the access point 14 assumes the gateway role (step 555). It is important to emphasize that during the scan mode, the access point 14 does not provide Wi-Fi service for clients nor does it provide Wi-Fi service to other nodes. This prevents user client connections and inter-node connections from being established before the cloud service is reachable.

As soon as the gateway node establishes a connection to the cloud service 504 (step 556), the cloud service 504 sends all the required settings, i.e., parameters, for the gateway to operate properly and the access point 14 receives the settings (step 557). The parameters include Home Wi-Fi service (user Wi-Fi service for allowing connection of Wi-Fi client devices 16), Inter-connections Wi-Fi service (used for inter-node connections), authentication service 502 IP address, all network configurations required for correct user traffic forwarding and routing on the gateway node, all facilities settings (such as DHCP server, DHCP client settings, etc.) required for correct solution operations, white-list of nodes allowed to connect to this private network, etc. As soon as gateway node receives these settings, they are applied in device software, and Wi-Fi services for both other nodes and user clients are enabled (step 558).

When a Wi-Fi node senses the Wi-Fi network with predefined SSID, it tries to connect to it, using Wi-Fi Protected Access (WPA)-Enterprise mode Wi-Fi protected access protocol (step 559). The parent access point 14 (which the Wi-Fi node connects to over Wi-Fi) first checks if the Wi-Fi node is in network whitelist (list is provided by the cloud service 504) (step 560). If the Wi-Fi node is not in the list of allowed devices, the parent access point 14 will drop client connection. If the Wi-Fi node is in the list of devices allowed to connect to this Wi-Fi network, its credentials are transmitted by the parent access point 14 to the authentication service 502. There, the connecting device credentials are verified. Authentication results are shared back to the parent access point 14 using the Remote Authentication Dial-In User Service (RADIUS) protocol. In case of successful authentication, the Wi-Fi node is allowed to connect to parent access point 14, whereas in case of failed authentication, the Wi-Fi node is blacklisted and denied a connection. Once allowed to connect, the Wi-Fi node receives the settings that were provided by the cloud service 504 to the gateway node (step 561).

The Wi-Fi setup process 550 ensures that only nodes planned to be part of that particular distributed Wi-Fi system 10 are allowed to connect. Only nodes with proper credentials resident on their persistent storage successfully pass authentication process and are allowed to connect to distributed Wi-Fi system 10. Inter-node connections are always encrypted, thus protecting any user traffic.

A node that tries to connect to the distributed Wi-Fi system 10 may try to connect to the same parent node (same BSSID) on and alternative band. If the alternative band network is not reachable, the node will not try to make a connection on the alternative radio band. As soon as the node establishes client Wi-Fi connection to one of the nodes in distributed Wi-Fi system 10, it exits scan mode and enters a regular operation mode.

In the regular operation mode, an access point 14 tries to connect to the cloud service 504. After establishing a connection to the cloud service 504, through the gateway node and potentially other nodes, it will receive the same set of parameters and configuration as a gateway node. Only after receiving all required data from the cloud service 504 will the newly connected node provision Wi-Fi service both to user clients and to other nodes in the distributed Wi-Fi system 10.

The Wi-Fi setup process 550 prevents establishing alternative node-node connections and ensures that there is only a single data path between an individual node in the distributed Wi-Fi system 10. and the gateway node (creating a tree network topology). Such topology ensures that there is no need for additional network protocols for network topology discovery. Each parent has a list of connected clients and sends this list is to the cloud service 504. Because the cloud service 504 receives a list of connected clients from all nodes in distributed Wi-Fi system 10, it has all information needed to determine network topology and act upon its changes.

Once the distributed Wi-Fi system 10 is running, there are several events that can disrupt the distributed Wi-Fi system 10. The distributed Wi-Fi system 10 can have a policy change put upon it by the cloud service 504 to improve its performance. Such a topology change could be implemented in a step by step set of incremental changes. However, it could also be implemented by tearing the network down completely and allowing the network to reform following the procedures described in the Wi-Fi setup process 550. Another source of disruption could be power outages. Several good techniques could be used for recovering from power outages. First, the distributed Wi-Fi system 10 could return to its last known good state before the power outage. This has the advantage that it works even if access to the Internet has not been re-established. It has the disadvantage that the access points 14 need to store state, and likely have some amount of built-in control to re-establish the network without the cloud. The other approach following a power outage would be for the nodes to go through the initial onboarding sequence as described in the Wi-Fi setup process 550. Since this is controlled by the cloud service 504, the nodes would not need any special intelligence to reform the network in this way.

The Wi-Fi setup process 550 is shown in FIGS. 10A, 10B, 11A, 11B, and 12. In FIG. 10A, the authentication service 502 and the cloud service 504 are connected to the Internet and the network 506. The access points 14-1, 14-2, 14-3 are powered on. The gateway access point 14-1 determines it is a gateway node based on its wired connection to the network 506. In FIG. 10B, the gateway access point 14-1 connects to the cloud service 504, receives the settings, and configures. The gateway access point 14-1 begins Wi-Fi services on the predefined SSID for the other access points 14-2, 14-3 and on a home SSID based on the configuration for Wi-Fi clients.

In FIG. 11A, the access points 14-2, 14-3 being the onboarding process as Wi-Fi nodes by connecting to the gateway access point 14-1 over the predefined SSID. In FIG. 11B, gateway access point 14-1 connects to the authentication service 502 to verify the access points 14-2, 14-3. The access point 14-3 communicates to the cloud service 504 based on its connection to the gateway access point 14-1 over the predefined SSID, receives the settings, and configures its Wi-Fi service which includes the predefined SSID and the home SSID.

In FIG. 12, the access points 14-2, 14-3 are onboarded, both providing Wi-Fi services over the predefined SSID and the home SSID. New access points 14-4, 14-5 connect to the access point 14-2 over the predefined SSID, receive the settings, and configure its Wi-Fi service which includes the predefined SSID and the home SSID.

Registry

Figure 14:
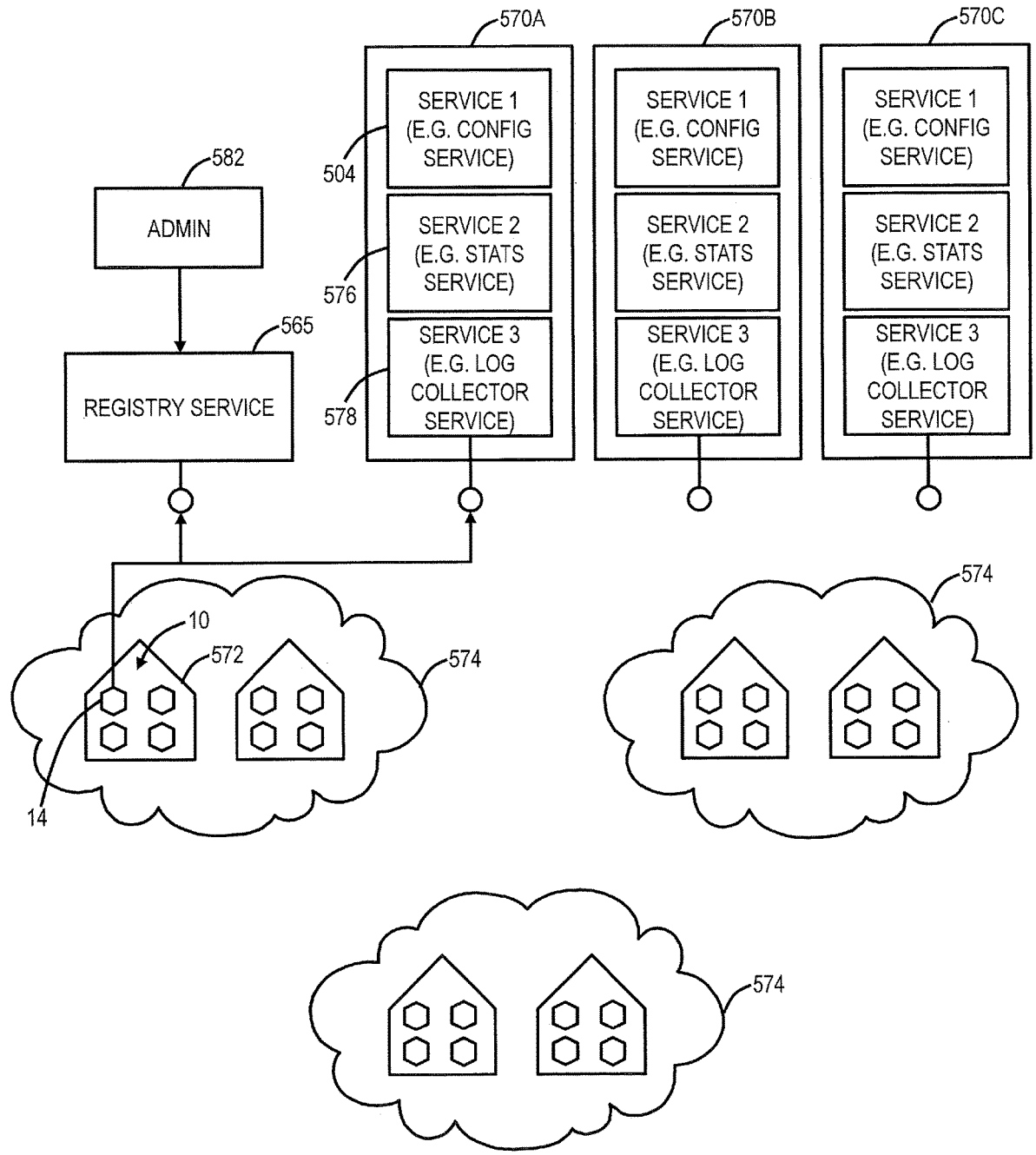
FIG. 14 is a network diagram of various distributed Wi-Fi systems which connect to a centrally managed registry for directivity to cloud services.

Referring to FIG. 14, in an exemplary embodiment, a network diagram illustrates various distributed Wi-Fi systems 10 which connect to a centrally managed registry 565. As described herein, it is assumed that the access points 14 know the address of the cloud services 502, 504 to which they need to connect. Conceptually this is simple, but in practice it can be difficult to maintain a constant location to which all types and generations of access points 14 can connect to get the services 502, 504 they need. This problem can be overcome with a centrally managed registry 565 of service 502, 504 locations. For example, millions of access points 14 across consumer residences 572 are deployed across different networks 574 and these access points 14 must connect to different services 502, 504 hosted in the public cloud across their life cycle. As described herein, the services can include the authentication service 502, the cloud configuration service 504, a statistics service 576, a log collector service 578, etc. Furthermore, there are different environments 570A, 570B, 570C (such as development, Quality Assurance (QA), and production, or different operator groupings for specific ISPs) running at different locations. It is inconvenient (requires custom build time configuration for each environment 570A, 570B, 570C) and inflexible (service location cannot be changed once burned into firmware—or requires re-flashing firmware to connect to different locations) to statically configure the service locations in the access point 14 firmware.

To address these issues, the centrally managed registry 565 runs at a well-known, stable, and static location. The centrally managed registry 565 is configured by an admin 582 using an admin User Interface (UI), tools, or Application Programming Interfaces (APIs), to map various nodes to service locations they should connect to. The centrally managed registry 565 is configured in all access points 14 during their firmware installation. When the access points 14 power up and perform the Wi-Fi setup process 550, the access points 14 first establish a connection with the centrally managed registry 565. The centrally managed registry 565 queries the access points 14 for metadata information such as serial number, firmware version, public IP address (from which the access point 14 geo-location can be roughly estimated). The centrally managed registry 565 uses the metadata against its internally configured map to determine locations of various services 504, 576, 578 that the access point 14 should connect to. It is the centrally managed registry 565 that sets the locations of the services on the access point 14 and the access point 14 uses these locations to connect to the services 504, 576, 578 in the cloud 12. Any time the access point 14 reboots (potentially on command from the cloud controller), it goes through this same process—thereby allowing the admin 582 to change the service locations over a period of time, and migrate the access points 14 from one service location to another, such as for versioning, upgrades, scalability, high availability, etc. This approach is illustrated in FIG. 14.

The registry-based re-direction approach allows configuration a single service location, i.e., the centrally managed registry 565, in the access point 14 firmware, thereby decoupling the access point 14 firmware from service locations that may change over time, or be different for different environments 570A, 570B, 570C. The centrally managed registry 565 allows cloud based services to migrate over time to accommodate multiple access point firmware versions deployed and supported simultaneously. The centrally managed registry 565 allows cloud based services to scale out horizontally by allocating groups of access points 14 to the particular service instance. The centrally managed registry 565 allows cloud based services to become highly available as access point 14 can fall back on the centrally managed registry 565 to look up another location when the original service becomes unavailable.

Constraining Nodes

Figure 15:
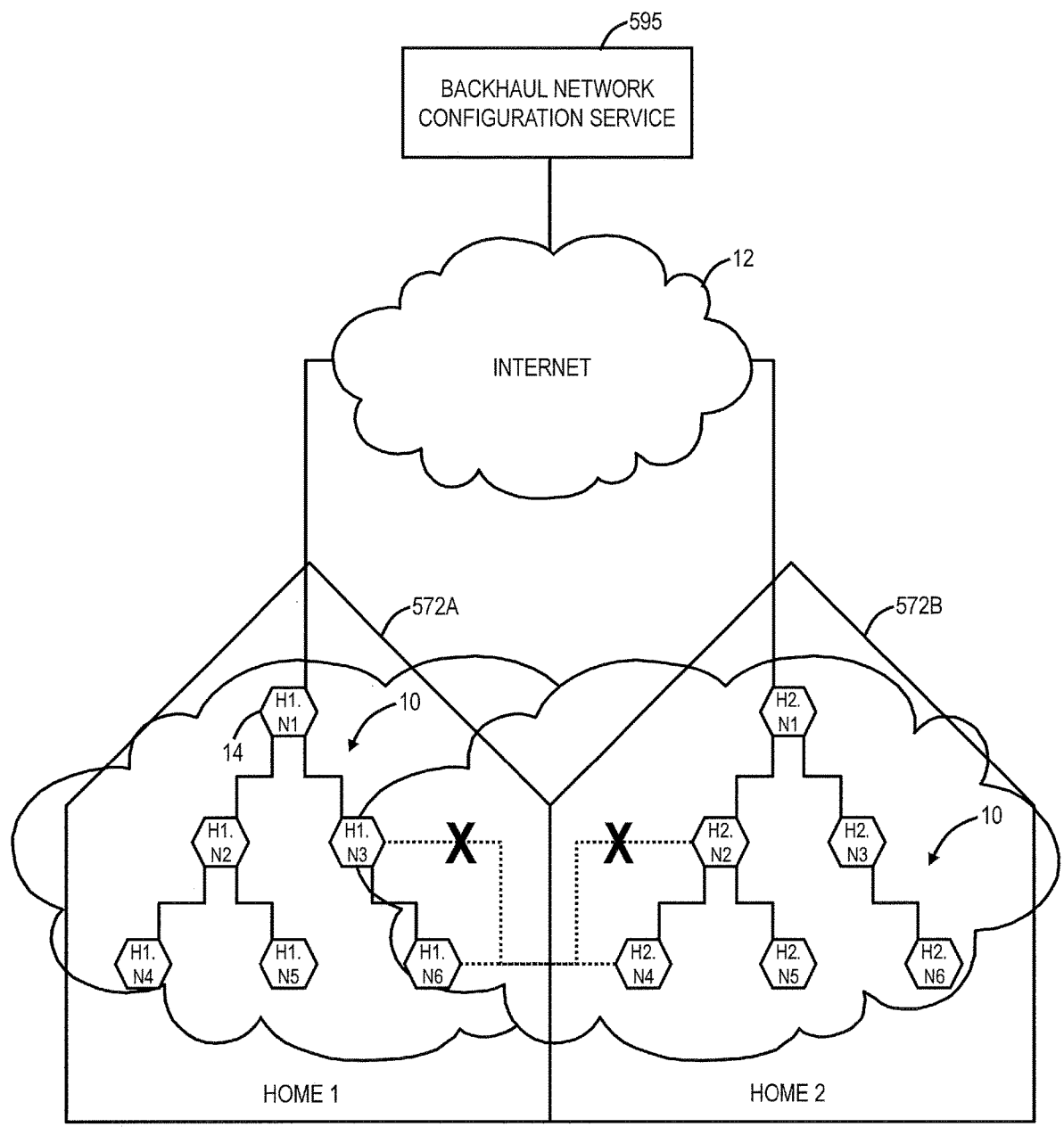
FIG. 15 is a network diagram of two adjacent residences with distributed Wi-Fi systems configured therein.

Referring to FIG. 15, in an exemplary embodiment, a network diagram illustrates two adjacent residences 572A, 572B with distributed Wi-Fi systems 10 configured therein. The distributed Wi-Fi systems 10 include various access points 14 labeled as H1.N1, H1.N2, . . . , H2.N1, H2.N2, . . . where H1 is the residence 502A and H2 is the residence 572B, and Nx is access point x therein (x=1, 2, 3, . . . ). A major concern in the startup of any distributed Wi-Fi system 10 is getting the access points 14 to connect to the correct network. Because wireless signals can travel to a neighboring residence 572A, 572B, there is a risk that an access point 14 will connect to a neighbor's network. It is, therefore, beneficial to establish a system that will constrain access point 14 from connecting to a neighbor's network. In FIG. 15, a backhaul network configuration service 595, connected to the cloud 12 (Internet), is illustrated to constrain access points 14.

As described in the Wi-Fi setup process 550, the access points 14 form the distributed Wi-Fi system 10 by connecting to other access points 14 within the residences 572 over the predefined SSID with the gateway access point 14 connected to the cloud 12 via the wired connection. The predefined SSID can be referred to as a backhaul SSID. In order to form the distributed Wi-Fi systems 10, the same backhaul SSID and authentication mechanism to the SSID are used in all access points 14. When neighboring residences 572 with the distributed Wi-Fi systems 10 are close to each other, access points 14 from one residence 572A (H1.N1 . . . H1.N6) belonging to one customer may be able to see and connect to the SSID broadcast from access points 14 in the neighboring residence 572B (H2.N1 . . . H2.N6). This is undesirable since it will end up running one customer's traffic through another customer's internet connection, and must be avoided.

The backhaul network configuration service 595 is hosted and running in the cloud 12, such as with its location known by the centrally managed registry 565. The backhaul network configuration service 595 and the cloud service 504 ensure all access points 14 can get configured by the backhaul network configuration service 595. When a user obtains a plurality of access points 14 and prior to the Wi-Fi setup process 550, the user can "claim" the access points 14 using a mobile device, mobile application (e.g., iOS or Android), and a Bluetooth beacon beamed from the access points 14. With this information, the backhaul network configuration service 595 knows which access points 14 belong to which distributed Wi-Fi system 10, and the backhaul network configuration service 595 can ensure the access points 14 do not connect to neighboring nodes even though the predefined SSID is visible/connectable. The claimed nodes for each residence 572A, 572B are registered with the backhaul network configuration service 595 such that the backhaul network configuration service 595 knows which access points 14 belong to which residence 572A, 572B. Note, this registration can occur over a network separate from the distributed Wi-Fi system 10, such as a LTE, 3G, other Wi-Fi networks etc., i.e., the mobile device can communicate the claimed nodes via the mobile app to the backhaul network configuration service 595.

In FIG. 15, an exemplary operation is now described. The first access point 14 H1.N1 is a gateway node which connects to the modem/router 18 and to the cloud 12 to connect to the backhaul network configuration service 595. Based on the claiming process, the backhaul network configuration service 595 can submit a list of candidate access points 14 to the first access point 14 H1.N1. For example, the list can be based on each of the access point 14 (H1.N2 . . . H1.N6) MAC addresses. With this list, the access point 14 H1.N1 knows only to allow these nodes to connect to it, i.e., a whitelist. The access point 14 H1.N1 starts a Wi-Fi service with the predefined SSID (backhaul SSID). The access points 14 H1.N2 . . . H1.N6 power up and start looking for the predefined SSID and find the access point 14 H1.N1 hosting the predefined SSID. The access points 14 H1.N2 . . . H1.N6 connect to the access point 14 H1.N1 and are allowed to do so since the access point 14 H1.N1 has been pre-configured to allow them access to the backhaul network configuration service 595. The backhaul network configuration service 595 can configure the access points 14 H1.N2 . . . H1.N6 through the gateway node.

Now, assume the access point 14 H2.N4 from the neighboring residence 572B can see and attempts to connect to the predefined SSID broadcast from the access point 14 H1.N3 from the residence 572A. The access point 14 H1.N3 will deny access to the access point 14 H2.N4 from the residence 572B since it has been configured to only allow access to cohort nodes within its own residence 572A. Of course, this works in the reverse direction.

With the backhaul network configuration service 595, even though access points 14 from neighboring residences 572 can see each other's backhaul SSID's, they are constrained to connect to access points 14 only within their residence 572 based on the claiming process. This ensures Internet traffic from one customer's devices, and nodes only travel on nodes owned and claimed by that customer for his household and eliminates the risk of data privacy since traffic never travels on neighbor's nodes.

The services 502, 504, 576, 578, 595 can be operated on the server 20 or a plurality of servers 20 in the cloud 12. As described herein, the access points 14 can get to the cloud 12 and to the services 502, 504, 576, 578, 595 using the wired connection to the modem/router 18 and the predefined SSID. All of the access points 14 can continue to serve the predefined SSID even after set up, but this predefined SSID is not open. Specifically, the predefined SSID require certificates in the access points 14. The certificates are stored on each of the access point 14 are used to constrain which access points 14 can get to the cloud 12. The backhaul network configuration service 595 is used to constrain which access points 14 can join which distributed Wi-Fi system 10. Also, these techniques can be used to recover from power outages or the like.

Claiming Radios

Again, the distributed Wi-Fi system 10 includes multiple access points 14 capable of operating in either a gateway or bridge mode of operation. The gateway node includes the access point 14 connected to the modem/router 18 whereas the remaining access points 14 in the distributed Wi-Fi system 10 are bridge nodes. Collectively, the access points 14 and associated Wi-Fi client devices 16 in the distributed Wi-Fi system 10 make up a "home network." That is, the access points 14 and associated Wi-Fi client devices 16 typically belong to a single home or apartment, in which each access point 14 is able to communicate in the data and management plane with each other or Wi-Fi client devices 16 belonging to the home network. Communications between the access points 14 or Wi-Fi client devices 16 can be through either wireless or wired technologies. Wired technologies are typically contained within the home network due to their physical nature; however, wireless communications are capable of transmitting between the home network and other networks/locations by way of the ability of wireless communication propagation through walls, floors, roofs, etc. to other neighbors. Therefore, a mechanism to define the boundary of the home network and the access points 14 or Wi-Fi client devices 16 belonging to that home network is required.

Bluetooth Beacon

Bluetooth Low Energy is a wireless personal area networking protocol which can send out a one-way beacon containing specific information about the sending device to inform the receiving device of information such as a status, identification, etc. of the sending device. The Bluetooth beacon is a data packet or series of data packets sent from a device containing a Unique Identification (UUID) marker (e.g., serial number) and product classification of the sending device (e.g., UUID) along with a status indication. The status indication may provide information about the operational state of the sending device, the performance and status of communication ports, and troubleshooting or failure states. Standards such as iBeacon (from Apple) and Eddystone (from Google) are standardized frame formats to send such beacons; however, proprietary approaches may also be used with equivalent functionality.

The access point 14, or another such networking device, may send out Bluetooth beacons with varying power levels to inform a listening device of the identification and status of the sending device. The power level of the wireless beacon may be set to such a power to avoid the transmission through walls or outside of the immediate room, thus limiting the chance of a device in a neighboring home or apartment from receiving the beacon information. This limitation of distance propagation helps isolate the home network discovery range to a confined space, such as a home or apartment. The Bluetooth beacon typically contains a unique identifier to notify a listening device of the identification of the sending device. Additionally, the same or subsequent beacon may contain status information related to the operation or state of the sending device. A listening device, such as a phone or computer, can process the beacon to assist in the provisioning and monitoring of the sending device.

Claiming Devices in a Distributed Wi-Fi Network

Figure 16:
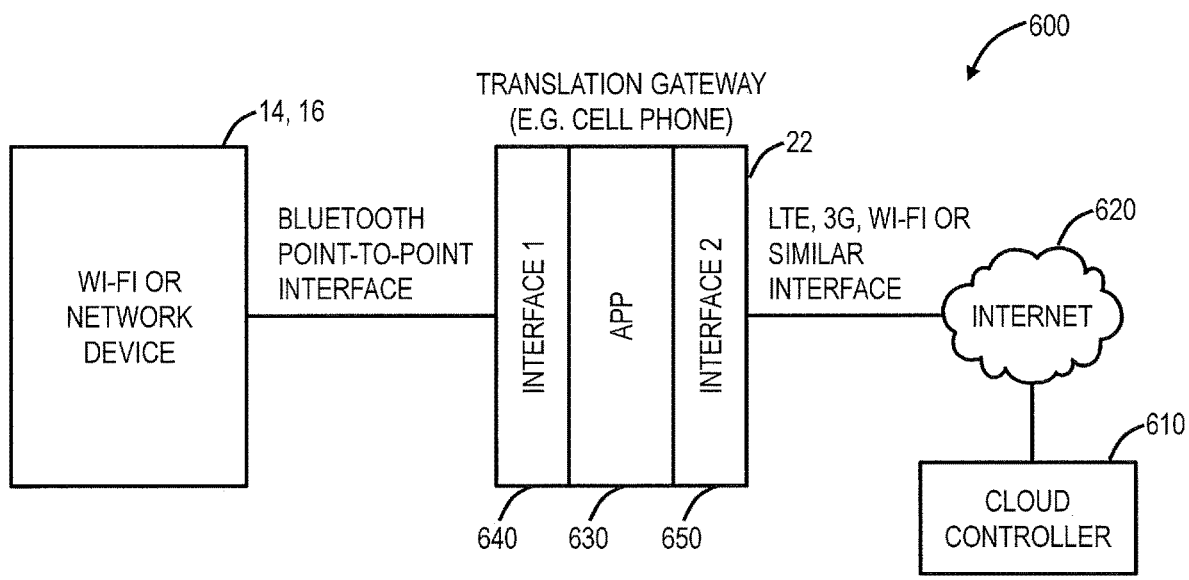
FIG. 16 is a network diagram of a setup for claiming a wireless device for the distributed Wi-Fi system.

Referring to FIG. 16, in an exemplary embodiment, a network diagram illustrates a setup 600 for claiming a wireless device 14, 16 for the distributed Wi-Fi system 10 or other distributed Wi-Fi networks. The setup 600 includes a user device 22 (also this could be one of the Wi-Fi client devices 16) which communicates with both the access point 14 or the Wi-Fi client device 16 and to a cloud controller 610 over the Internet 620. The cloud controller 610 can be the cloud 12 and the servers 20 in the distributed Wi-Fi system 10. The user device 22 includes a similar architecture as shown in FIG. 6. The user device 22 includes a mobile application ("app") 630, a first interface 640, and a second interface 650. In FIG. 6, the app 630 can be one of the programs 216 and the interfaces 640, 650 can be part of the network interfaces 206. The first interface 640 can be a wireless Personal Area Network (PAN) interface, such as Bluetooth. The second interface 650 can be a Wide Area Network (WAN) or Local Area Network (LAN) interface, such as LTE, 3G, Wi-Fi, etc. When the second interface 650 is Wi-Fi, it can operate on a different Wi-Fi network besides the distributed Wi-Fi system 10 as the user device 22 here is used to claim nodes for setting up the distributed Wi-Fi system 10. The app 630 is configured to perform various functions described herein for discovering, claiming, and segmenting (with the cloud controller 610) devices in the distributed Wi-Fi system 10.

Figure 17:
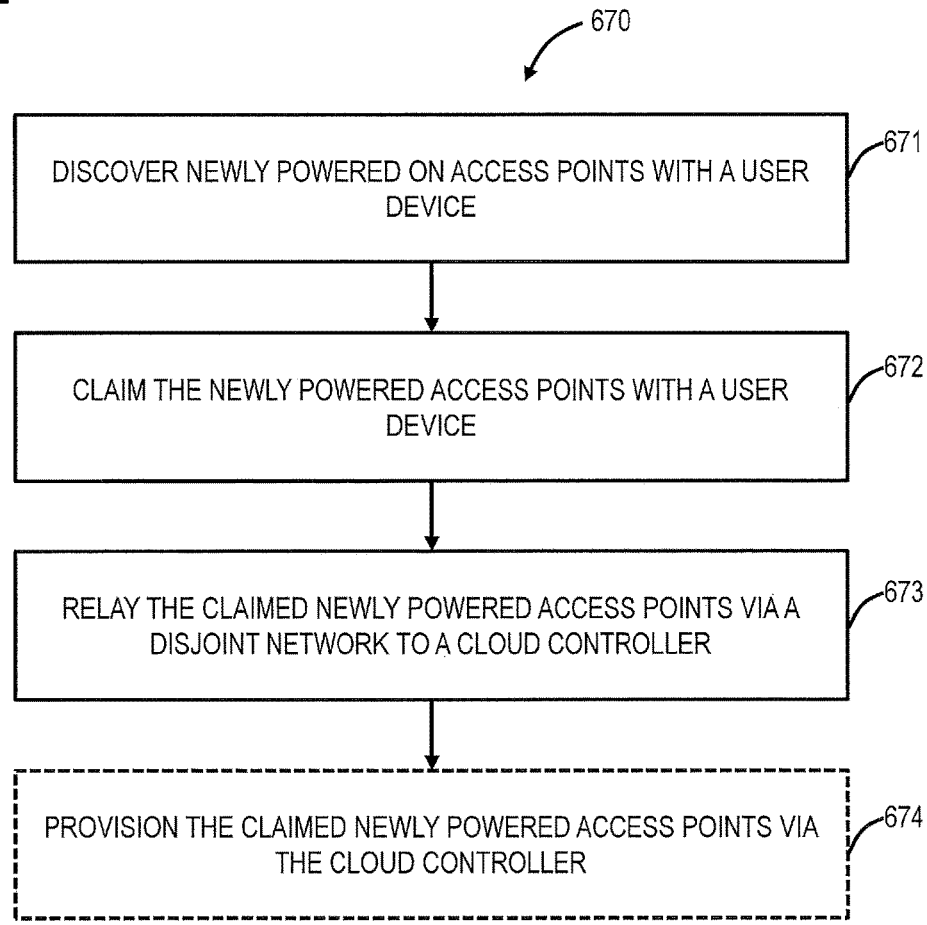
FIG. 17 is a flowchart of a claiming method using the user device to claim access points in the distributed Wi-Fi system.
Figure 22:
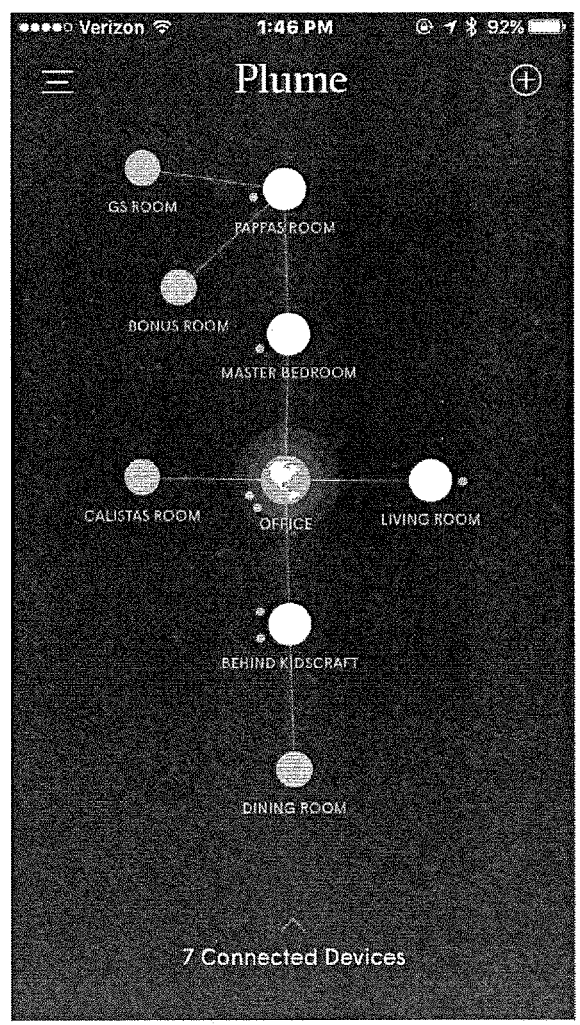
FIG. 22 is a screenshot of the mobile app showing a current configuration of the distributed Wi-Fi system with each access point uniquely claimed and named.

Referring to FIG. 17, in an exemplary embodiment, a flowchart illustrates a claiming method 400 using the user device 22 to claim access points 14 in the distributed Wi-Fi system 10. Referring to FIGS. 18-22, in exemplary embodiments, screen shots illustrate operations in the mobile app 630. FIG. 18 is a screenshot of the mobile app 630 looking for access points 14 ("pods"), FIG. 19 is a screenshot of the mobile app 630 having found access points 14, FIG. 20 is a screenshot of the mobile app 630 looking for an access point 14 for purposes of uniquely identifying the access point 14, FIG. 21 is a screenshot of the mobile app 630 uniquely naming the access point 14, and FIG. 22 is a screenshot of the mobile app 630 showing a current configuration of the distributed Wi-Fi system 10 with each access point 14 uniquely claimed and named.

In FIG. 17, first, the user device 22 can discover newly powered on access points 14 (step 671). The discovery of newly powered on access points 14 can be using Bluetooth or some other wireless PAN connection as described herein. In an exemplary embodiment, the access points 14 are configured with a Bluetooth, Bluetooth Low Energy, or some other wireless PAN interface to broadcast one-way information to the user device 22. Again, the one-way information can include status, identification, etc. of the access point 14. In another exemplary embodiment, the discovery of newly powered on access points 14 can be via a predefined SSID where the newly powered on access points 14 simply communicate the one-way information. For example, the mobile app 630 can be configured to cause the user device 22 to monitor the predefined SSID for the one-way information. Also, the mobile app 630 can communicate back to the newly powered on access points 14 to provide an acknowledgment that the one-way information was received, and, optionally, the newly powered on access points 14 can discontinue transmitting on the predefined SSID. In a further exemplary embodiment, the newly powered on access points 14 can be discovered by the mobile app 630 using a camera associated with the user device 22. For example, the user can point the camera at the newly powered on access points 14, and they can provide the one-way information through unique modulation of a status indicator such as a Light Emitting Diode (LED) on the access points 14. Other techniques are also contemplated for discovering the newly powered on access points 14.

The claiming method 670 is performed by the user device 22 operating the mobile app 630. The discovery of the newly powered on access points 14 in step 671 is performed through the mobile app 630. The discovery of the newly powered on access points 14 is performed locally at a residence, home, location, etc. of the distributed Wi-Fi system 10. In FIG. 18, the user is instructed to "spread remaining pods" which are the access points 14, and the mobile app 630 is configured to look for, i.e., discover the newly powered on access points 14. In FIG. 19, the mobile app 630 has discovered seven access points 14 providing visual indication. Note, the top right access point 14 includes a globe icon indicating this is the gateway node which connects to the modem/router 18 and the remaining access points 14 have a check icon indicating these are Wi-Fi nodes which do not connect to the modem/router 18.

After the newly powered on access points 14 are discovered (step 671), the newly powered on access points 14 are claimed with the user device 22 (step 672). The process of claiming the access points 14 assigns the ownership of the access points 14 to the distributed Wi-Fi system 10. Specifically, only claimed access points 14 are allowed to communicate and operate in the distributed Wi-Fi system 10. In an exemplary embodiment, the access points 14 are automatically claimed based on the discovery and the associated one-way information. Here, the mobile app 630 can automatically claim the access point 14 based on receipt of the one-way information. Optionally, the user can be given a choice to accept the claimed access point 14, via the mobile app 630. Note, the discovery and the automatic claiming based thereon can assign the access points 14 membership in the distributed Wi-Fi system 10, but these approaches do not necessarily provide an exact physical location of each access point 14.

The claiming method 670 can optionally include a location determination of each newly discovered access point 14. In an exemplary embodiment, the location determination is performed subsequent to the claiming step 672. In another exemplary embodiment, the access points 14 are claimed through the location determination. In either approach, the location determination is a process with the mobile app 630 where each access point 14 is uniquely identified based on its location. The location determination process can include the mobile app 630 being in proximity to an access point 14 and the user entering location specific information about the proximate access point 14. For example, the mobile app 630 can use the camera associated with the user device 22 to identify the proximate access point 14. For example, the proximate access point 14 can be identified by the camera based on modulation of some unique information on the status indicator (LED) on the access point 14.

FIG. 20 illustrates the mobile app 630 using the camera on the user device 22 for a unique determination. For example, the user is directed by the mobile app 630 to bring a newly powered on or discovered access point 14 into the view of the hexagon icon on the mobile app 630 by physically moving the user device 22 such that the camera is in view of the newly powered on or discovered access point 14. Once in view, the access point 14 can uniquely identify itself, such as through a Bluetooth communication, a wireless PAN communication, change in the status indicator, etc. For the Bluetooth communication or the wireless PAN communication, the communication can be low power and directed outward from the access point 14 so that the user device 22 can only recognize the access point 14 when it is in close proximity. Being in close proximity would be indicated to the user by showing the access point within the hexagon icon in the mobile app.

Once the access point 14 has its location uniquely determined, the mobile app 630 can allow the user to enter a unique name, such as a room name, location, or any other unique identification information for the user. FIG. 21 is the mobile app 630 with a screen shot for naming the access point 14. Here, the user can use the mobile app 630 to provide a unique name, e.g., Room 10.

Back in FIG. 17, after the claiming step 672, the mobile app 630 is configured to relay the claimed newly powered access points 14 via a disjoint network to the cloud controller 610, cloud service, the servers 20, etc. (step 673). As described herein, the disjoint network is any network besides the distributed Wi-Fi system 10 or the distributed Wi-Fi network associated with the claimed newly powered access points 14. Provisioning of Wi-Fi access points or networking devices from a centralized cloud-based or local management system may require a connection between two disjoint communication networks to pass vital configuration information for the new device to associate securely with the cloud controller 610. For example, the two disjoint communication networks can include a first network (e.g., PAN, Bluetooth, etc.) for the user device 22 to communicate, discover, and claim the access points 14 and a second network (e.g., LTE, 3G, Wi-Fi, etc.) to communicate the claimed access points 14 to the cloud controller 610. An example of disjoint communication networks is a Bluetooth wireless connection and an LTE cellular connection with an Internet gateway. The Bluetooth wireless connection is a point-to-point communication protocol connecting the Wi-Fi access point or networking device with an LTE cellular or Wi-Fi enabled device, such as the user device 22. The user device 22 has interfaces for both disjoint networks and software capable of joining the networks together to pass messages between the two disjoint networks. i.e., the mobile app 630. Protocols and message formats between the disjoint networks may be different, in which case a software or hardware based translator is required to convert the message and protocol formats to match the disjoint network requirements. This can be implemented via the mobile app 630.

Finally, the cloud controller 610 can be configured to provision the claimed newly powered access points 14 (step 674). The configuration can include operational parameters for proper operation in the distributed Wi-Fi system 10 or the distributed Wi-Fi network. Additionally, the configuration includes ensuring the claimed newly powered access points 14 only support communication in the proper Wi-Fi network.

Configured "Packs"

Wi-Fi access points, or other networking devices in the home network, may be configured in "packs" of devices to form a group belonging to the home network. This group can include two or more devices, tied together by a unique identifier. The devices of this pack can be constrained to talking only with other devices of the same pre-configured pack, which can serve among two main functions—limit communications and enable communication to the cloud controller 610. For example, the configured packs can limit communications of the home network to only devices in the pack, thus preventing other devices outside of the home network to join. This provides a level of security to prevent the intentional or accidental joining of unwanted devices into the home network. The configured packs also allow cloud based or a local based provisioning and monitoring by the cloud controller 610 to apply or read parameters and statistics only pertaining to devices belonging to the pack of the home network.

One or more devices may be added to the "pack" making up the home network at any time by adding the new device(s)' unique identifier to the pack definition, such as via the mobile app 630, a web portal, etc. The pack definition of unique identifiers belonging to the home network may reside in the cloud controller 610 or a local management system. A new Wi-Fi or other networking device ordered by the administrator/owner of the home network, and known to be destined to be added to the home network, may be pre-configured in the factory, distribution or retail supply chain to belong to a new or existing home network. The preconfigured device can then automatically associate and authenticate with the destined home network and be automatically added, provisioned and monitored without input from the administrator/owner. The pre-configured provisioning information may also be supplied directly to the cloud controller 610 or local management system instead of the Wi-Fi access point 14 or networking device. When the associated Wi-Fi access point 14 or networking device is discovered by the home network management plane, the unique identifier is matched to the provisioning profile of the pre-configured settings saved on the cloud controller 610 or local management system, therefore allowing the correct provisioning and monitoring of the device in the home network. This zero-touch onboarding allows for significant ease of operation. For example, the newly ordered access points 14 can be uniquely tagged to the user who ordered them, such as through an account on the cloud controller 610.

Pre-Configuration

The pre-configuration of the new device may be determined at the time an order is placed by an end administrator/owner, or at any time in the e-commerce, commerce or logistics process in which the end home network is known. Again, this can be tied to the administrator/owner such as via an account on the cloud controller 610. The moments in which the pre-configuration may occur include the following: manufacturing of the device, packing of the device when being prepared to be shipped to a pack-out facility, at the pack-out facility before being placed in the final customer packaging, etc. The pre-configuration can further occur before shipment to the distributor or retail partner but after it is packed in the final customer packaging. This can be achieved by knowing the unique identifier of the package contents and pre-configuring the device in the cloud controller 610 or a local based management server of the home network. The pre-configuration can further occur during the checkout process at a retail store, in which the unique identifier of the package contents can be bound to pre-configuring the device in the cloud controller 610 or a local based management server of the home network.

The pre-configuring can be in two related scenarios. First, a pack of access points 14 can be configured such that all access points 14 in the pack are pre-configured to connect with one another, but not pre-configured to a particular user or network. Here, only one access point 14 needs to be claimed in order to associate with a particular user or network. The remaining access points 14 can be automatically claimed to the particular user or network based on the pre-configuration with the claimed access point 14 in the pack. Second, the pack could be pre-configured not only to connect with each other, but pre-associated to the particular user or network, in which case no user intervention is required to claim the access points. The first scenario works when the pack is bought at retail and the second scenario works when the pack is ordered with an association to a particular account.

Wi-Fi Topology

The systems and methods described herein provide techniques for orchestrating the realization of a target topology from an initial topology in a Wi-Fi network including a plurality of distributed access points 14. For example, the systems and methods contemplate operation with the distributed Wi-Fi system 10 as well as other distributed Wi-Fi networks such as the Wi-Fi mesh network 32, the Wi-Fi repeater network 33, etc. As described herein, a topology of the Wi-Fi network can be described by parent-child relationships between a set of nodes, i.e., access points 14. The topology may also optionally include the parent-child relationships of access points 14 with Wi-Fi client devices 16. The parent-child relationships can be the backhaul links and can include, for example, frequency bands, channels, and channel widths for each link. A topology change can be realized by issuing a set of commands to the nodes, such as by the cloud 12, the cloud controller, the cloud-based service, etc., instructing the access points 14 to configure the radios 104 to achieve the desired state. Commands may also be sent to the Wi-Fi client devices 16 to induce them to change channels, or connect to a different access point 14.

Figure 23:
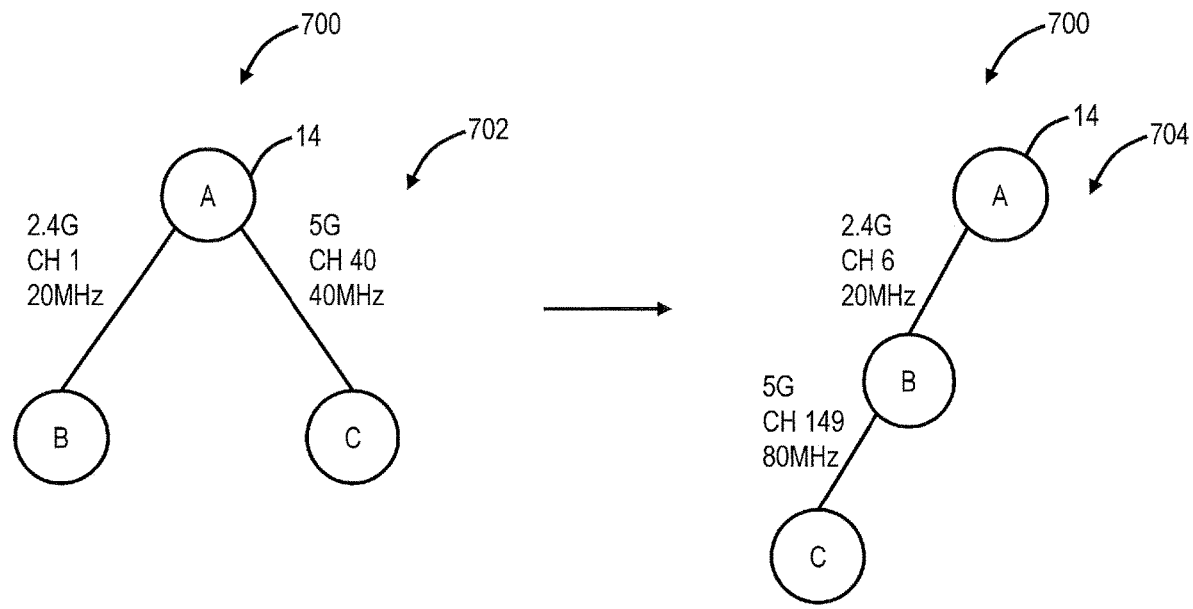
FIG. 23 is a network diagram of a three node Wi-Fi network in a first topology state and a second topology state.

Referring to FIG. 23, in an exemplary embodiment, a network diagram illustrates a three node Wi-Fi network 700 in a first topology state 702 and a second topology state 704. The Wi-Fi network 700 includes three access points 14, labeled as nodes A, B, C, with each operating a 2.4G and a 5G radio 104. In the first topology state 702, the node A is a parent node connected to node B on a backhaul link on the 2.4G radio, Ch. 1, 20 MHz and to node C on a backhaul link on the 5G radio, Ch. 40, 40 MHz. The Wi-Fi network 700 changes its topology to the second topology state 704 with the node A the parent node to the node B with a backhaul link on the 2.4G radio, Ch. 6, 20 Hz, and the node B the parent node to the node C with a backhaul link on the 5G radio, Ch. 149, 80 MHz.

Wi-Fi Topology Change Processes

Figure 24:
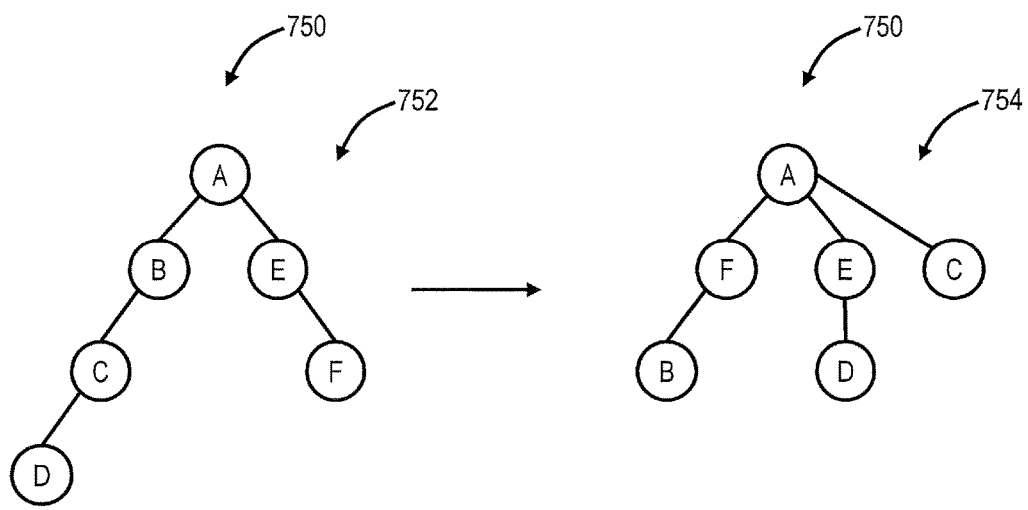
FIG. 24 is a network diagram of a six-node Wi-Fi network in a first topology state and a second topology state.
Figure 25:
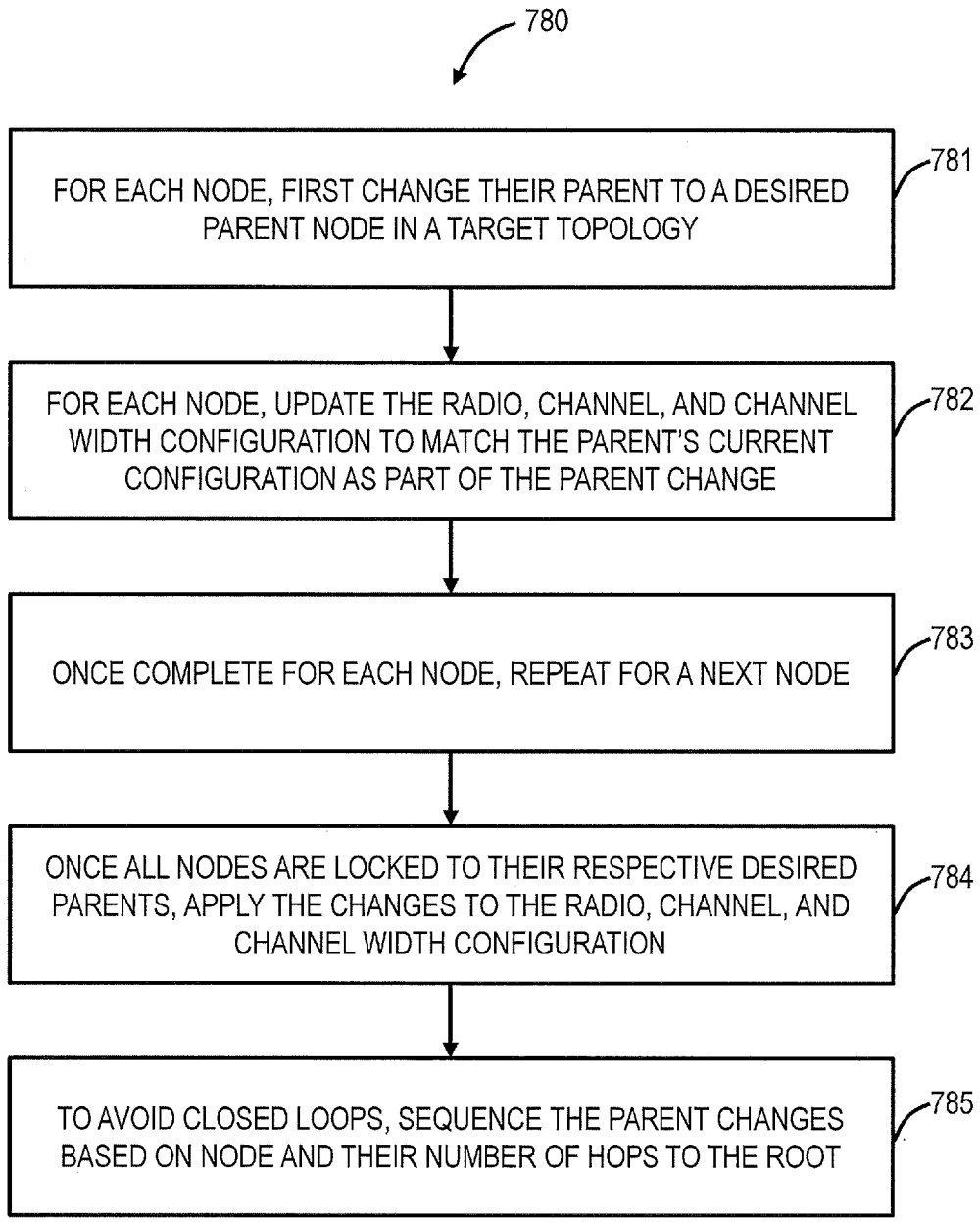
FIG. 25 is a flowchart of a first process for topology change in the Wi-Fi network of FIG. 24 performing operations sequentially.
Figure 26:
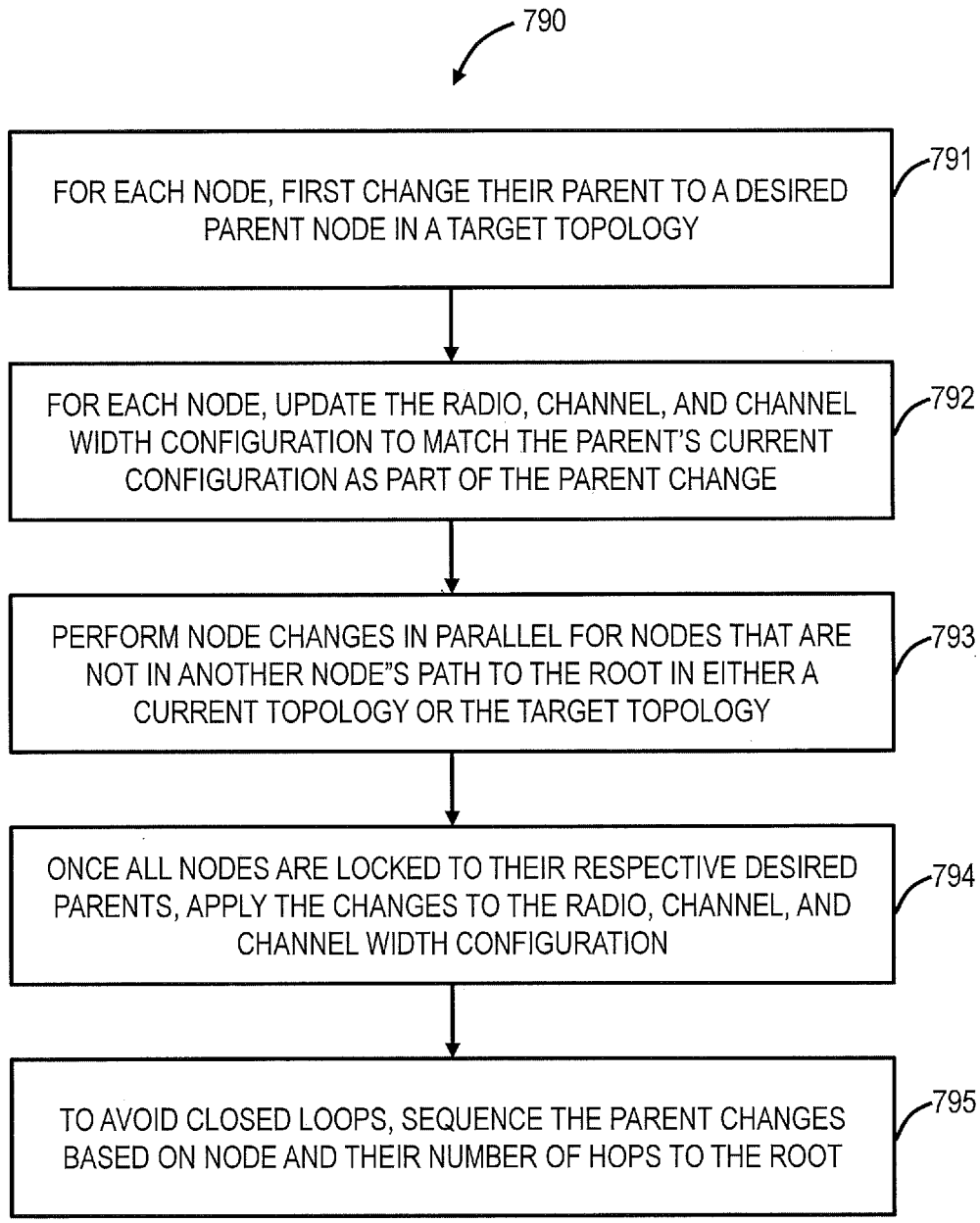
FIG. 26 is a flowchart of a second process for topology change in the Wi-Fi network of FIG. 24 performing parallel changes.
Figure 27:
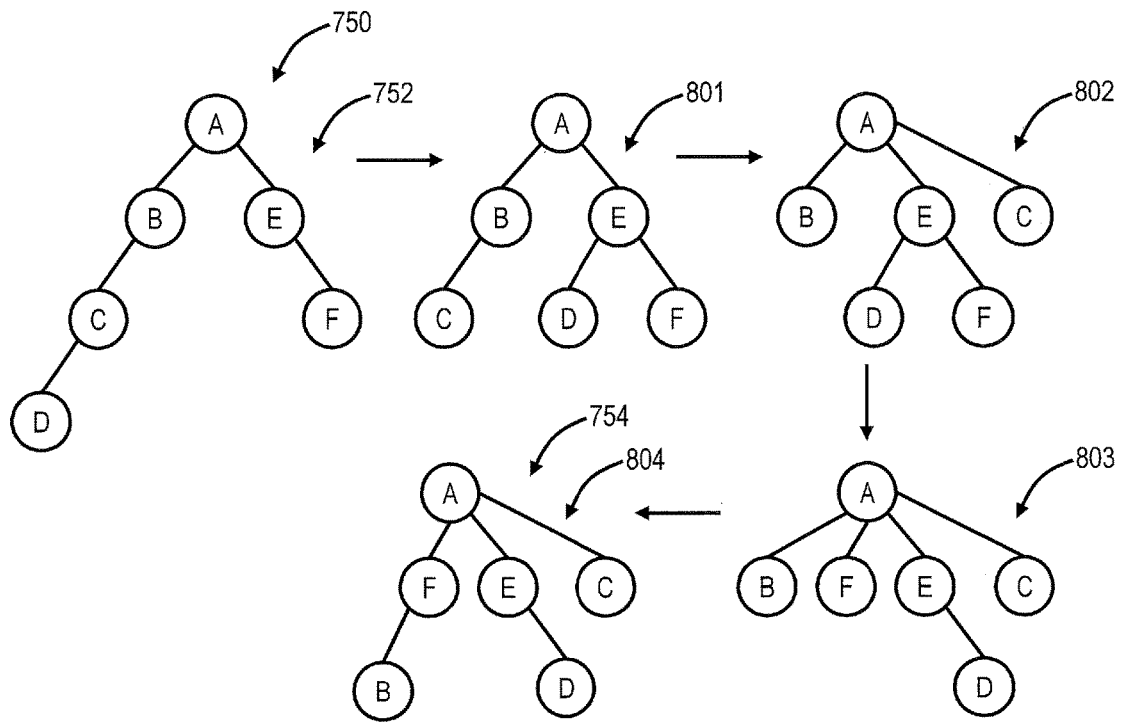
FIG. 27 is a network diagram of the Wi-Fi network of FIG. 24 and an exemplary operation of the first process of FIG. 26.
Figure 28:
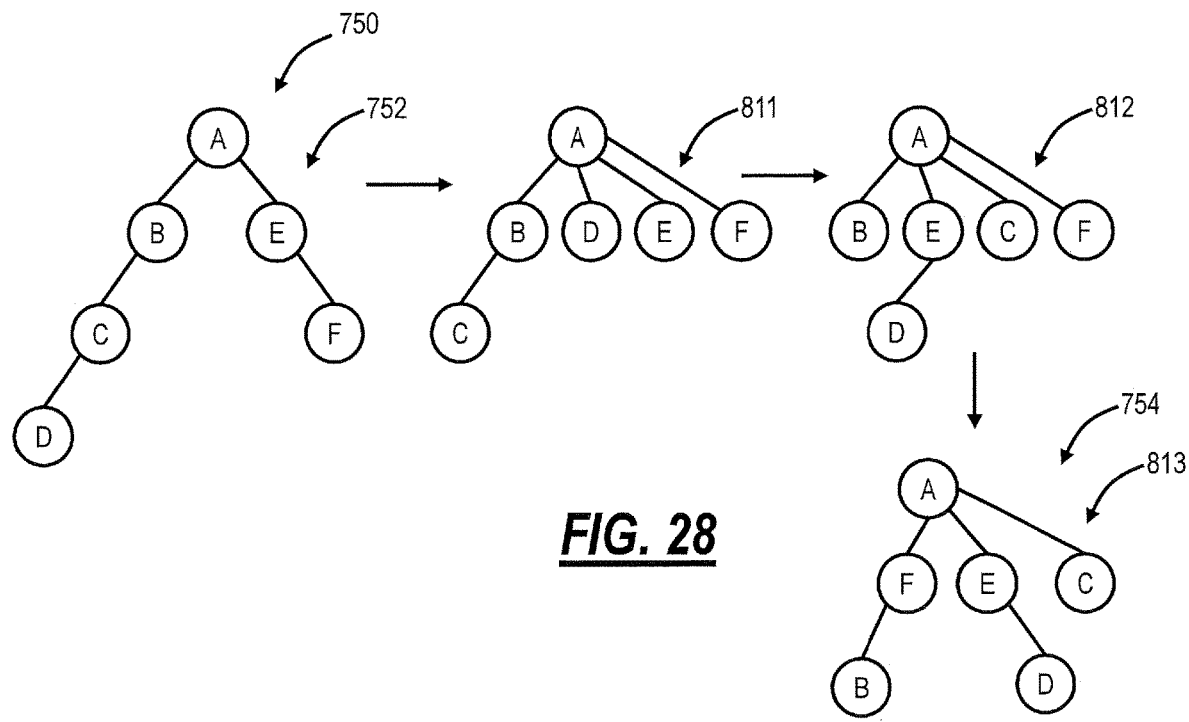
FIG. 28 is a network diagram of the Wi-Fi network of FIG. 8 and an exemplary operation of the second process of FIG. 26.

Referring to FIG. 24, in an exemplary embodiment, a network diagram illustrates a six-node Wi-Fi network 750 in a first topology state 752 and a second topology state 754. The Wi-Fi network 750 includes six nodes A-F. Referring to FIG. 25, in an exemplary embodiment, a flowchart illustrates a first process 780 for topology change in the Wi-Fi network 750 performing operations sequentially. Referring to FIG. 26, in an exemplary embodiment, a flowchart illustrates a second process 790 for topology change in the Wi-Fi network 750 performing parallel changes. Referring to FIG. 27, in an exemplary embodiment, a network diagram illustrates the Wi-Fi network 750 and an exemplary operation of the first process 780. Referring to FIG. 28, in an exemplary embodiment, a network diagram illustrates the Wi-Fi network 750 and an exemplary operation of the second process 790.

The first process 780 includes, for each node, first change their parent to the desired parent node in the target topology, i.e., the second topology state 754 (step 781). If necessary, the radio, channel, and channel width configuration is updated to match the target parent's current configuration as part of the parent change command (step 782). The first process 780 includes waiting until the parent change finishes before moving to the next node to repeat steps 781, 782 (step 783). Once all nodes are locked to their respective desired parents, the desired radio, channels, and channel width configurations are applied for all the nodes (step 784). To avoid forming closed loops with no path to the root node/Internet (i.e., through the gateway node), the parent changes can be sequenced starting with nodes that have the greatest number of hops to the root (step 785).

The second process 790 is similar to the first process 780 with optimization. Specifically, the second process 790 includes, for each node, first change their parent to the desired parent node in the target topology, i.e., the second topology state 754 (step 791). If necessary, the radio, channel, and channel width configuration is updated to match the target parent's current configuration as part of the parent change command (step 792). Instead of performing the operations in steps 791, 792 sequentially, i.e., "one at a time," the second process 790 includes an optimization to reduce the overall time taken to realize the target topology state 754. The second process 790 includes performing sets of compatible operations in parallel (step 793). A set of parent change operations is compatible if for the set of nodes to be operated on, no node can be in another node's path to the root in the either the current topology or the target topology. This ensures that each node maintains connectivity to the Internet immediately before and after each operation. Once all nodes are locked to their respective desired parents, the desired radio, channels, and channel width configurations are applied to all the nodes (step 794). To avoid forming closed loops with no path to the root node/Internet (i.e., through the gateway node), the parent changes can be sequenced starting with nodes that have the greatest number of hops to the root (step 795).

FIG. 27 illustrates an operation of the first process 780. First, the Wi-Fi network 750 is in the first topology state 752. In the first process 780, the Wi-Fi network 750 goes through four steps 801, 802, 803, 804 between the first topology state 752 and the second topology state 754. First, in step 801, the first node selected, node D, is switched from its current parent node C to its new parent node E. Second, in step 802, the second node selected, node C, is switched from its current parent node B to its new parent node A. Third, in step 803, the third node selected, node F, is switched from its current parent node E to its new parent node A. Finally, in step 804, the fourth node selected, node B, is switched from its current parent node A to its new parent node F. After step 804, the Wi-Fi network 750 is now in the target topology, i.e., the second topology state 754. Note, the nodes are switched from current parent nodes to the new, desired parent nodes when they have no child nodes. The nodes are moved sequentially, one-at-a-time. The first process 780 can select each node to be moved at each step by selecting the node furthest from the root (by a number of hops) with no children.

FIG. 28 illustrates an operation of the second process 790. Again, the Wi-Fi network 750 starts in the first topology state 752. In the second process 790, the Wi-Fi network 750 goes through three steps 811, 812, 813 between the first topology state 752 and the second topology state 754, i.e., the second process 790 eliminates a step from the first process 780 through the optimization. First, in step 811, a group of nodes is selected including nodes D, F to move concurrently since neither node D or node F is on the same path to the root node A in either the original or final topology. The nodes D, F are moved to their new parent node A. Second, in step 812, a groups of nodes is selected including nodes C, D to move concurrently since neither node C or node D is on the same path to the root node A. Finally, in step 812, node B is selected and moved to its new parent node F. After step 813, the Wi-Fi network 750 is now in the target topology, i.e., the second topology state 754.

With respect to steps 784, 794, in an exemplary embodiment, the node movement in the steps 783, 793 can initially be performed by having the child node associate or connect to the new parent node with current settings, i.e., radio, channel, and channel width. The newly selected settings, i.e., radio, channel, and channel width, can be applied at once while the Wi-Fi network 750 is in the new topology state 752. Accordingly, connectivity remains in the Wi-Fi network 750 during the topology change processes 780, 790. That is, there is always a path to the root in the Wi-Fi network 750 since the nodes are moved child by child with the children being moved having no children of their own as they are moved. Also, the cloud service and/or the Wi-Fi network 750 can move any Wi-Fi client devices 16 prior to moving a node, further ensuring no data loss due to the topology change. Further, the topology change processes 780, 790 can be implemented during low load times, e.g., late night.

Firmware/Software Updates

Figure 29:
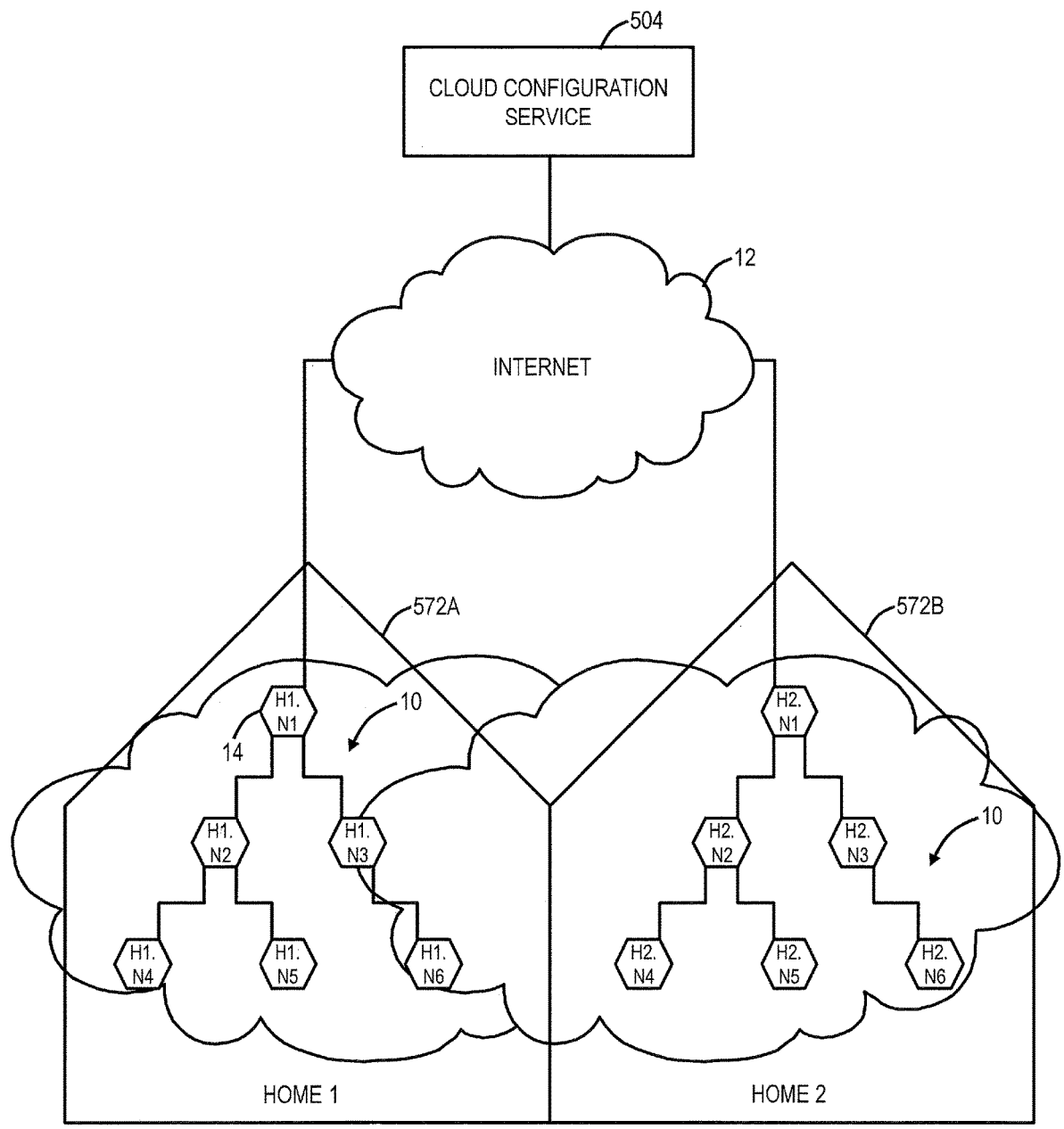
FIG. 29 is a network diagram of firmware updates via a cloud configuration service connected to one or more distributed Wi-Fi systems.

Referring to FIG. 29, in an exemplary embodiment, a network diagram illustrates firmware updates via a cloud configuration service 504 connected to one or more distributed Wi-Fi systems 10. A closely related problem to the topology change problem is how to update the firmware/software on all devices in the network (e.g., the distributed Wi-Fi system 10 or any other distributed Wi-Fi network). Similar to the topology change problem, it is important to update the firmware/software in the devices in a sequence that ensures that the network will not get trapped mid-way through the procedure, or that some nodes will be left out of the updating process.

In FIG. 29, there are two locations 572A, 572B, i.e., residences, etc., each with a distributed Wi-Fi system 10 with a plurality of access points 14 (nodes labeled as H1.N1, H1, N2, etc. where H is the home and N is the node number). Again, the various systems and methods described herein contemplate use with the distributed Wi-Fi system 10 as well as other types of Wi-Fi networks. The distributed Wi-Fi network is provided by several nodes at the locations 572A, 572B that are managed by the cloud configuration service 504, and must work in unison within a home, and in some instances work cooperatively between homes. In order to eliminate problems related to version mismatches, it is imperative that firmware versions of all the nodes within a location (e.g. 572A, 572B), and in some cases even across locations, get upgraded in a transactional all-or-nothing manner. Accordingly, the approach must ensure "no node is left behind."

Figure 30:
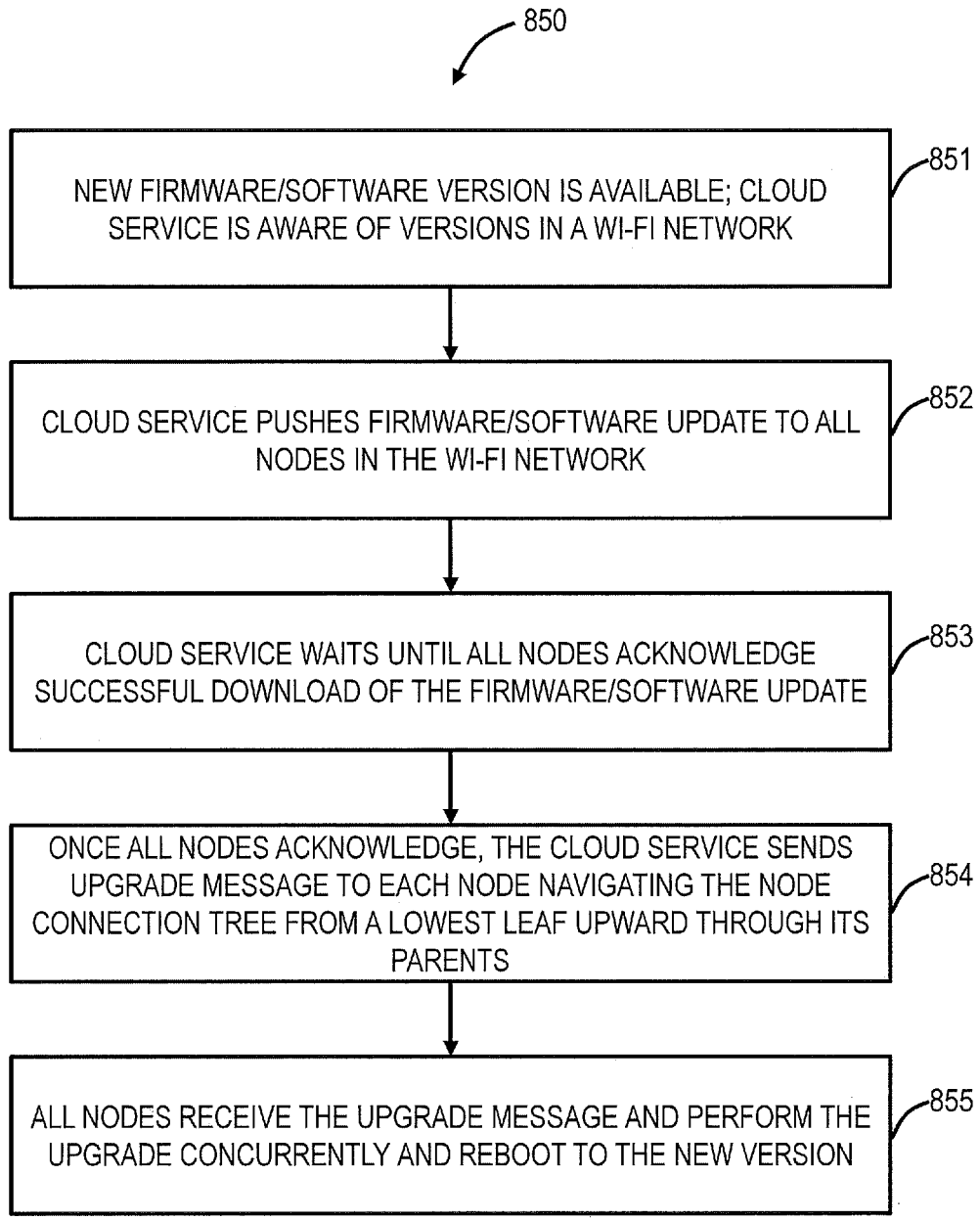
FIG. 30 is a flowchart of a firmware upgrade process for distributed Wi-Fi networks.

Referring to FIG. 30, in an exemplary embodiment, a flowchart illustrates a firmware upgrade process 850 for distributed Wi-Fi networks. The firmware updates are provided by the cloud configuration service 504 via the cloud 12. These upgrades can be referred to as Over The Air (OTA) firmware upgrades to all nodes within a location 572. The firmware upgrade process 850 uses the concept of two-phase commit—wherein the first phase (prepare-to-commit) which is more complicated and prone to failure, is completed across all nodes before a second phase performs a very quick transaction commit applied in succession to all nodes in the order that minimizes the probability of failure.

The cloud configuration service 504 can also be referred to or include an OTA firmware update service (or simply OTA service). The cloud configuration service 504 has a priori knowledge of which nodes H1.N1, etc. belong together in the location 572. That is, the cloud configuration service 504 can include a registry or database of which Wi-Fi networks are under its control, which nodes are associated with each Wi-Fi network and operational parameters of the nodes including current firmware/software versions.

The upgrade process 850 includes a new firmware/software version becoming available and the cloud configuration service 504 being aware of which nodes require this version (step 851). For example, an administrator prepares a new version (e.g., v0.2) and initiates an OTA service process to upgrade nodes from a previous version (e.g., v0.1) to the new version (e.g., v0.2). The cloud configuration service 504 pushes the firmware/software update to all nodes in a Wi-Fi network (step 852). The upgrade process 650 can operate on different locations 572A, 572B simultaneously. For example, the OTA service first pushes firmware update image to all nodes—this is a time-consuming activity prone to failure. This is equivalent to "prepare-to-commit" or the first phase of the two-phase commit protocol.

The cloud configuration service 504 waits until all node acknowledge successful download of the firmware/software update to all nodes in the Wi-Fi network (step 853). This is equivalent to "prepared-to-commit" or successful completion of the first phase of the two-phase commit protocol. Note, if any of the nodes fail to download the firmware/software update, the upgrade process 850 will not upgrade any of the nodes within that Wi-Fi network. For example, the upgrade process 850 can repeat from step 852 if any node fails to download.

Once all nodes successfully acknowledge completion of the first phase of the two-phase commit protocol, the cloud configuration service 504 sends an upgrade message to each node in a sequence or group which navigates the sending based on a node connection tree of the Wi-Fi network from the lowest leaf upward through its parents (step 854). The navigation of sending the upgrade messages ensures no node will disconnect within the second phase of the two-phase commit protocol. All nodes receive the upgrade message and perform the upgrade concurrently and reboot to the new version (step 855).

All nodes within the location 504 have to collaborate and work together with the same versions of services 504 running in the cloud 12. When cloud service versions evolve, firmware/software on all nodes has to be evolved to match the capabilities of cloud service. This two-phase commit upgrade process 850 ensures that all nodes within a location 572 will upgrade to the same version together, and minimize or eliminate the risk of nodes failing due to version mismatch.

Optimization of Distributed Wi-Fi Networks Over Multiple Timescales

Figure 31:
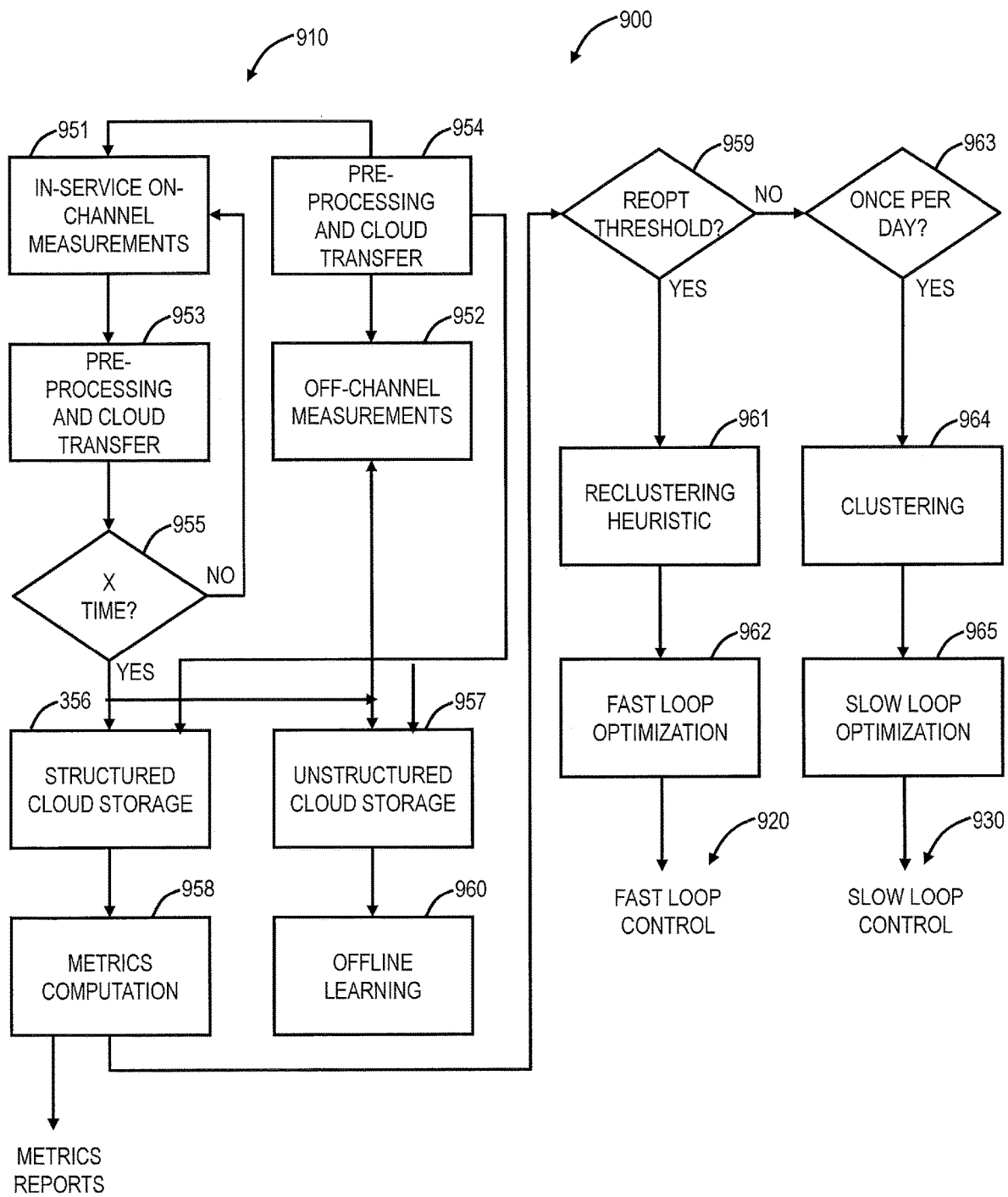
FIG. 31 is a flowchart of an optimization method for a distributed Wi-Fi network performed over multiple timescales.
Figure 32:
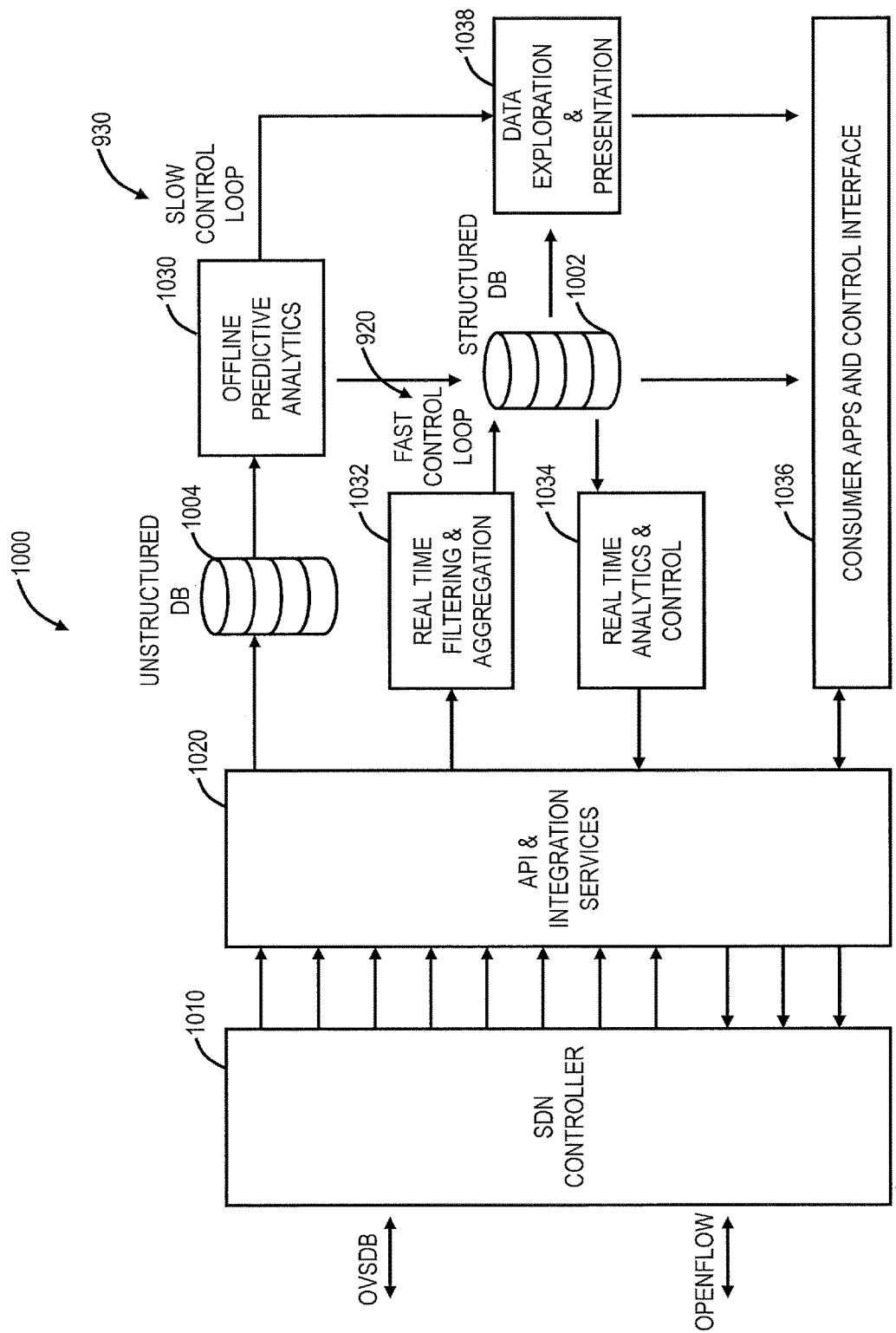
FIG. 32 is a block diagram of a cloud system for implementing the slow and fast control loops associated with the optimization.

Referring to FIG. 31, in an exemplary embodiment, a flowchart illustrates an optimization method 900 for a distributed Wi-Fi network performed over multiple timescales. Referring to FIG. 32, in an exemplary embodiment, a block diagram illustrates a cloud system 1000 for implementing the slow and fast control loops associated with the optimization 900. The optimization method 900 contemplates operation by the cloud system 1000 (i.e., a cloud service, cloud controller, etc.) to optimize any distributed Wi-Fi network. Again, a distributed Wi-Fi network can include the distributed Wi-Fi system 10, the Wi-Fi mesh network 32, the Wi-Fi repeater network 33, etc. As described herein, the distributed Wi-Fi network includes multiple interconnected nodes in a topology which can be adjusted based on the optimization 70. The topology is formed by a plurality of backhaul links which wirelessly connect the access points 14 to one another. The optimization 70 can be performed periodically to determine an optimal topology in terms of node connectivity, radio (2.4G/5G), channel, channel width, etc.

The optimization method 900 includes data collection steps 910, a fast control loop 920, and a slow control loop 930. The optimization method 900 performs the optimization 70 over multiple timescales including proactive long-term optimization (the slow loop control 930) and short-term optimization (the fast loop control 920). The slow loop control 930 is performed periodically. One advantage to the slow optimization loop is that its result does not need to be applied immediately. Rather, the result of the slow loop optimization can be applied at times when the load on the Wi-Fi network is low. Further, the slow loop optimization itself can be performed on a scheduled basis or delayed until it is convenient to do the optimization. For example, the optimization could be delayed until the load on compute resources is lower, or compute costs are lower. The long-term optimization in the slow loop control 930 is based on trend behavior that does not fluctuate rapidly. The long-term optimization in the slow loop control 930 is complemented by the short-term optimization (the fast loop control 930) that adapts the Wi-Fi network to fluctuations around the long-term forecasts on finer timescales. An advantage to the short-term optimization is that it can be in reaction to quickly changing network conditions, and therefore can be applied very soon after the optimization is completed. The fast loop control 920 and the slow control loop 930 can use different objective function weightings regarding an amount of disruption to the Wi-Fi network a particular new set of network parameters would cause.

The data collection steps 910 include in-service on-channel measurements 951 where the access points 14 collect measurements and statistics on the home channel on which it is operating and off-channel measurements 952 where the access points 14 can periodically switch off of the home channel and measure other channels (i.e., channels other than the home channel). The data collection steps 910 can include pre-processing of the data and cloud transfer (steps 953, 954) where the data (measurements, statistics, etc.) are provided from the access points 14 to the cloud system 1000. The measurements can be obtained periodically (step 955).

The measurements can be stored in the cloud system 1000 in structured cloud storage in a structured database 1002 (step 956) and in unstructured cloud storage in an unstructured database 1004 (step 957). The structured cloud storage can be used to compute metrics (step 958) which can be reported and/or used to determine a re-optimization threshold (step 959). The unstructured storage can be used for offline learning (step 960) such as using big data analytics, machine learning, etc.

The re-optimization threshold (step 959) determines if the metrics indicate the Wi-Fi network needs to be re-optimized now based on fast changing conditions, i.e., for the fast loop control 920. If so, a reclustering heuristic may be used (step 961) for fast loop optimization (step 962). Periodically, such as once per day (step 963), clustering (step 964) may be performed for the slow loop optimization (step 965). The clustering step balances the benefits of keeping the number of devices to be jointly optimized small, and the disadvantages of optimizing neighboring portions of the network separately, degrading the ability to reach an overall optimum when considering all devices within a physical region.

The long-term optimization could be triggered simply on the basis of time of a time period being reached. For example, it might be triggered once per day, in the middle of the night, when both more compute loads for the optimization are lower, and any disruption in deploying the results of the optimization into the user's network will be less disruptive. The long-term optimization could also be triggered by measurements crossing any type of threshold similar to some of the methods for triggering short term optimizations. However, the long-term optimization thresholds might be different. The short-term optimizations are undesirable to trigger too often, as they run immediately and create potential computing load and disruption repeatedly. However, the long-term optimizations, if constrained to running only occasionally and at convenient times, are much less desirable. Therefore, the triggers that might queue a long-term optimization for later can be tighter, ensuring that the network is driven closer to its true optimum state over a period of time.

The long-term optimization (the slow loop control 930) could be driven by the history and forecasts of: network traffic, capacities between access points 14, capacities between access points 14 and Wi-Fi client devices 16, channel availability, etc. for several hours into the future. The forecasts could include characterizations of peak periods, statistics of client capacities and channel business obtained from historical data spanning weeks to months. The long-term optimization could be carried out across several neighboring homes that are grouped together based on the high levels of impact that activity at a home has on performance at neighboring homes (i.e., clustering). The output of the long-term optimization could be in the form of a single network configuration or a schedule of network configurations that identifies the configuration to use for different segments of time.

The short-term optimization (the fast loop control 920) adapts to fluctuations in the network traffic load and interference conditions on the timescales of tens of seconds to several minutes. The optimization could be triggered by detecting shifts in network conditions or degradation in performance using filtered, aggregated short-term data or when deviations from the long-term forecasts are observed, based on the metrics. The fast loop control 920 is driven by forecasts over short time horizons based on measurements collected in the recent past as well as long-term historical data and the results of the slow loop control 930. The fast loop control 920 could be more localized than the slow loop control 930, and could be carried out to determine the configuration of a single home or a smaller group of homes (reclustering heuristic) in order to reduce computation time and enable near real-time control of the network. However, the fast loop control 920 could take into account the impact of any changes on the larger cluster of homes used in the slow loop control 930.

It is not necessary that the network parameters optimized as part of the fast loop control 320 be identical to the slow loop control 930. The fast loop control 920 could consider a subset of the parameters to make the computation and control more efficient or consider other parameters that are not set by the slow loop control 930. For example, the fast loop control 920 can focus on channel assignments and channel bandwidth as opposed to topology changes. The fast loop control 920 could also take into account the overhead and disruption imposed in changing the network configuration during a busy period. Different configuration changes could be assigned costs that vary based on the control operations, and the optimization could find a new configuration that balances the performance improvement achieved with the cost of transitioning to the new configuration.

FIG. 32 illustrates the cloud based system 1000. In an exemplary embodiment, the cloud based system 1000 can include a Software Defined Networking (SDN) controller 1010 with OpenFlow interfaces and Open vSwitch Database Management Protocol (OVSDB) interfaces. The SDN controller 1010 can connect with Application Programming Interfaces (APIs) and services 1020. The unstructured database 1004 can connect to the APIs and services 1020 and to an offline predictive analytics service 1030 which can be configured to implement the slow control loop 930. A real-time filtering and aggregation service 1032 can connect to the APIs and services 1020 and implement the fast control loop 920. The structured database 1002 can receive data from the fast control loop 920 and the offline predictive analytics service 430 and provide input to a real-time analytics and control service 1034, consumer apps and control interface 1036, and a data exploration and presentation service 1038.

Optimization Process

Figure 4:
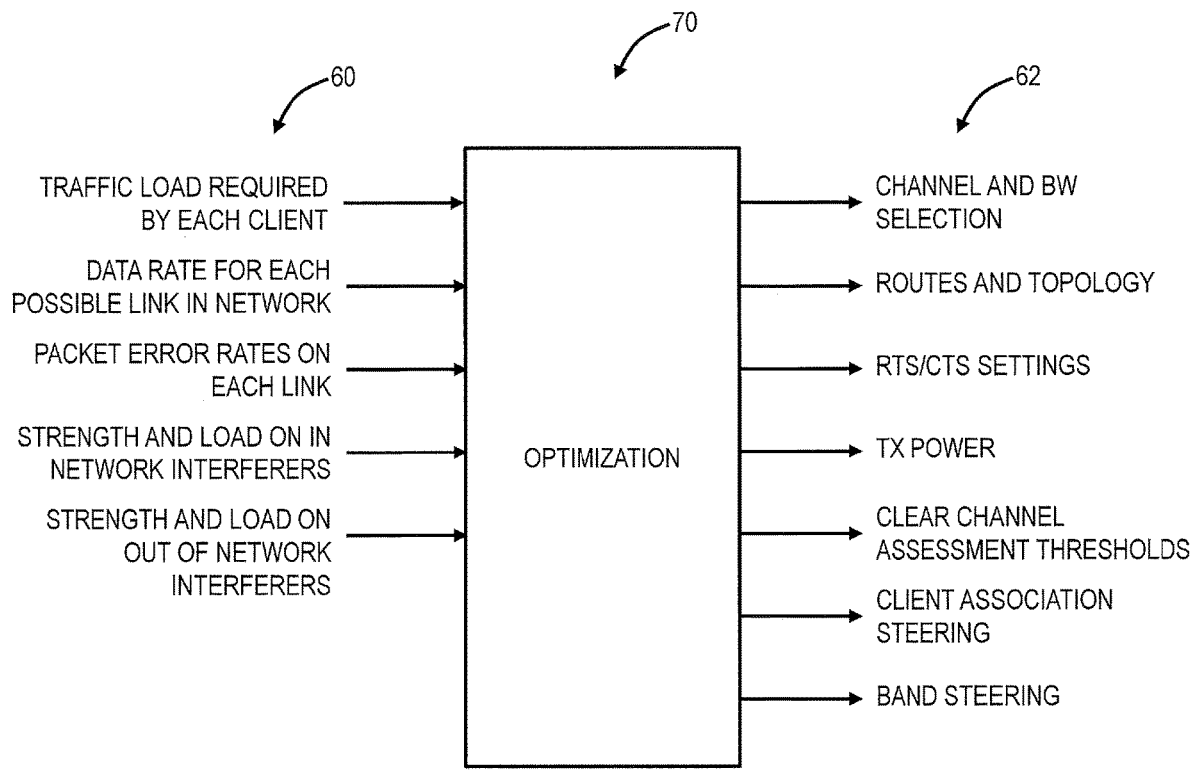
FIG. 4 is a block diagram of inputs and outputs to an optimization as part of the configuration and optimization process of FIG. 3.

Again, referring back to FIG. 4, the optimization 70 takes as inputs 60 measurements that are made by each of the access points 14 deployed throughout a location. These measurements could include, but are not limited to, the traffic load required by each client 16, the signal strengths and data rate that can be maintained between each of the access points 14 and from each of the access points 14 to each of the clients 16, the packet error rates in the links between the access points 14 and between the access points 14 and the clients 16, etc. In addition, the access points 14 make measurements of the interference levels affecting the distributed Wi-Fi system 10. This includes interference from other cloud controlled distributed Wi-Fi systems 10 ("in-network interferers"), and interference coming from devices that are not part of the controllable network ("out-of-network interferers"). It is important to make a distinction between these types of interferers. In-network interferers can be controlled by the cloud service, and therefore can be included in a large optimization over all in-network systems. Out of network interferers cannot be controlled from the cloud service, and therefore their interference cannot be moved to another channel or otherwise changed. The distributed Wi-Fi system 10 must adapt around them, rather than changing them. These out-of-network interferers include Wi-Fi networks that are not cloud controlled, and non-Wi-Fi devices that transmit in the frequencies used by Wi-Fi such as Bluetooth devices, baby monitors, cordless phones, etc. A capacity for each link can be derived by examining the amount of data that has been moved (the load), and the amount of time that the medium is busy due to interference. This can also be derived by taking a ratio of the data moved across the link to the fraction of time that the transmitting queue was busy. This capacity represents the hypothetical throughput that could be achieved if the link was loaded to saturation and was moving as much data as it possibly could.

Another important input is the delay of packets traversing the distributed Wi-Fi system 10. These delays could be derived from direct measurements, time stamping packets as they arrive into the distributed Wi-Fi system 10 at the gateway access point 14 (connected to the modem/router 18), and measuring the elapsed time as they depart at the access point 14. However, such measurement would require some degree of time synchronization between the access points 14. Another approach would be to measure the statistics of delay going through each access point 14 individually. The average total delay through the distributed Wi-Fi system 10, and the distribution of the delays given some assumptions could then be calculated based on the delay statistics through each access point 14 individually. Delay can then become a parameter to be minimized in the optimization 70. It is also useful for the optimization 70 to know the time that each access point 14 spends transmitting and receiving. Together with the amount of information transmitted or received, this can be used to determine the average data rate the various links are sustaining.

The outputs 62 of the optimization 70 are the operational parameters for the distributed Wi-Fi system 10. This includes the frequency channels on which each of the access points 14 are operating, and the bandwidth of the channel to be used. The 802.11 ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the distributed Wi-Fi system 10. The optimization 70 tries to use the lowest possible channel bandwidth for each link that will support the load required by the various user's applications. By using the narrowest sufficient throughput channels, the maximum number of non-interfering channels are left over for other links within the distributed Wi-Fi system 10.

Another set of outputs 62 of the optimization 70 defines the topology of the distributed Wi-Fi system 10, meaning which access points 14 connect to which other access points 14. The actual route through the distributed Wi-Fi system 10 between two clients or the client and the internet gateway (the modem/router 18) is also an output of the optimization 70. Again, the optimization 70 attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the distributed Wi-Fi system 10. The method of optimizing described later takes all this into account and comes up with the truly optimal arrangement.

The optimization 70 can also decide which links within the distributed Wi-Fi system 10 should use RTS/CTS protocols to prevent problems with hidden nodes, and can adjust each access point's 14 transmit power level. Higher transmit power increases the data rate and throughput for links from that access points 14, but creates more interference to other access points 14 in the distributed Wi-Fi system 10 and to neighboring systems. Closely associated to changing the transmit power, the optimization 70 can also set the clear channel assessment threshold at which it either defers to traffic on the airwaves, or goes ahead and transmits on top of other transmissions. This is effectively a way to ignore transmissions from a neighboring network and not delay transmissions when conditions allow us to transmit on top of those other signals.

A large benefit in system performance can be obtained if the optimization 70 is allowed to choose which access points 14 each Wi-Fi client device 16 connects to in the home. This ability helps with several issues. First, Wi-Fi client devices 16 often do a poor job of roaming from an access point 14 they have been connected to, to an access point 14 that they may have moved closer to. These "sticky" clients will experience unnecessarily low throughput as they attempt to communicate with an access point 14 that is too far away. Another advantage to controlling client associations is to avoid congestion at particular access points 14 in the distributed Wi-Fi system 10. For example, all the Wi-Fi client devices 16 in the home might be located closest to one particular access point 14. Their throughput would be limited by the sharing of the total capacity of that one access point 14. In this case, it would work better to force some of the Wi-Fi client devices 16 to associate with different access points 14, even if those access points 14 are somewhat farther away. The capacity at each access point 14 is now shared among fewer Wi-Fi client devices 16, allowing higher throughputs to each. Yet another reason to move Wi-Fi client devices 16 is to relieve congestion in the backhaul links. It is possible that even if the Wi-Fi client devices 16 spread themselves nicely between access points 14, all of those access points 14 may in turn connect to a single access point 14 in the backhaul. In this case the congestion will be in the backhaul. Again, moving the Wi-Fi client devices 16 to other access points 14, that have a different path through the backhaul can relieve the congestion.

Closely related to steering where Wi-Fi client devices 16 associate, is steering which frequency band clients connect on. In many systems and the preferred implementation, the access points 14 can operate simultaneously in more than one frequency band. For example, some access points 14 can operate in the 2.4 GHz and 5 GHz bands simultaneously.

The optimization 70 generates the outputs 62 from the inputs 60 as described herein by maximizing an objective function. There are many different possible objective functions. One objective could be to maximize the total throughput provided to all the Wi-Fi client devices 16. This goal has the disadvantage that the maximum total throughput might be achieved by starving some Wi-Fi client devices 16 completely, in order to improve the performance to Wi-Fi client devices 16 that are already doing well. Another objective could be to enhance as much as possible the performance for the Wi-Fi client devices 16 in the network in the worst situation (maximize the minimum throughput to a Wi-Fi client device 16). This goal helps promote fairness, but might trade a very large amount of total capacity for an incremental improvement at the worst Wi-Fi client device 16.

Figure 33:
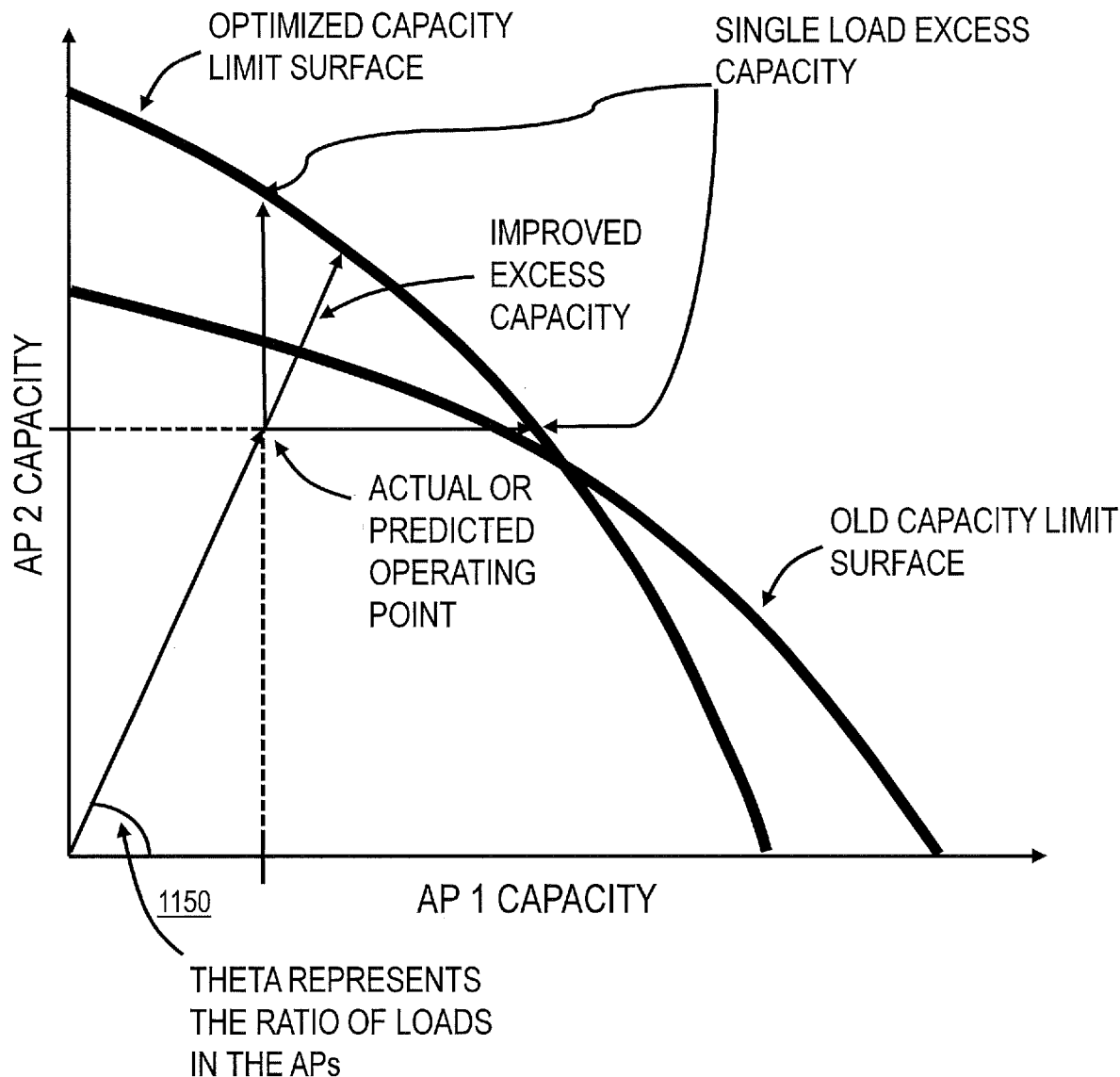
FIG. 33 is a graph of capacity loads of two access points relative to one another.

Referring to FIG. 33, in an exemplary embodiment, a graph illustrates capacity loads of two access points 14 relative to one another. A preferred method considers the load desired by each Wi-Fi client device 16 in a network, and maximizing the excess capacity for that load ratio. FIG. 33 illustrates this approach where the capacity requirements at two different access points 14 is shown. The optimization can improve the capacity, as well as shift the capacity between the two access points 14. The desired optimization 70 is the one that maximizes the excess capacity in the direction of a ratio 1150 of the loads. This represents giving the system the most margin to carry the desired loads, making the performance more robust, lower latency, and lower jitter. This strict optimization can be further enhanced by providing a softer optimization function that weights assigning capacities with a varying scale. A high utility value would be placed on getting the throughput to be equal to or just higher than the required load. Providing throughput to a Wi-Fi client device 16 or access point 14 above the required load would still be considered a benefit, but would be weighted much less heavily than getting all the Wi-Fi client devices 16/access points 14 to the load they are requiring. Such a soft weighted optimization function allows for a more intuitive tradeoff of excess performance between devices.

The aforementioned approach emphasizes optimizing with knowledge of the desired load. The desired load could be communicated directly by the access points 14 if they know it. It also could be estimated over a recent time period (e.g., the last few minutes). The load could also be estimated from long-term historical data. For example, the loads recorded across the last 30 days could be used to determine an expected load, which would then be used in the optimization 70. In this way, the network would be pre-configured for an expected worst case load.

However, there may be times when the load cannot be known. For example, when a new network is just set up, there is neither long-term load history, sort term (e.g., 5 minutes) load requirements, nor would the access points 14 have any knowledge of what loads the Wi-Fi client devices 16 in the environment are requiring. In this case, it is necessary to optimize without load information. A reasonable approach is to optimize under the assumption that the load requirement at each access point 14 is equivalent.

Even if the load is known, it may be beneficial to manipulate the load artificially. For example, recent history, or even long term history, may predict that the load on a particular access point 14 is going to be zero. However, there is still the chance that someone may go into that room and try to get data to a Wi-Fi client device 16 over the distributed Wi-Fi system 10. Therefore, it is beneficial to reserve a minimum load for each Wi-Fi client device 16 or access point 14, to ensure that there is at least some capacity in all locations to handle rare events gracefully.

Other factors can be put into the objective function. For example, certain types of changes to the distributed Wi-Fi system 10 are highly disruptive, interrupting traffic in the distributed Wi-Fi system 10 while the changes are made. A cost could be added to the objective function that would represent the disadvantage of making certain types of changes to the distributed Wi-Fi system 10. By properly weighting this cost versus the other factors, the objective function can be tuned to induce the optimization 70 to change the distributed Wi-Fi system 10 configuration when there is a lot to be gained, but to leave the distributed Wi-Fi system 10 alone when the gains would be only modest. Similarly, a hysteresis threshold could be applied to the optimization 70 output, ensuring that the distributed Wi-Fi system 10 sits relatively stable rather than flipping back and forth between two configurations at the smallest change in circumstances.

Figure 34:
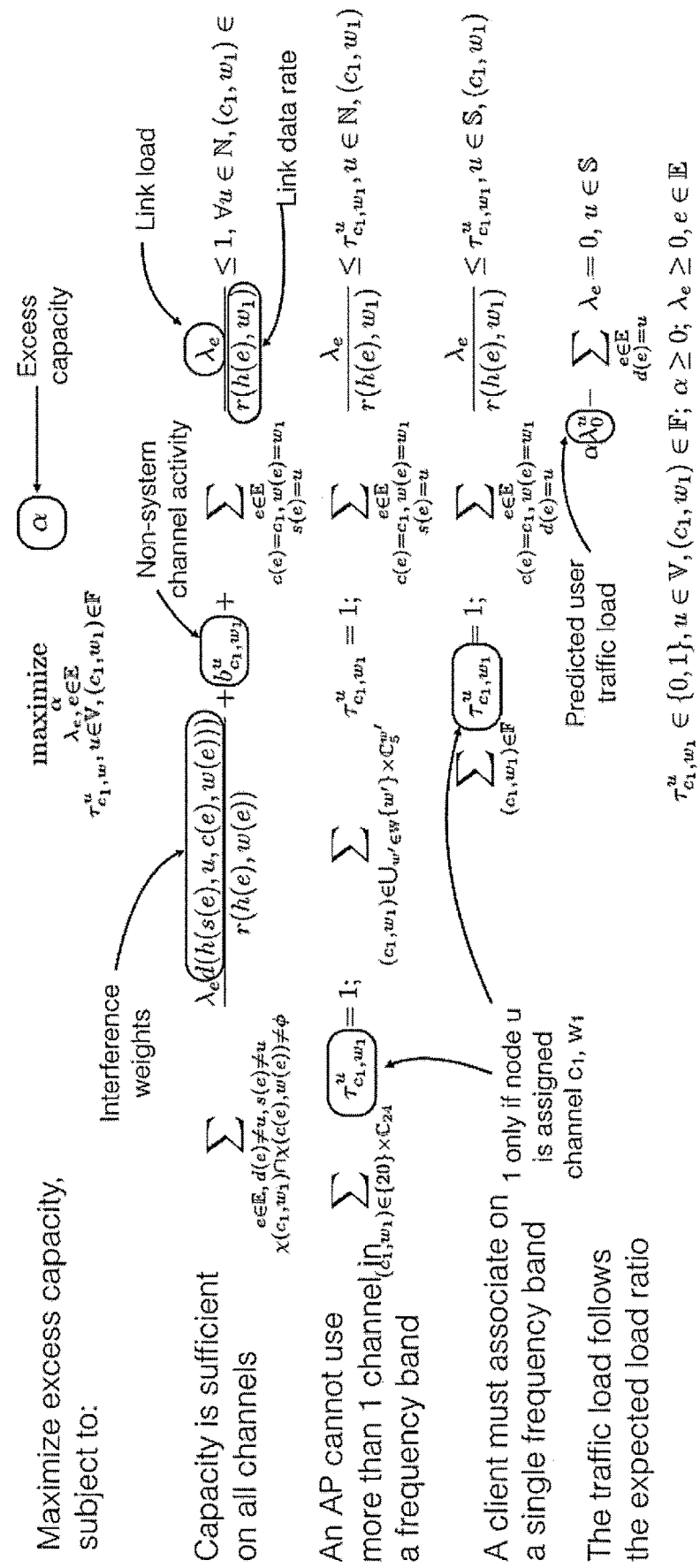
FIG. 34 is equations of an example Mixed Integer Linear Program (MILP) for the optimization.

Referring to FIG. 34, in an exemplary embodiment, equations illustrate an example Mixed Integer Linear Program (MILP) for the optimization 70. With the inputs 60, and objective function known, it becomes a mathematical problem to find the set of outputs 62 that will maximize the objective function. A very efficient way of doing this is to formulate the problem as a Mixed Integer Linear Program (MILP). There are several advantages to this formulation. First, it fits the nature of the problem as there are both continuous and discrete variables involved. For example, channel selection is an integer variable. Second, efficient methods for solving MILP problems are well known. Third, the formulation is fairly generic, accommodating a wide variety of objective functions and constraints on the solution. FIG. 34 shows a mathematical representation of an example MILP formulation, with annotations describing the various elements of the equations.

Ideally, this optimization would be done across not a single home, but all homes that are within Wi-Fi range of each other, and therefore generate interference to each other. Of course, the homes that interfere with the first home have themselves interferers that are even farther away. Proceeding in this way could result in attempting to optimize a very large number of homes all in a single optimization, for example, all homes in Manhattan. The computation time for MILP solutions goes up exponentially with the number parameters being optimized, so it goes up exponentially with the number of homes across which a single optimization is run. A solution to this is to do clustering.

Figure 35:
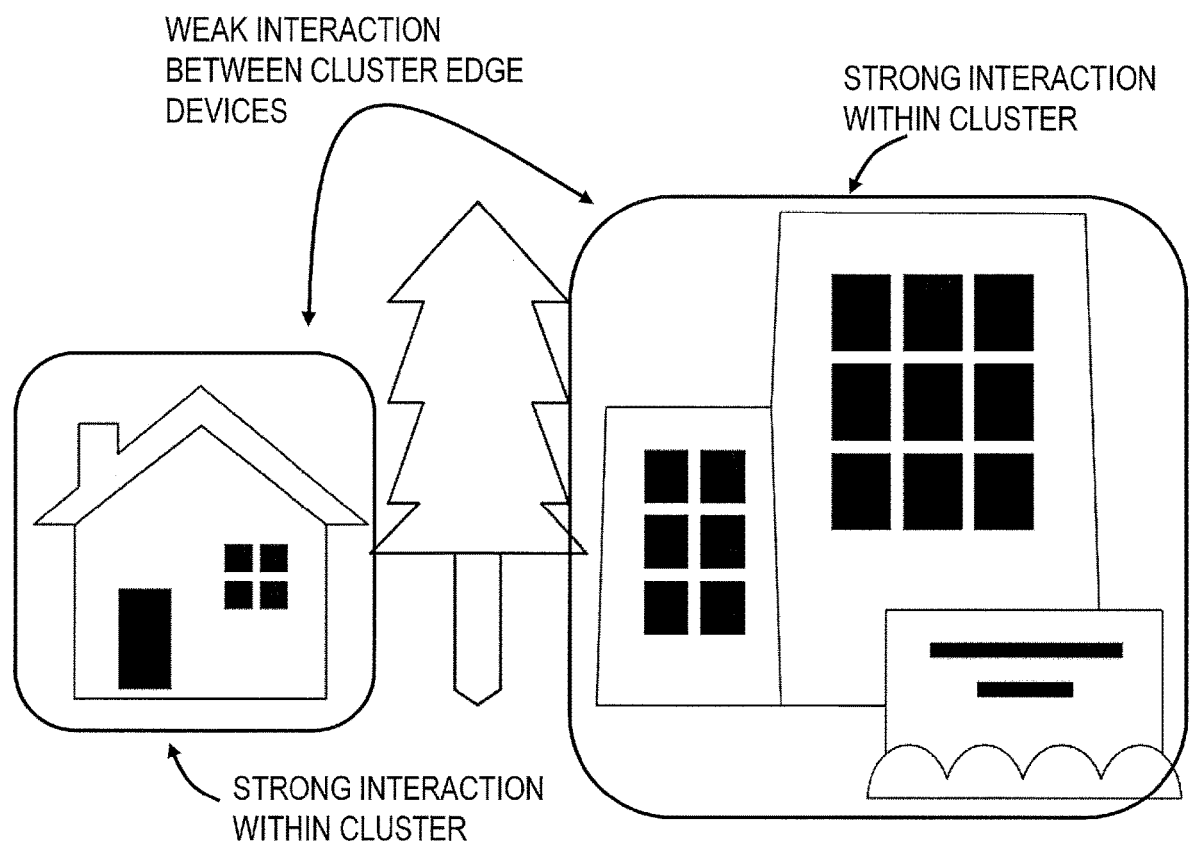
FIG. 35 is a diagram of an example of clustering to reduce the number of homes being jointly optimized, thereby making the computational complexity manageable.

Referring to FIG. 35, in an exemplary embodiment, a diagram illustrates an example of clustering to reduce the number of homes being jointly optimized, thereby making the computational complexity manageable. If the separate clusters still have a high level of overlap at their boundaries, an iterative approach could be applied. In a first pass, it could be assumed there would be no interference between clusters. In a second pass, the interference from the second cluster to the first cluster could be calculated, and then the best configuration for the first cluster re-calculated with that information. The second cluster could then be re-optimized, accounting for the new interference from the first cluster. Because iterations increase the computation load linearly, while cluster size increases computation exponentially, several iterations would still be far less computation than solving the entire problem jointly.

There can be complexities within the optimization 70. Several optimization parameters will alter the inputs to the optimization 70 itself. For example, changing the band or channel may change the transmit power that the access points 14 put out, thereby changing the interference they present to other access points 14. Similarly, different data rates are often transmitted with different power levels, so as Wi-Fi client device 16 or access point 14 associations are changed, interference effects must be re-calculated as well.

There are also specific Wi-Fi client device 16 behaviors to be considered. For example, some Wi-Fi client devices 16 dynamically switch on a packet by packet basis between different bandwidths of transmission (20, 40, 80 MHz, etc.). Other Wi-Fi client devices 16 are much less flexible, and if asked to use 40 MHz channels will only send 40 MHz packets. The first group of Wi-Fi client devices 16 almost always benefit from the allocation of a 40 MHz bandwidth channel, as they will use it when they can, but will also transmit in a lower bandwidth mode if there is interference on a part of the 40 MHz channel. Wi-Fi client devices 16 in the latter category can only benefit from a 40 MHz channel if that channel has very little interference anywhere on it. The differences between Wi-Fi client device 16 behaviors is something that can be learned over time from the network measurements that are being reported to the cloud service.

Figure 36:
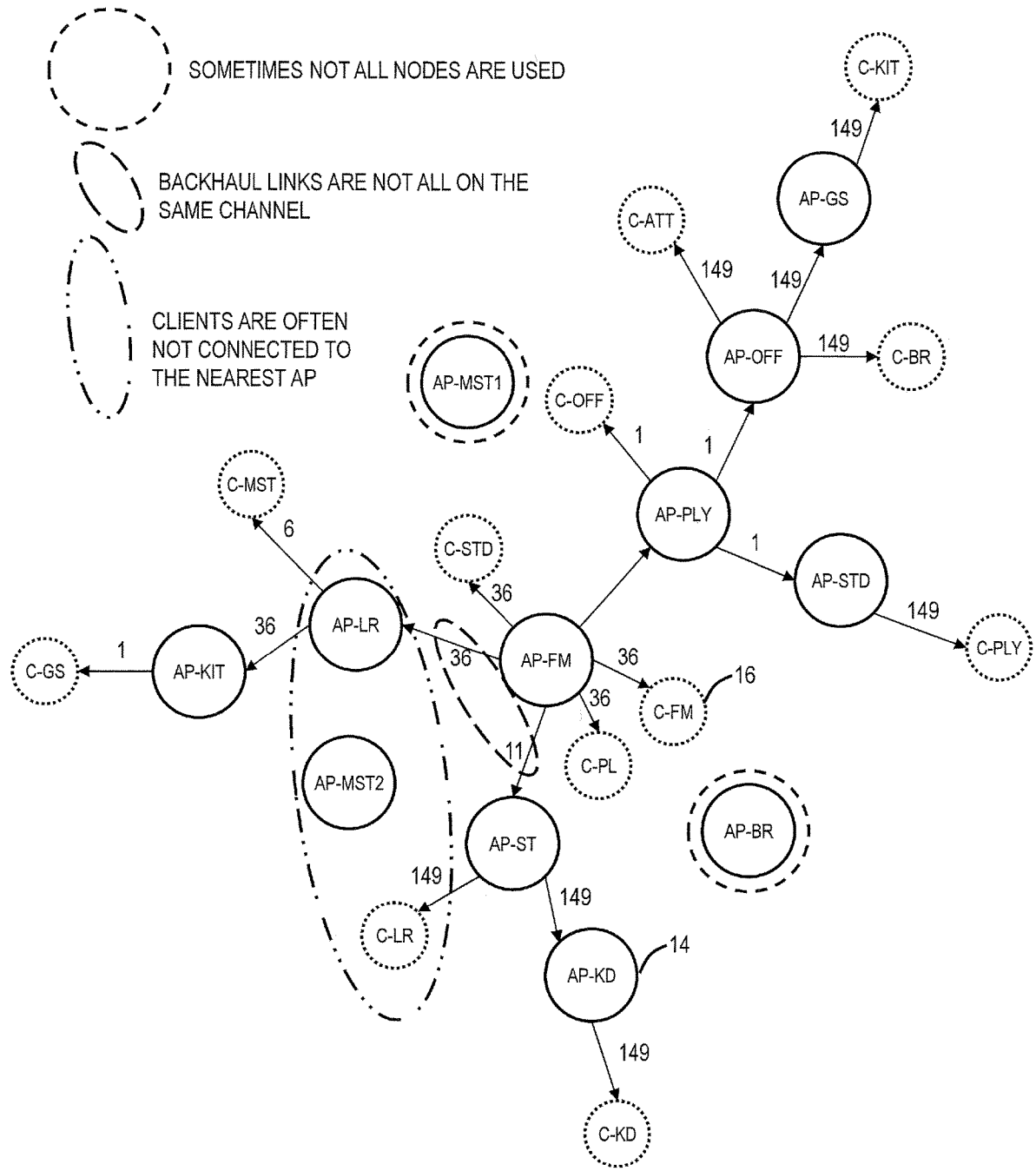
FIG. 36 is a graph of a sample output for the optimization in an exemplary location.

Referring to FIG. 36, in an exemplary embodiment, a graph illustrates a sample output 62 for the optimization 70 in an exemplary location. The uniqueness of the optimized distributed Wi-Fi system 10 can be seen in some of the properties that appear in the optimization 70 results. FIG. 36 highlights three important aspects of these types of networks that do not occur in prior art Wi-Fi systems using repeaters or mesh networks. First, not all access points 14 are used. In existing systems, if a repeater or mesh node can communicate back to the master node at all, and if any clients associate with it (perhaps because they are closer to that node than any other node), that pathway will be used. However, that pathway may be a very poor pathway. Imagine a consumer placing a repeater in the very far corner of his house from the gateway/master node. This repeater will become the most difficult and lowest data rate device to connect to in the entire home. It will actually be harder to reach than going directly to any of the clients in the home. However, in existing systems, traffic will be routed through that device. In the distributed Wi-Fi system 10, the optimization will naturally take this access point 14 out of the network, not connecting it to any parent nodes, or move all client associations away from that device.

The second important aspect is shown in FIG. 36 is that the backhaul links, those links connecting the access points 14 together and carrying traffic from and to the master gateway access point 14 (the one connected to the modem/router 18), are not all on the same frequency channel. This allows multiple transmissions in the backhaul portion of the network to occur simultaneously since transmissions on different frequencies will not interfere. Existing Wi-Fi systems using repeaters or mesh networks use a single frequency channel for the backhaul. Therefore, only one transmission can be going at any time within the entire backhaul system, limiting throughput and capacity.

The third important aspect is shown in FIG. 36 is that Wi-Fi client devices 16 are often directed to attach to the access point 14 that is not the closest access point 14 to that Wi-Fi client device 16. This allows load balancing both in the leaf nodes and in the backhaul, as necessary. Current Wi-Fi systems, including systems with repeaters and mesh networks, do not control where the clients associate, and therefore have points of congestion where the performance will be poor.

Figure 37:
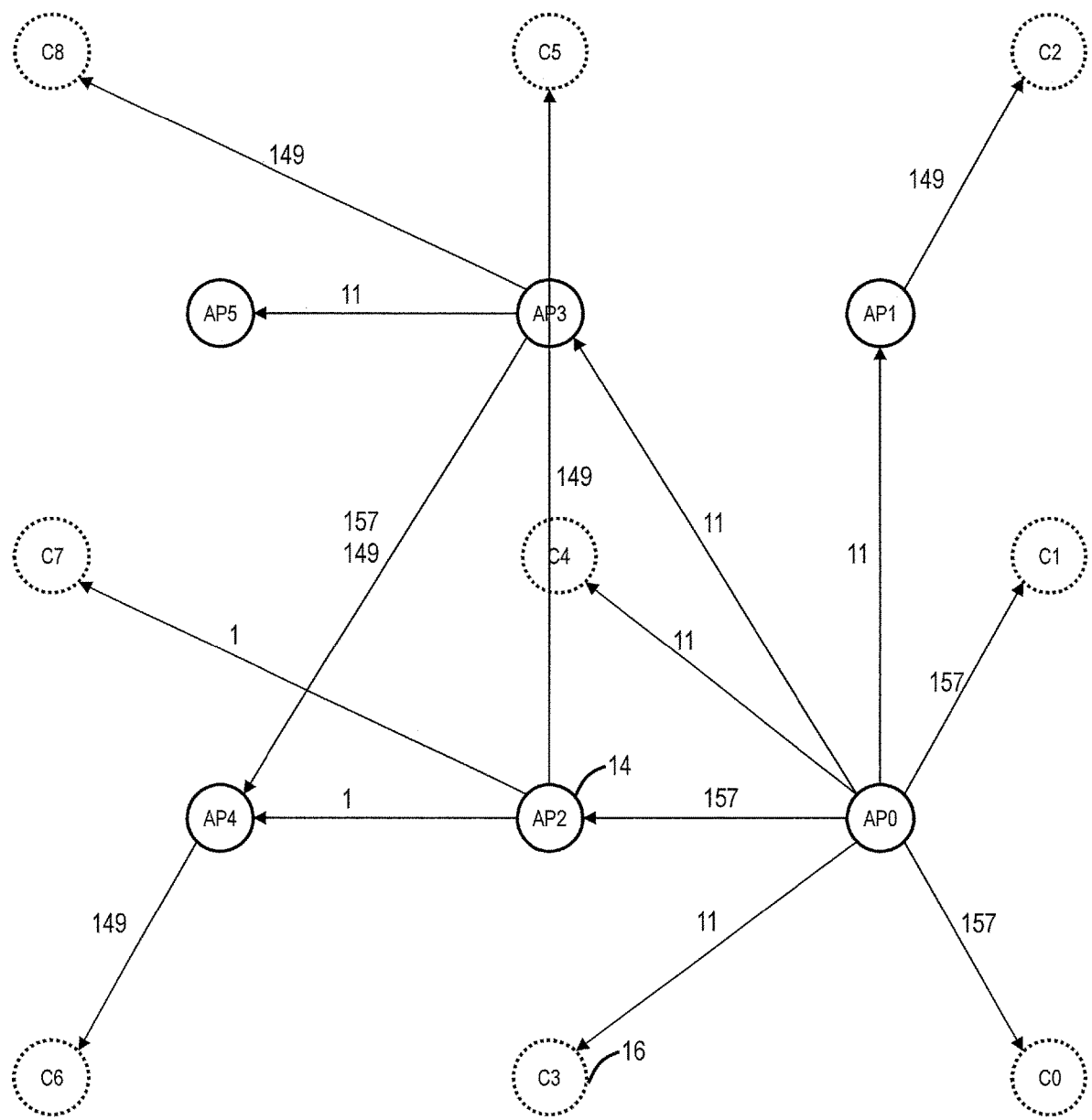
FIG. 37 is a graph of an output of the optimization in a tree structure.

Referring to FIG. 37, in an exemplary embodiment, a graph illustrates an output of the optimization 70 in a tree structure. The output of the optimization 70 shown above follows a tree structure. Each access point 14 has at most one parent. However, a more fully interconnected graph could be formed. FIG. 37 shows an example of a graph structure. The access point 14 labeled AP3 in this figure has two parent devices, AP4 and AP0. This can be helpful in that more total throughput can be provided to AP3 across the two parallel links from AP4 and AP0 than can be provided if just one of them were connected. In order for this to be effective, a networking protocol must be used that can take advantage of multiple parallel links. An example of such a protocol is Multi-Path Transmission Control Protocol (Multi-Path TCP). This protocol is designed specifically for communicating across multiple paths, and serves well the need to aggregate bandwidth across parallel paths.

L2 Tunnels for Wi-Fi Client Bridging

In conventional IEEE 802.11, distributed Wi-Fi networking is limited and requires either modification of the standards for a non-standard approach or use of network routing protocols. In various exemplary embodiments, to support distributed Wi-Fi networking in order to ensure that all existing Wi-Fi clients will be able to connect to the distributed Wi-Fi network, the systems and methods use Layer 2 (L2) network tunnels and software bridge interfaces. These interfaces are present on each of the access points becoming part of the distributed Wi-Fi network. To ensure full network service to all clients, the systems and methods connect Wi-Fi access points between each other using L2 network tunnels running over Wi-Fi and connect L2 interfaces to bridge interfaces running on each access point. This approach ensures that all clients connecting to a distributed Wi-Fi network could communicate to each other using L2 or higher network protocols. It also ensures that every client may reach all public network services via the gateway node. Logically, the systems and methods make a distributed Wi-Fi solution the full equivalent of single Wi-Fi access point solution. Specifically, the systems and methods solve the problem of using an intermediate Wi-Fi client as a network bridge when establishing a connection through that bridge device between a Wi-Fi client and Wi-Fi access point. The systems and methods are applicable to any IEEE 802.11 network, but it is particularly useful for distributed Wi-Fi network solutions (multiple access points). The systems and methods ensure full network connectivity for all clients connected to it, even when these client's traffic travels via multiple hops through intermediate Wi-Fi devices.

Figure 38:
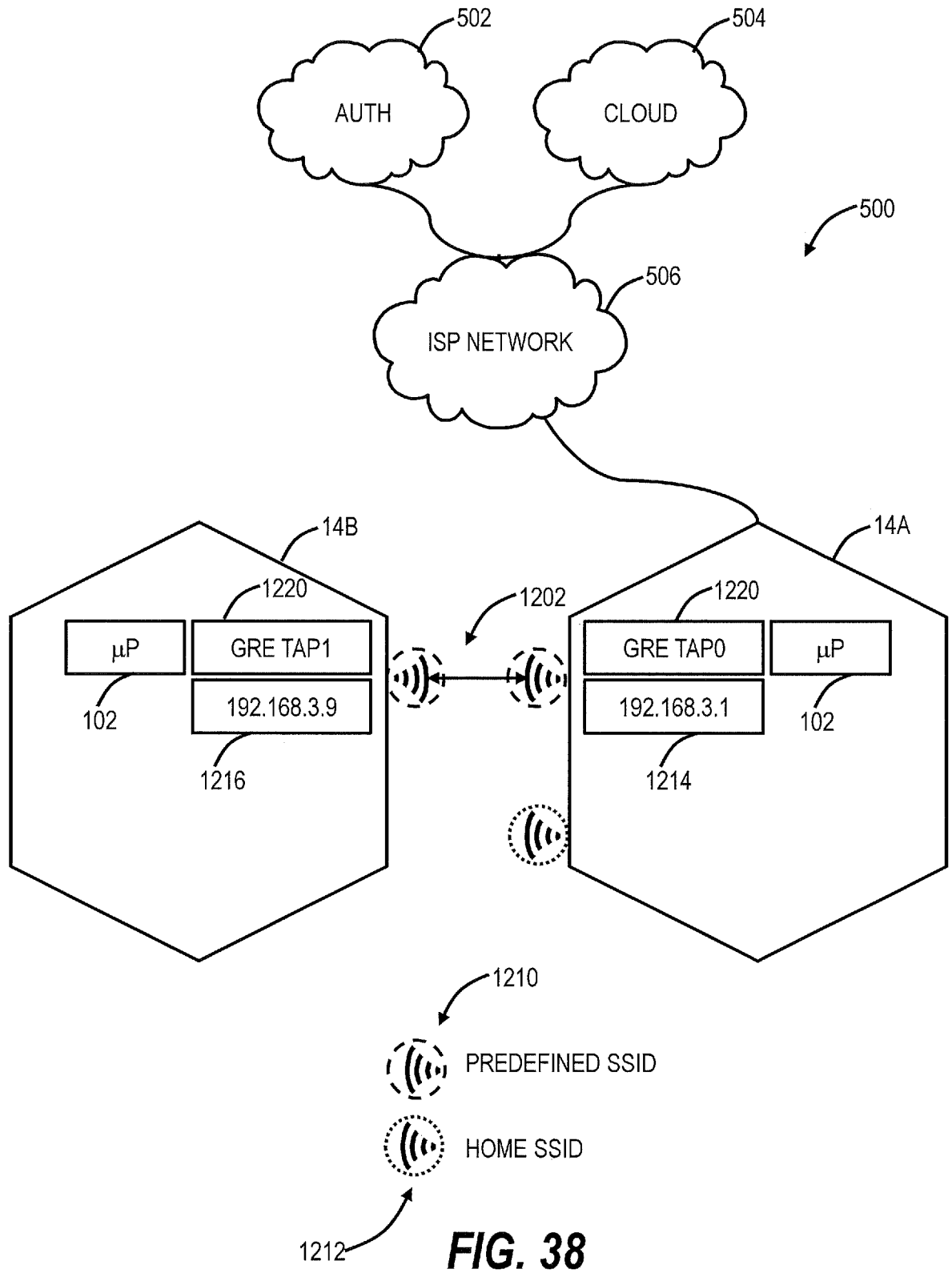
FIG. 38 is a network diagram of a Wi-Fi network with a backhaul link formed between two access points using an L2 tunnel.

Referring to FIG. 38, in an exemplary embodiment, a network diagram illustrates a Wi-Fi network 500 with a backhaul link 1202 formed between two access points 14 using an L2 tunnel. The Wi-Fi network 500 can include the distributed Wi-Fi system 10. The Wi-Fi network 500 can include cloud-based control of the access points 14 such as through an authorization service 502 and a cloud configuration service 504 in the cloud 12, connected via a network 308 such as an Internet Service Provider (ISP) network. In the example of FIG. 38, there are two access points 14A, 14B—a gateway access point 14A connected to the network 508, and an access point 14B connected to the gateway access point 14A via the backhaul link 1202. To enable a Wi-Fi client bridge mode, i.e., backhaul connections such as the backhaul link 1202 between the access points 14, the systems and methods utilize any L2 tunnel (e.g., any Ethernet-over-IP tunnel protocol might be used).

In an exemplary embodiment, the Wi-Fi network can use Generic Routing Encapsulation (GRE) and variants thereof, e.g., GREtap. The GRE protocol essentially enables tunneling of any Ethernet packets sent to its interface to the other end of the tunnel. So this technique could be exploited with any point-to-point Layer 3 (L3) protocol. In FIG. 38, the backhaul link 1202 is formed as a GRE tunnel over a predefined SSID 1210. The predefined SSID 1210 is used for Wi-Fi client bridging between the access points 14 to form the backhaul link 1202. Note, the predefined SSID 1210 is different from a home SSID 1212 which is for the Wi-Fi client devices 16 to connect to the Wi-Fi network 500. In general, to establish a GRE tunnel, the following prerequisites are needed on both ends of tunnel i) a local interface IP address, ii) a remote interface IP address, and iii) the remote side must be reachable from local unit and vice versa.

In the Wi-Fi network 500, the distributed Wi-Fi system 10, or another distributed Wi-Fi network, a repeater node, i.e., the access point 14B which is not a gateway node, ends up with a least one parent node and one child node or Wi-Fi client devices 16. Thus, the repeater node (the access point 14B) has two interfaces or more. The first interface connects to the node's parent device and acts as a client or STA mode interface, i.e., the first interface provides the backhaul link 1202. The second interface connects to the child or the Wi-Fi client device 16, that interface acting as an AP mode interface.

Figure 39:
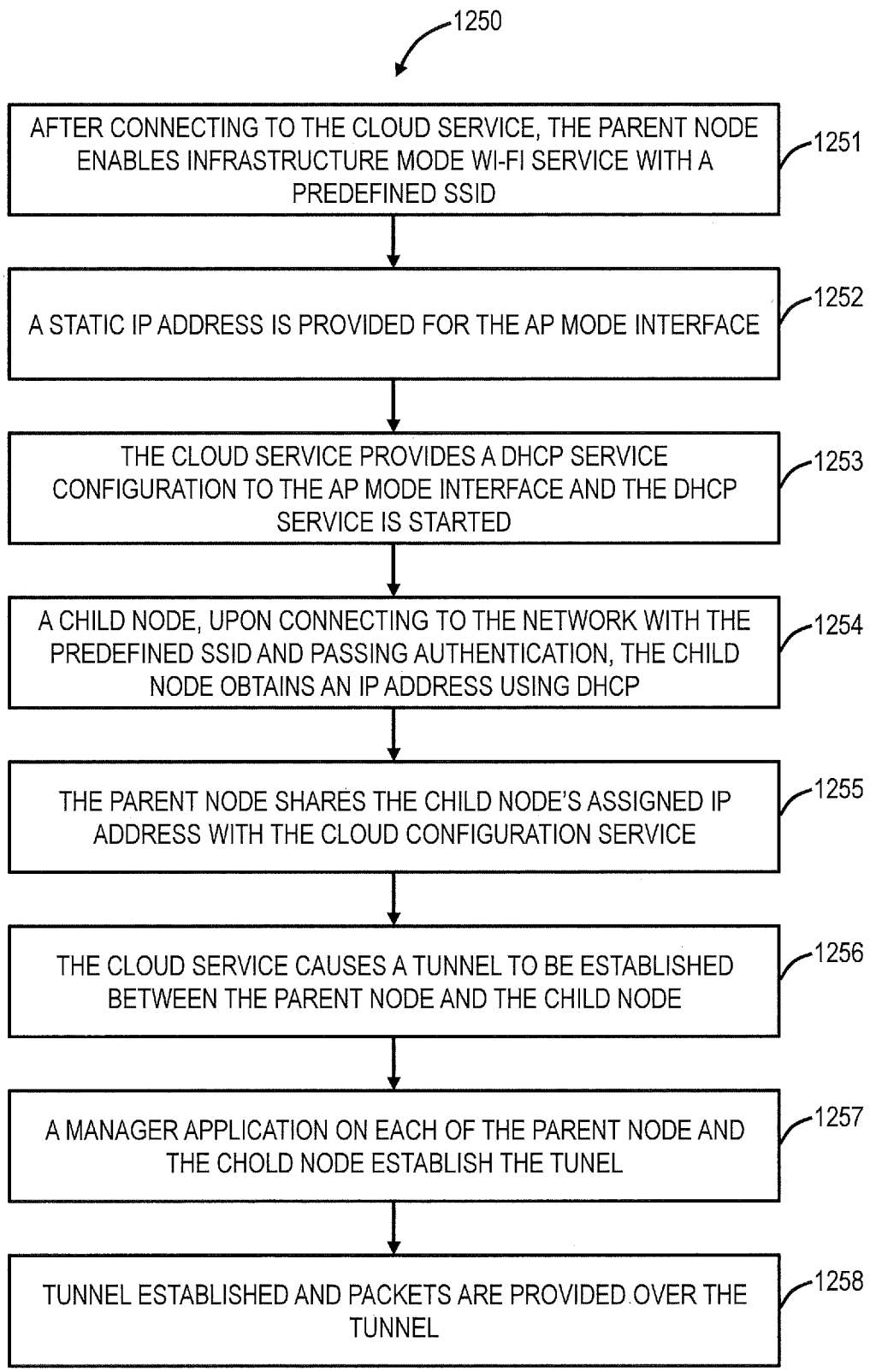
FIG. 39 is a flowchart of a tunnel establishment method for the Wi-Fi network of FIG. 38.

Referring to FIG. 39, in an exemplary embodiment, a flowchart illustrates a tunnel establishment method 1250 for the Wi-Fi network 500. Again, the establishment method 1250 utilizes GRE as an exemplary L2 tunnel, but those skilled in the art will recognize any L2 tunneling protocol is contemplated. Further, the establishment method 1250 steps in FIG. 39 are described herein with reference to the Wi-Fi network 500 in FIG. 7, but could also operate with the distributed Wi-Fi system 10, or another distributed Wi-Fi network.

The establishment method 1250 includes, after connecting to the cloud configuration service 504, the parent node (e.g., the access point 14A) enables infrastructure mode Wi-Fi service with a predefined SSID (step 1251). The cloud configuration service 504 provides a static IP address to the parent node access point 14A for the AP mode interface (step 1252). Specifically, the cloud configuration service 504 transfers this IP address to the parent device and the parent device assigns this IP address and the accompanying network settings to the AP mode network interface, e.g. the home SSID 1212 on the access point 14A. For operation, the Wi-Fi network 500 can include an agreed upon convention such that the AP mode interface always has an IP address with a specific format, e.g., an IP address that ends with 1 or some other unique convention, no matter which IPv4 address subnet from private IPv4 addresses pool is chosen. For example, valid AP mode network interface addresses can be 192.168.3.1, 192.168.77.1, 192.168.116.1, etc. For example, in FIG. 38, the access point has AP mode network interface IP address 1214.

The cloud configuration service 504 provides a Dynamic Host Configuration Protocol (DHCP) service configuration to the newly created AP mode interface (IP address 1214) (step 1253). The DHCP service is started on the parent device on that particular interface, i.e., the newly created AP mode interface (IP address 1214). Upon connecting to the network with a predefined SSID and successfully passing network authentication, the child device (the access point 14B) obtains an IP address using DHCP (step 1254). This can include obtaining an IP address by sending a DHCP discover packet and using the DHCP protocol, a child Wi-Fi network interface is assigned a single IP address 1216 from the same subnet, and with the same network mask as the parent device. From a terminology perspective, the parent node or device is the gateway, connected to the network 508, and the child node or device is the access point 14B or any other access point 14 which does not directly connect to the network 508, but rather through the backhaul link 1202 or multiple backhaul links. The DHCP protocol is operated by the parent node (the access point 14A).

The parent node shares the child node's assigned IP address with the cloud configuration service 504 (step 1255). With the child node's assign IP address, the cloud configuration service 504 causes a tunnel to be established between the parent node and the child node (step 1256). A manager application executed on the processor 102 in the access points 14 (the parent node and the child node) establishes the tunnel (step 1257). Specifically, the cloud configuration service 504 can issue a request for establishment of a downlink GRE tunnel between the parent node and the child node. The manager application at the parent node can establish a GRE tunnel on the parent node. Next, the manager application running on the child node extracts the IP address subnet information based on the assigned IP and assigned subnet mask information. The manager application running on child node establishes the uplink GRE tunnel based on the agreed upon convention for the IP address 1214 of the AP mode interface. For example, assuming the agreed upon convention is that the IP address that ends with 1, the child node establishes the uplink GRE tunnel due to established connection IP address of Wi-Fi interface on the parent side is equal to: SUBNET_IP_ADDRESS OR 1.

At this point, there is a fully functional tunnel established between parent Wi-Fi access point device and child Wi-Fi access point device (step 1258). On each device, there is newly created GRETAP network interface 1220 available. Any Ethernet packet that enters network interface on one side of this tunnel will be tunneled unmodified to the other side of the established tunnel. The only cost of this tunnel, besides a bit of additional processing of every packet, is additional bytes added as GRE header to each packet being transferred. In the case of the GRE protocol, this additional cost is exactly 36 bytes. Upon connecting nodes with this tunnel the Maximum Transmission Unit (MTU) size must be correctly increased for at least the given amount of bytes.

Establishing L2 Network Between Parent and Child Node

Figure 40:
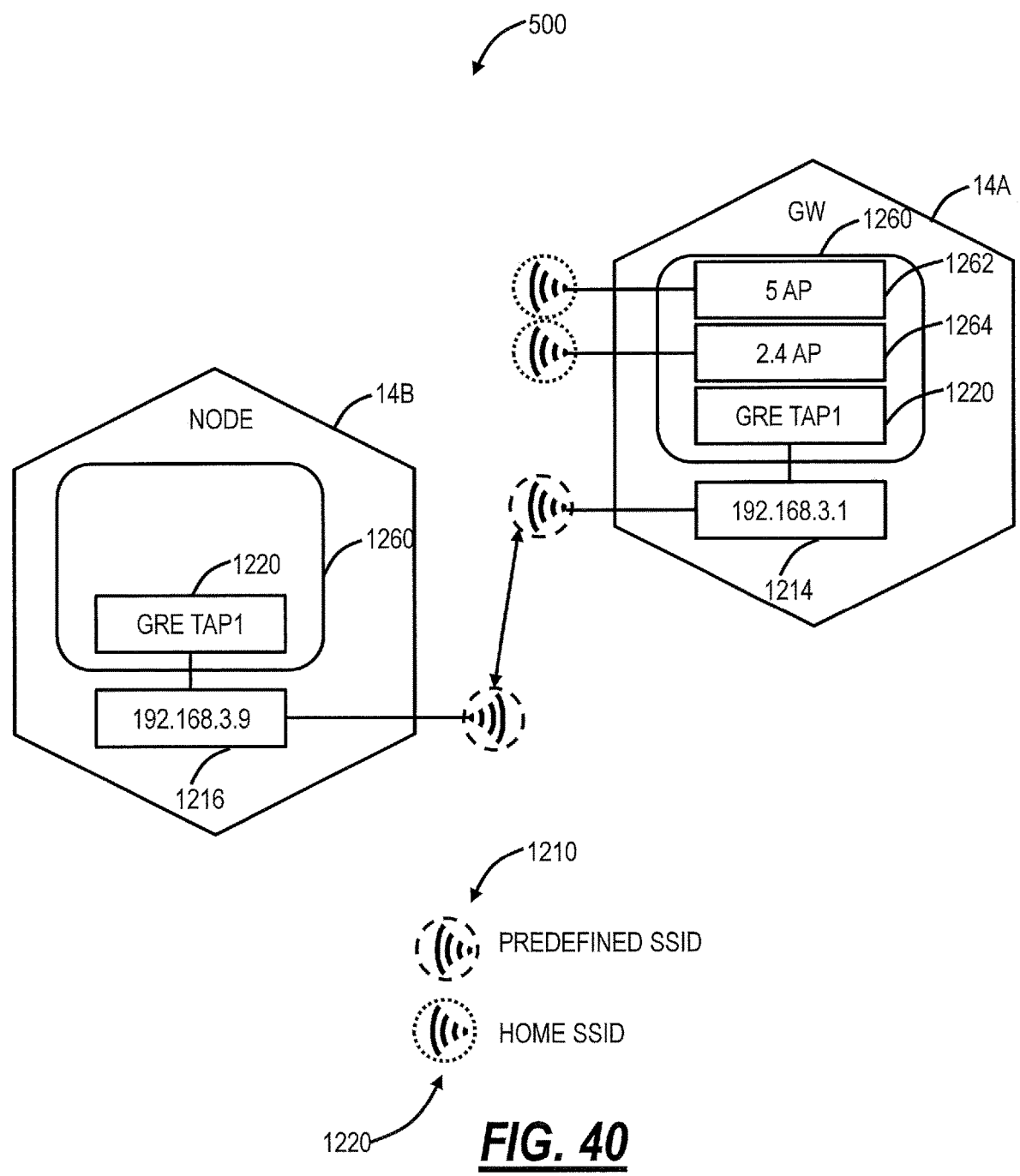
FIG. 40 is a network diagram of the Wi-Fi network of FIG. 38 connecting bridge interfaces with the L2 tunnels.

Referring to FIG. 40, in an exemplary embodiment, a network diagram illustrates the Wi-Fi network 500 connecting bridge interfaces with the L2 tunnels. Most modern operating systems targeting network devices feature software implementation of L2 learning Media MAC bridge (hereafter referred as a bridge interface 1260). In order to enable full network service for all Wi-Fi client devices 16 connected to a distributed Wi-Fi network (i.e., the Wi-Fi network 500, the distributed Wi-Fi system 10, etc.), all infrastructure mode interfaces must be a "bridge," i.e., connected to the same bridge interface 1260 or to the series of bridge interfaces transparently connected between themselves.

For a traditional single AP Wi-Fi solution, the infrastructure mode Wi-Fi interfaces are already locally bridged, i.e., connected to the same bridge interface residing on the devices. This is because all dual band Wi-Fi access points have two Wi-Fi interfaces, each for one band. In addition, if the Wi-Fi router features wired IEEE 802.3 Local Area Network (LAN) ports, these ports are also bridged to the Wi-Fi interfaces. This allows all devices connected to the same router to have full L2 network visibility, meaning that all L2 protocols will be applicable between devices.

In the case of a distributed Wi-Fi network as disclosed herein, there may not be LAN ports required to be connected to the bridge interface 1260. There are, however, several Wi-Fi infrastructure mode interfaces 1262, 1264, two on each dual band access point acting as a repeater within the distributed Wi-Fi system 10. On each node, the bridge interface 1260 must be created and connected to both Wi-Fi interfaces 1262, 1264 on the device. In addition, these bridges 1260 need to be somehow connected. The L2 tunnels, described in previously, are used for this purpose.

As soon as the L2 tunnel is established at both ends, the GRE tunnel interfaces are added to the bridge interface 1260, i.e., the GRETAP network interface 1220 can be added to the bridge interface 1260. Repeating this process on every device which is part of the Wi-Fi network ensures full L2 network connectivity between any two clients in the Wi-Fi network 500, as well as full networking service to any client, through the gateway access point 14A.

Figure 41:
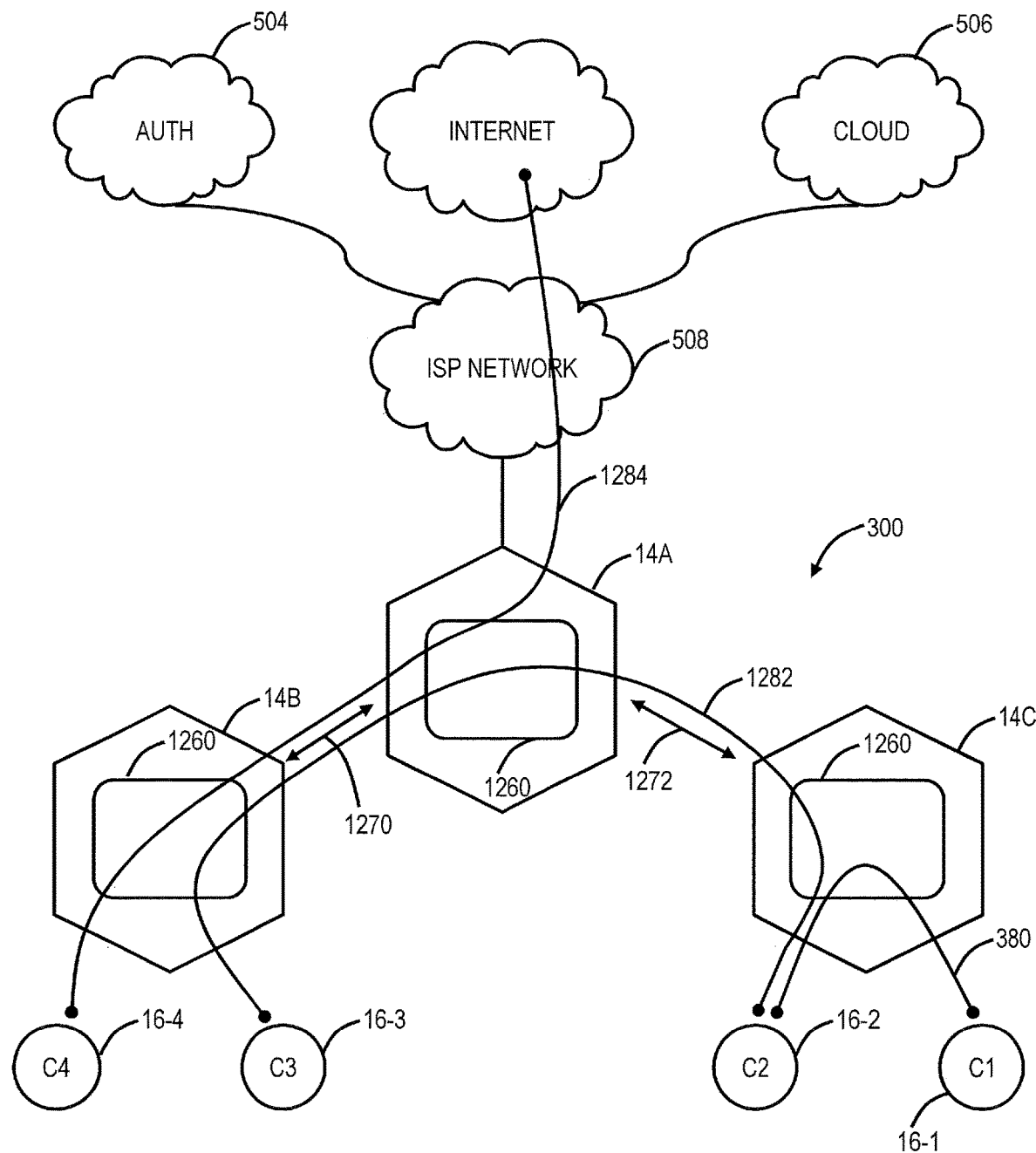
FIG. 41 is a network diagram of the Wi-Fi network of FIG. 38 illustrating the data path between Wi-Fi client devices.

Referring to FIG. 41, in an exemplary embodiment, a network diagram illustrates the Wi-Fi network 500 illustrating the data path between Wi-Fi client devices 16. Here, the Wi-Fi network 500 is shown with the access point 14A as the gateway node and the parent node to the access points 14B, 14C which are child nodes. Each of the access points 14A, 14B, 14C include the bridge interfaces 1260, and there is an L2 tunnel 1270 between the access points 14A, 14B and an L2 tunnel 1270 between the access points 14A, 14C.

If two clients 16-1, 16-2 connected to the same access point 14C over Wi-Fi talk to each other, the packet sent by the client 16-1 to the client 16-2 enters the local bridge interface 1260 and will be forwarded directly to the client 16—and vice versa as shown in data path 1280. In case the clients 16-2, 16-3 need to talk to each other, the packet generated by the client 16-3 will enter the local bridge interface 1260 and be the forwarded to the local bridge interface 1260 on the client 16-2 and then forwarded to client 16-3 as shown in data path 1282. If the packet is destined to outside network or service 502, 504, the packet will be forwarded to the gateway access point 14A. On the gateway access point 14A, this packet will be routed to the next router in the router chain as shown in data path 1284. The packet that enters the gateway node will be forwarded based on the destination MAC address using the same data path as in the opposite direction.

Client Steering

Again, one of the outputs of the configuration and optimization process 50 is to configure the Wi-Fi client devices 16 that are associated with the distributed Wi-Fi system 10 (or any other Wi-Fi network). This can be referred to herein as "client steering." In conventional systems, the Wi-Fi client devices 16 locally determine which access point to associate with. Thus, conventional client association is distributed. In the systems and methods described herein, client association can be part of the configuration and optimization process 50 and controlled by the cloud controller. That is, the distributed Wi-Fi system 10 or any other Wi-Fi network can have client association decisions made remotely in the cloud 12. The main tenets of the client steering are that it should result in the least amount of disruption to the Wi-Fi connectivity on Wi-Fi client devices 16 and work with the majority of Wi-Fi client devices 16.

Figure 42:
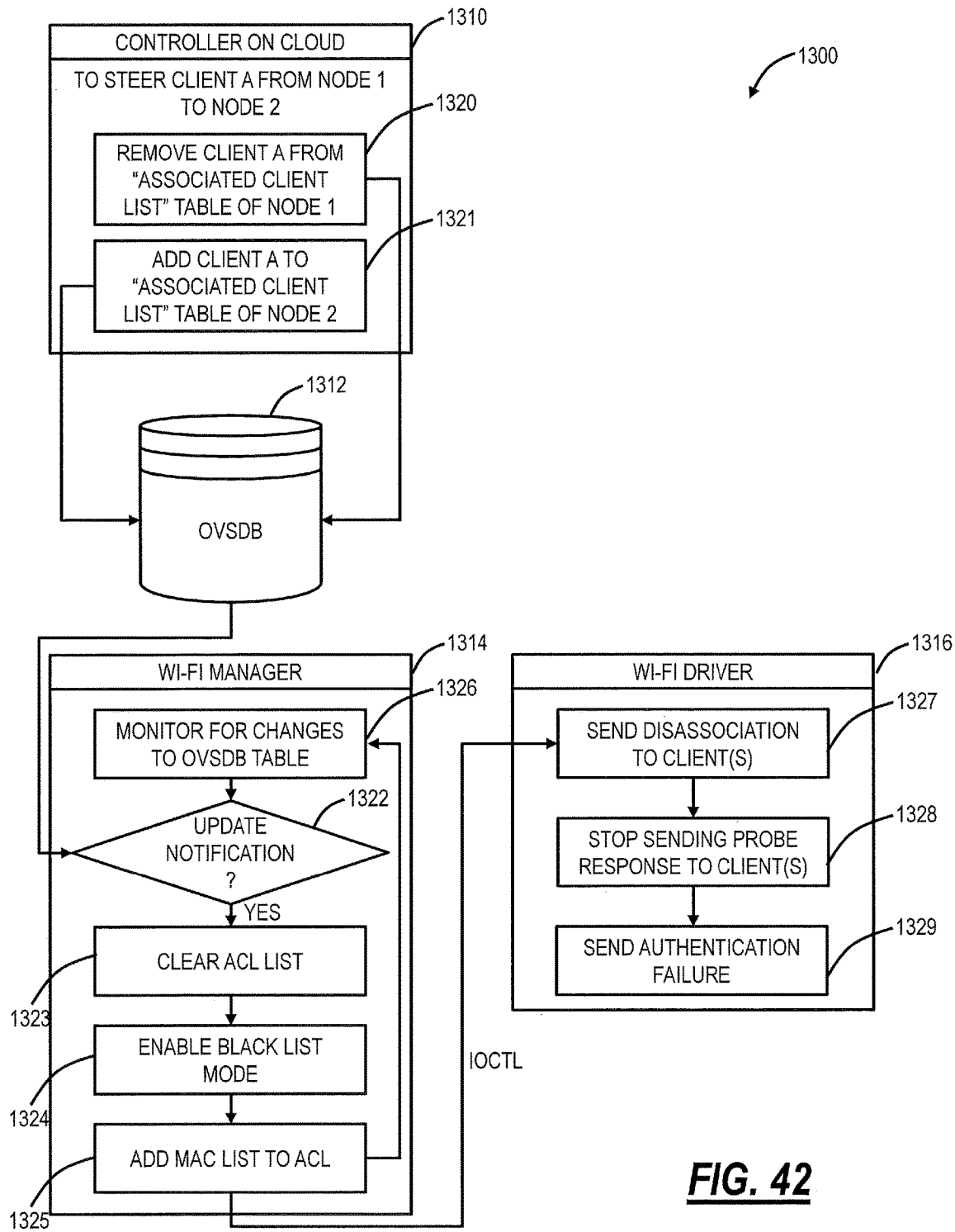
FIG. 42 is a flow diagram of a client steering process for use with any distributed Wi-Fi network for controlling client associations remotely.

Referring to FIG. 42, in an exemplary embodiment, a flow diagram illustrates a client steering process 1300 for use with any distributed Wi-Fi network for controlling client associations remotely. The client steering process 1300 is described with reference to a cloud controller 1310 in the cloud 12, an Open vSwitch Database (OVSDB) 1312, a Wi-Fi manager 1314 associated with an access point 14, and a Wi-Fi driver 316 also associated with the access point 14. The cloud controller 1310 can be the server 20 in the cloud 12. The OVSDB 1312 is a management protocol in a Software Defined Networking (SDN) environment. Most network devices allow for remote configuration using legacy protocols, such as simple network management protocol (SNMP). The focus with OVSDB was to create a modern, programmatic management protocol interface. The OVSDB 1312 can be based on RFC 7047 "The Open vSwitch Database Management Protocol," (December 2013), the contents of which are incorporated by reference. The access point 14 can execute the Wi-Fi manager 1314, such as via the processor 102, and the Wi-Fi driver 1316 can be used to control Wi-Fi interfaces on the radios 104. The client steering process 1300 is robust and will work with nearly all Wi-Fi client devices 16.

For illustration purposes, the client steering process 1300 is illustrated with respect to a single client being steered from a node 1 to a node 2 (i.e., access points 14). Note, the access point 14 associated with the Wi-Fi manager 314 and the Wi-Fi driver 316 is the one currently associated with the Wi-Fi client 16, i.e., the node 1, and the cloud controller 1310 is steering the client with the client steering process 1300 to another access point 14, i.e., the node 2, which is not shown in FIG. 42. However, the node 2 has a similar Wi-Fi manager 1314 and Wi-Fi driver 1316. Those skilled in the art will recognize the client steering process 1300 can be used for multiple Wi-Fi client devices 16 and for multiple Wi-Fi networks. The cloud controller 1310 can determine the need to steer Wi-Fi client devices 16 based on the configuration and optimization process 50. However, the Wi-Fi client devices 16 can be steered for any reason including load balancing, optimization, maintenance, off-channel scanning, etc.

The cloud controller 1310 determines the client (i.e., a Wi-Fi client device 16) needs to be steered from the node 1 to the node 2. Specifically, the cloud controller 1310 can maintain an Associated Client List (ACL) table for each access node 14 under its control. For the client steering process 1300, the cloud controller 1310 can add/remove a specified Wi-Fi client device 16 from the ACL tables of the associated access points 14 (steps 1320, 1321). For example, to steer a client A away from node 1 to node 2, the cloud controller 1310 removes the client A from the ACL table of node 1 and adds the client to the ACL table of node 2.

In the client steering process 1300, the cloud controller 1310 sends messages to various nodes in the Wi-Fi network with details of the clients that need to be steered along with the type of steering technique to use. In an exemplary embodiment, the cloud controller 1310 can use the OVSDB 1312 for such messages to the nodes. For example, the cloud controller 1310 can provide updates to the ACL tables for each node via the OVSDB 1312. The access points 14 (nodes) can act upon updates, namely, disassociate from clients which are removed and attempt to associate from clients that are added.

When the cloud controller 1310 performs the addition/removal of the node A from the ACL table (steps 1320, 1321), an update notification message can be sent to the Wi-Fi manager 1314 of both the node 1 and the node 2 (step 1322). The node 1 can clear its ACL list (step 1323), enable a blacklist mode (step 1324), and add the Media Access Control (MAC) address (or some other unique identifier) of the client A to a blacklist in the ACL list (step 1325). The Wi-Fi manager 1314 of the node 1 can then proceed to a state where it waits until there are changes from the OVSDB 312 (step 1326). The Wi-Fi manager 1314 of the node 1 can make a call to the Wi-Fi driver 1316 (e.g., an Input/Output Control (IOCTL)).

Upon receiving this call, the node 1 to which the client A is currently associated does the following—sends out a disassociation request to the client A (step 1327), stops responding to probe requests from that client A (step 1328), and sends out an authentication failure with reason code 34 if client still attempts to associate (step 1329). Also, other nodes and the node 1 in the Wi-Fi network which do not have the client A in their ACL list do not respond to probe requests from the client A. Conversely, the node 2 to which client A is being steered to responds to probe requests from that client A.

There are other approaches that can be used for steering Wi-Fi client devices 16 from one access point 14 to another. These approaches may be less general, but may also act much faster, reducing the period of disruption on the network while a Wi-Fi client device 16 is moving its association from one access point 14 to another. One such mechanism would be to use the Channel Switch Announcement or CSA. Clients that understand the IEEE 802.11 standardized channel switch announcement will follow that instruction at an agreed upon time to move channels very rapidly. However, while the CSA will induce a rapid channel switch, it will not by itself cause the device to roam to a new access point 14. Once the CSA has been used to get the Wi-Fi client device 16 to change channels rapidly, the actual roaming can be caused by sending the Wi-Fi client device 16 a disassociation message. This message can be sent by the new access point 14 on the new channel, that access point 14 spoofing itself as the old access point 14 on the old channel by spoofing the Basic Service Set Identifier (BSSID) of the old access point 14. Even without an explicit disassociation message, some Wi-Fi client devices 16 will time out their old connection and discover the new access point 14 more quickly than when the CSA is not sent. Some Wi-Fi client devices 16 are very slow to scan and find a new access point 14 on a new channel following a disassociation message.

There are also mechanisms to get Wi-Fi client devices 16 to roam from one access point 14 to another within assisted roaming in the IEEE 802.11k standards and directed multicast in the IEEE 802.11v standards. These mechanisms are advantageous because they can cause the Wi-Fi client devices 16 to move to the new access point 14 more quickly, with less disruption of service. However, not all Wi-Fi client devices 16 support these modes of operation. Similarly, the use of IEEE 802.11r, the fast roaming protocol, can also be used to accelerate the transition from one access point 14 to another. However, like IEEE 802.11k and IEEE 802.11v, this approach is not supported on all Wi-Fi client devices 16.

Note, the cloud controller 1310 can use the client steering process 1300, CSA announcements, fast roaming in the IEEE 802.11r standards, assisted roaming in the IEEE 802.11k standards, and directed multicast in the IEEE 802.11v standards, etc. As described herein, the cloud controller 1310 can utilize a plurality of steering approaches including the client steering process 1300, a CSA, causing access points 14 to disassociate, blacking listing the client in an ACL list for an access point, Because not all approaches (CSA, fast roaming in the IEEE 802.11k and IEEE 802.11v standards) are supported by all Wi-Fi client devices 16, and some approaches are quicker on some Wi-Fi client devices 16 but not others, it is important for the cloud controller 1310 to learn which Wi-Fi client devices 16 support which approaches, and which approaches create the shortest network disruption on a given Wi-Fi client device 16. In addition to learning which approaches work, it is also necessary to learn how often a given approach should be used. Some devices will tolerate only a certain number of disassociations before they give up on the network in questions and refuse to connect again. Limits must be placed on the number and frequency of steering commands of any of the types previously listed to a particular client. These limits are client type specific and must be learned by observing the behavior of a number of devices over a period of time. A learning system based in the cloud controller 1310 is a good way to accomplish this. Such a system has visibility into the behavior of a large number of Wi-Fi client devices 16, allowing it to extract the statistics necessary to understand which Wi-Fi client devices 16 operate best with which approaches.

An approach for doing this is to have the networking nodes (access points 14) keep track of the behavior of various Wi-Fi client devices 16 to different steering algorithms using the client MAC address and client name and report them back to the cloud controller 1310. Other client specific information, such as the DNS mechanisms the device is using, protocol stack versions, etc., might also be reported to the controller to aid in identifying the type of devices being managed. This helps the system learn the client behavior so that a variant of client steering algorithm can be used to steer different client devices. Along with learning which approach works best, the system can learn specific details about how each approach can be optimized for a particular Wi-Fi client device 16. For example, sending out a dissociation request and not responding to probe requests might be sufficient to steer most Wi-Fi client devices 16, but there might be a specific set of Wi-Fi client devices 16 that might require sending out an authentication failure to be steered.

Optimization Based on Estimation and Learning

Figure 43:
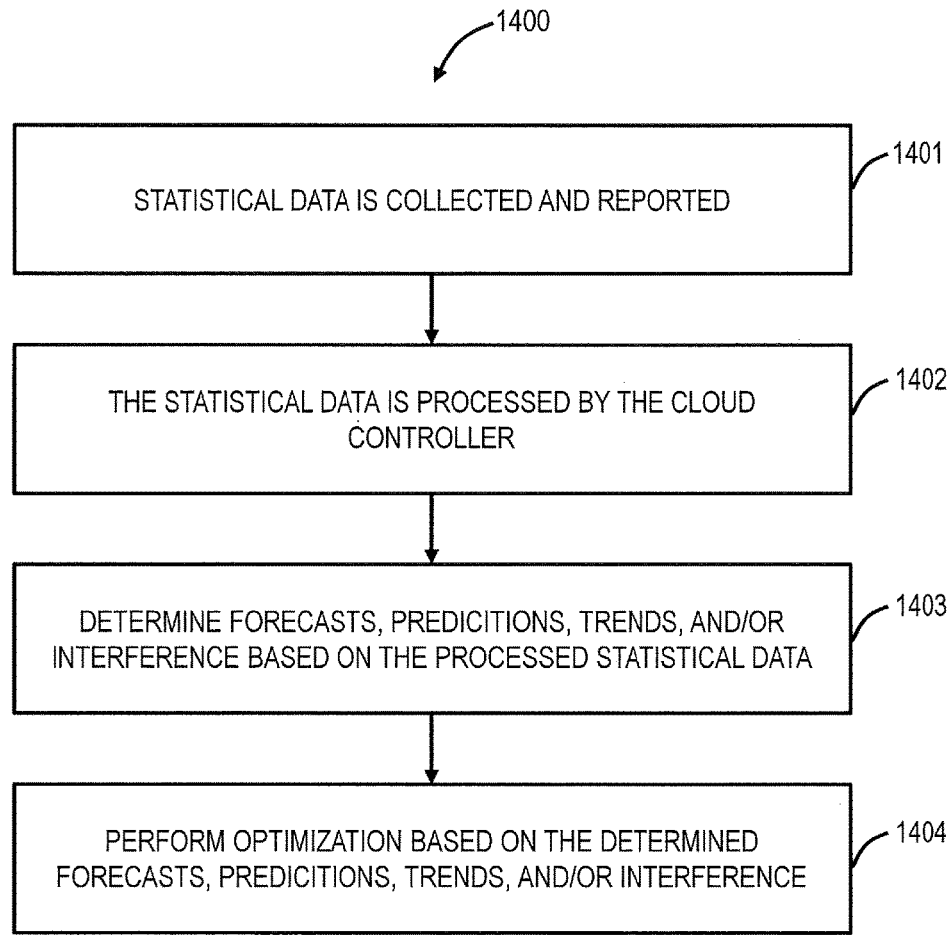
FIG. 43 is a flowchart of an estimation and learning process by a cloud controller for a Wi-Fi network such as the distributed Wi-Fi system.

Referring to FIG. 43, in an exemplary embodiment, a flowchart illustrates an estimation and learning process 1400 by a cloud controller for a Wi-Fi network such as the distributed Wi-Fi system 10. Again, as described herein, access points 14 (nodes) collect and report statistical data such as the mean, variance, and histogram across a measurement interval for various parameters in a Wi-Fi system (step 1401). These parameters include, but are not limited to, throughput, application type, signal strength from/to all the nodes in the network to the client consuming the traffic, capabilities of the client such as the number of spatial streams, channel widths, MCSs, etc.

The cloud controller is configured to process the collected and reported statistical data (step 1402). The data is collected as a time-series and collated across all nodes in a location to capture a joint view of the load on the network. This data is used to segment time into periods with similar load characteristics, e.g., based on the day of the week, time of day, etc. Additionally, the data is used to determine a correlation structure across time, i.e., autoregressive characteristics.

The processed statistical data is used by the cloud controller to determine forecasts, predictions, trends, and/or interference (step 1403). The forecasts can be then built for future time periods ranging from several minutes to several hours or days into the future where a representative set of probable loads (load predictions) is extracted using historical data from similar periods as well as data from the past. The load predictions include the volume of traffic as well as the type of applications and the potential data rates achievable to the Wi-Fi client devices 16 from the different nodes. This data is also used to infer the span of the network, i.e., to characterize the range of locations (identified by a vector of signal strengths to the network nodes) from which Wi-Fi client devices 16 require service. Identifying the span and boundary of the Wi-Fi network allows the optimization 70 of the operational parameters such as the transmit power, set of supported data rates, etc. The data is also used to identify redundant nodes in the network, nodes in the network that are poorly positioned, as well as cases where additional nodes are required to serve the load adequately.

Interference from out of the network is measured or inferred and collected as a time-series from all the nodes, on all channels. Both aggregate interference levels as well as interference from particular interfering access points 14 is tracked. The time-series data is segmented in time to determine periods with similar characteristics. Trend, seasonality, and autoregressive characteristics are extracted and used to predict the distribution of interference levels over future time periods ranging from several minutes to several hours or days. The interference data reported across nodes at a location is used to determine the correlation in the interference detected by different nodes in the location. Based on a correlation matrix, interference forecasts at a node can be improved by predictors that weight and combine measurements across all nodes.

Depending on the matrix of signal strengths between nodes and their associated clients, transmit activity of a neighboring node and receive activity from neighboring clients can have varying impact on the performance at a node. Time-series data is collected both on the transmit and receive activity as well as performance (packet error rate, queue utilization, capacity, queue lengths, packet delay, channel business, etc.). At any given time, the performance of a node is affected by the combined activity across all neighboring nodes and Wi-Fi client devices 16. However, over time, the naturally varying activity levels allow the inference of the functions that govern the relationship between the activity of each neighboring node and different performance characteristics of a node. For instance, correlating packet errors and lost acknowledgments with the activity of a neighboring node or its clients allow the detection of hidden nodes. Similarly, relationships affecting packet delay, jitter, capacity, channel busyness each can be determined, thus building a relationship graph where edges between nodes are parameterized by weights or functions that determine the impact of activity at a node on performance at another.

The time series data collected on the vector of signal strengths between a client and all the nodes in the network enables the extraction of node trajectories, i.e., predicting future locations (in the space of signal strengths) of a node based on the trajectory in the recent past. This data is used to predict likely candidates for handoff in the near future. The trajectories of Wi-Fi client devices 16 are also used to classify clients based on their mobility characteristics, distinguishing for example between stationary, nomadic, mobile, and highly mobile clients. This classification is used to inform the choice of the frequency band as well as a serving node for the Wi-Fi client device 16.

Data collected from Wi-Fi client devices 16 is also used to characterize and profile different clients and classify them into groups with similar characteristics. Data recorded on the signal strength measured from a client as well as MCS rates used by the client and MCS rates used by the node along with packet error rate information is used to infer and calibrate the relationship between signal strength and potential capacity between a client and node. Recorded data on the association and probe requests and handover of clients along with signal strength information between the client and the serving as well as non-serving access points 14 is used to classify the roaming, access point selection, and association behavior of client devices.

In addition, the data that has been transferred to the cloud 12 by the nodes can be analyzed to search for anomalous behavior or bugs. These bugs might be associated with the operation of the distributed Wi-Fi system 10, or they might be associated with the behavior of particular Wi-Fi client devices 16. Bugs or anomalous behaviors which are found can be associated with a particular type of client by examining the Media Access Control (MAC) address of the Wi-Fi client device 16 with the behavior. A mapping from MAC address to device type can be used to understand which device types are having which problems. By gathering statistics regarding behavior over a large number of networks, an extensive database of Wi-Fi client device 16 behaviors with accurate statistical prevalence can be formed.

The estimation and learning process 1400 can allow the optimization 70 to be performed based on the determined forecasts, predictions, trends, and/or interference (step 1404). All of the analyses described above can be accomplished using well-known machine learning algorithms and techniques. For example, the search for anomalous behavior can be done using various clustering algorithms, such as k-means, outlier detection, or multivariate normal distributions. This learning can be unsupervised (anomalous behavior is not known, looking for anything "out of the ordinary"), or supervised (correct and incorrect behaviors are known).

Visualization of a Home Network

Again, Wi-Fi networks, or other similar wireless technologies, have become ubiquitous. People use them in their homes, at work, and in public spaces such as schools, cafes, even parks. Wi-Fi provides a great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. A proven solution to address performance in wireless networks is to provide more radios in a more tightly packed space to increase the spectral density and Radio Frequency (RF) power of the radio signal between sending and receiving devices. Monitoring a wireless network in the home is difficult because the environment is often dynamic and the technical understanding of the user may be limited. Therefore, various mechanisms of data visualization and network troubleshooting are implemented to improve the usability of the distributed Wi-Fi system 10. This information can be provided to the user through a web Graphical User Interface (GUI) or mobile GUI format, such as part of a mobile application operating on the user device 22.

Figure 44:
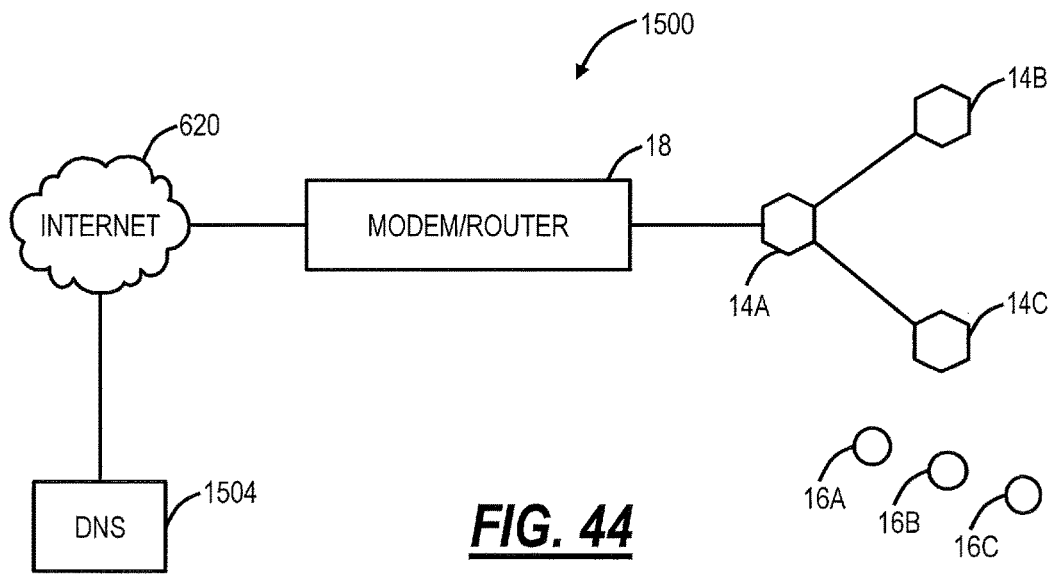
FIG. 44 is a network diagram of a Wi-Fi network for home use.

Referring to FIG. 44, in an exemplary embodiment, a network diagram illustrates a Wi-Fi network 1500 for home use. The Wi-Fi network 1500 can be the distributed Wi-Fi system 10 or the like. The Wi-Fi network 1500 typically includes a gateway node 14A which connects to the Internet 620 and services such as a Domain Name System (DNS) 1504, one or more nodes 14B, 14C which connect to the gateway node 14A for access to the Internet 620 and which provide services to Wi-Fi client devices 16, one or more Wi-Fi client devices 16A, 16B, 16C which are end devices that consume and generate data, and users which are operators of the Wi-Fi client devices 16. The users may be human or machines.

The gateway node 14A is the same as the nodes 14B, 14C with an additional connection to the Internet 620 via the modem/gateway 18. Additionally, the gateway node 14A can manage the interface between the Wi-Fi network 1500 and the Internet 620. The nodes 14A, 14B, 14C are used to form the core of the Wi-Fi network 1500 and operate in a relay function to pass data between Wi-Fi client devices 16 and other nodes 14, or from nodes 14 to other nodes 14, or from other nodes 14 to the gateway node 14A. The Wi-Fi client devices 16 connect to the nodes 14 to gain access to the Wi-Fi network 1500. The Wi-Fi client devices 16 run applications and are the producers and consumers of data on the Wi-Fi network 1500. They are end connections in the Wi-Fi network 1500. The users are machines or humans controlling the Wi-Fi client devices 16 in the Wi-Fi network 1500. An example of a user is a person using a cell phone (Wi-Fi client device 16) to access a web page or use a mobile app.

The visualization of the different components of the Wi-Fi network 1500 is important to help the administrator or owner monitoring the Wi-Fi network 1500 to consume large amounts of data visually to quickly understand the status, performance, and operation of the Wi-Fi network 1500. Accordingly, systems and methods are described herein for displaying the Wi-Fi network 1500 for visualization and troubleshooting.

Figure 45:
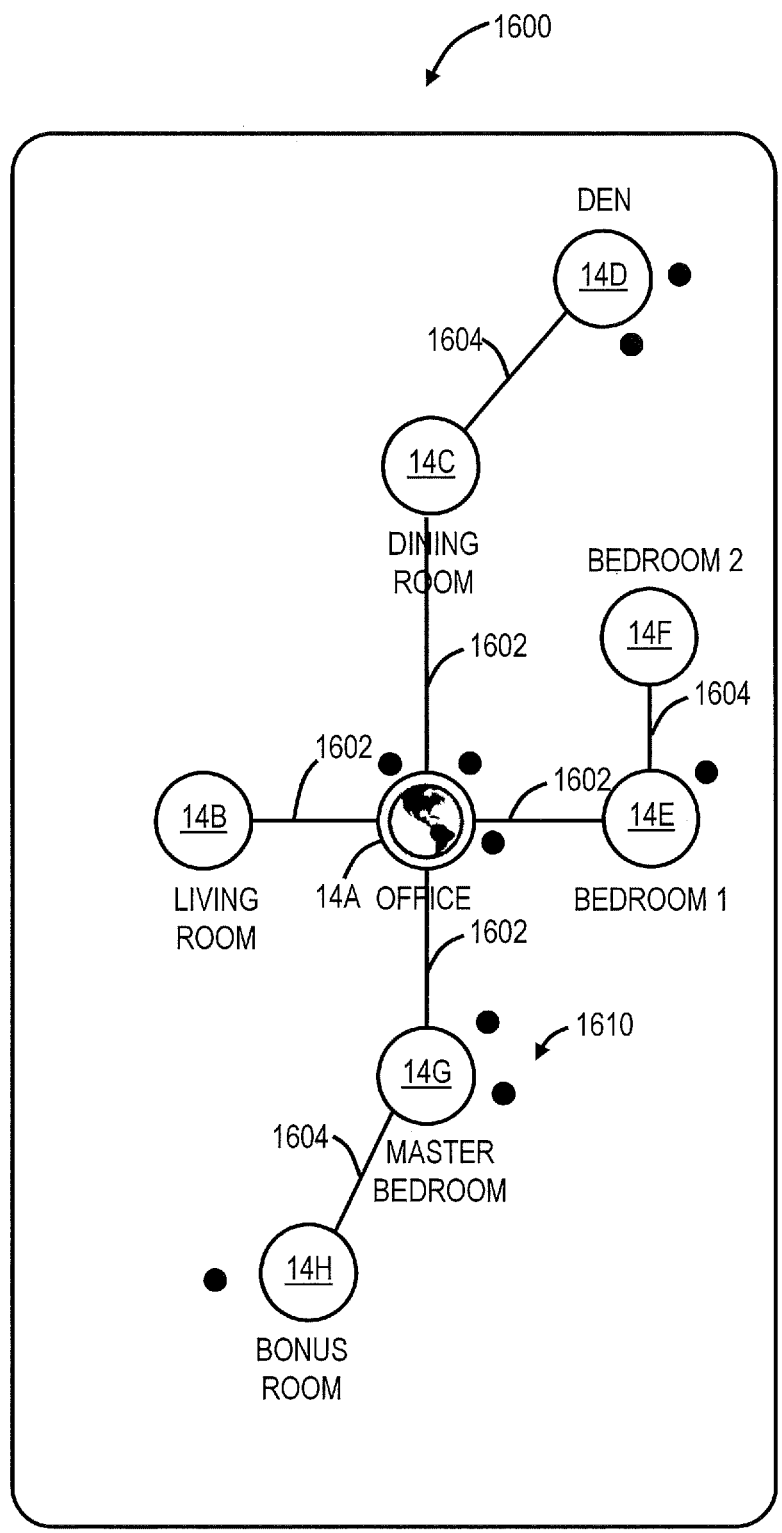
FIG. 45 is a screen shot of a Graphical User Interface (GUI) associated with a mobile application or webpage for visualizing and troubleshooting the Wi-Fi network of FIG. 44.

Referring to FIG. 45, in an exemplary embodiment, a screen shot illustrates a GUI 1600 associated with a mobile application or web page for visualizing and troubleshooting the Wi-Fi network 1500. The systems and methods described herein can be realized through a mobile application operating on the user device 22. Also, the systems and methods can be realized through a web page, e.g., HTML, accessible through any web browser. The GUI 1600 provides a visualization of the Wi-Fi network 1500, such as the distributed Wi-Fi system 10.

In the GUI 1600, the Wi-Fi network 1500 can be presented visually by centering the Wi-Fi network 1500 around the gateway node 14A. The gateway node 14A is the sink and the source of almost all data since it is managing the connection with the Internet 620. In the GUI 1600, the gateway node 14A can be shown as a circle or other shape to denote an entity in the Wi-Fi network 1500. Typically, an icon in the shape of the earth or a globe with Internet connections encircling the globe can be used to denote the function of the gateway node 14A as the source and sink of all Internet-connected data. That is, there is some designation in the GUI 1600 to set it apart from the other nodes. A network may have one or more the gateway nodes 14A.

Optionally, one or more nodes 14B-14H are connected to the gateway node 14A to form the Wi-Fi network 1500. The connection between the gateway node 14A and adjacent nodes 14B, 14C, 14E, 14G are denoted by a connector 1602. The connector 1602 is typically a line of varying colors, opacity, length and continuity. The connector 1602 signifies a data connection between the gateway node 14A and the adjacent nodes 14B, 14C, 14E, 14G. A node may also have connectors 1604 to other nodes to extend the network. Similarly, the connector 1604 can have varying colors, opacity, length and continuity as the connector 1602. Specifically, the varying colors, opacity, length and continuity can designate visually operational aspects of the connectors 1602, 1604, such as data rate, load, channel, bandwidth, signal strength, etc.

A connector may also exist between two otherwise disjoint Wi-Fi networks (not shown in FIG. 45). A connector between networks is used to logically connect two physically or logically separate Wi-Fi networks with a path for data transferring between locations. A node 14 may have one or more connectors 1602, 1604 to another gateway node 14A or node 14.

In the GUI 1600, the data visualization of the gateway node 14A and the nodes 14B-14H can have the following characteristics. The icon shape and illustration can denote the node type. For example, the gateway node 14A may be shown as an icon denoting a connection to the Internet 620, whereas the nodes 14B-14H may be shown to support internal connections only. The color of the icons can denote status. For example, a red color can denote a problem, whereas a white or green color denotes a well-performing node or gateway.

The opacity of the icon can denote the activity of the node or gateway in the transmission of data on the Wi-Fi network 1500. If a gateway or node is missing, it can be shown as an outline of the original icon with different colors to show its status as missing (e.g., disconnected, loss of power, equipment fault, etc.). The size of the icon can be shown as larger or smaller based on the activity of data transmission or the number of other Wi-Fi client devices 16 or nodes 14 connected.

The name or nickname of the gateway or node can be shown in text form. The name may be determined by the administrator or owner of the Wi-Fi network or deducted through examination of the connected Wi-Fi client devices 16. For example, a node with the connection of Wi-Fi client devices 16 representing typical clients for a living room can be named "living room" to denote the space the gateway or node is located.

The connectors 1602, 1604 can be shown with different attributes to convey status, such as the length of the connector 1602, 1604; color, opacity, shape and thickness of the connector 1602, 1604; and animation of the connector 1602, 1604. The length of the connector 1602, 1604 can convey a physical distance between gateway or node, or a logical distance as measured by the signal levels on each end of the connector 1602, 1604. The color, opacity, shape and thickness of the connector 1602, 1604 can denote the strength of the connection. The animation of the connector 1602, 1604 can include an animation of data being sent on the connector 1602, 1604 represented by a bulge or pulse to show activity.

The Wi-Fi client devices 16 have an association with one node or gateway. A Wi-Fi client device 16 may move connections between nodes or gateway in the same Wi-Fi network based on the availability of different possible connections and the performance of the connections, such as based on the optimization 70 or other operating conditions.

A Wi-Fi client device 16 connection to the nodes or gateway can be visualized as an object 1610 orbiting around a larger object (i.e., the icon for the nodes 14), similar to a moon orbiting a planet. The orbiting object is the Wi-Fi client device 16, and the planet is the gateway or node.

The Wi-Fi client device 16 and node/gateway relationship can be visualized with the following attributes. The color of the clients can be used to convey status or type of the Wi-Fi client device 16. The orbit shape of the object 1610 around the node or gateway can denote activity or type of application traffic being consumed or generated. The size of the object 1610 can convey the capability or activity of the Wi-Fi client device 16. The distance of the object 1610 to the node or gateway can denote the strength or quality of the connection. The speed of the orbit of the object 1610 can show activity or speed. The opacity of the object 1610 can show the activity or time connected to the node or gateway. Wi-Fi client devices 16 belonging as a guest of the network may be shown as a different icon, color, opacity, orbit or another identifiable characteristic to extinguish the guest client from a home client. A user of the Wi-Fi network 1500 can own several Wi-Fi client devices 16; therefore, a client connected to the Wi-Fi network 1500 may be represented as an icon representing the user instead of the client icon.

The icons, the connectors 1602, 1604, and the objects 1610 can have one or more visual indicators associated therewith in the visualization. As described herein, different icon, color, shapes, sizes, opacity, orbit or another identifiable characteristics can be used to convey notifications associated with operation of the Wi-Fi network 1500 to the user. Additionally, other notifications are also contemplated such as specific alarms or notifications (e.g., Internet connectivity lost, guest access request, DNS problems, etc.), numerical information (e.g., bandwidth, number of clients connected/disconnected, throughput, load), visualizations (e.g., heat maps of coverage, interference, etc.).

Heat Map

A heat map, denoted by gradients of color or opacity around the gateway, nodes, or clients, can be used to denote the performance or potential performance of the devices for a given time. A heat map is a quick way to tell the relative performance of devices in the Wi-Fi network 1500 compared to others. The performance characteristic being compared could be related to signal strength, signal quality, speed, delay, packet loss, jitter, or other similar statistics.

A heat map of outside interference can also be visualized. Interference for wireless networks is a common occurrence, especially for unlicensed wireless networks like the Wi-Fi network 1500. The duration and intensity of wireless interference can be visualized in the form of a heat map or discrete numbers to inform the administrator of the amount of interference on the Wi-Fi network 1500. A node, gateway, or client suffering from interference can be illustrated by a higher gradient of color, for example. Devices with a lower level of interference can be illustrated with a lesser density of gradient.

Areas with Poor Performance

When a section of the Wi-Fi network 1500 has poor performance, it can be visualized through an illustration showing a void or contrasting color of the affected area of the Wi-Fi network 1500. The affected area of the Wi-Fi network 1500 can be related to a physical location in space or a logical location. The affected area may be related to poor relative performance in signal strength, signal quality, speed, delay, packet loss, jitter or other similar statistics.

Time Scale

The visualization of data for the gateways, nodes, clients, and users is a dynamic environment, changing with the activity of the network. The changes in the Wi-Fi network 1500 can be recorded and replayed based on a defined time limit or on an event basis. When a time limit is defined with a start and stop time, the Wi-Fi network 1500 changes can be visually shown with different playback speeds. Similarly, events or major changes in the Wi-Fi network 1500 can be isolated and replayed for the user or administrator to visualize changes and activity of the network.

Recovery from Internet Connection Failure with Redundant Connections

The user device 22 such as cellular phones and other similar clients have multiple communication interfaces, such as Wi-Fi and cellular. Each interface is capable of supporting an Internet connection simultaneously; however, client operating systems (OS) typically prefer one connection over the other because of cost, power, performance. or other similar reasons. In Wi-Fi networks, a connection to Wi-Fi does not necessarily mean a connection to the Internet 620. In many cases, a cellular phone OS is not equipped with the tools to disconnect a Wi-Fi connection in the case of an upstream Internet failure, leaving the Wi-Fi client device 16 unable to connect to the Internet 620 while connected successfully to the Wi-Fi network 1500. In the case of a network with monitoring control of the gateway, an Internet outage is monitored.

A detected Internet outage in the Wi-Fi network 1500 can result in the following actions. First, disconnect any Wi-Fi client devices 16 believed also to have an alternate data connection capable of accessing the Internet 620. This disconnection results in the cellular client to establish a connection to the Internet 620 through the cellular interface. Second, a push notification can be sent to the Wi-Fi client device 16 or the user device 22 operating the mobile application to monitor the Wi-Fi network 1500 informing of the Internet outage. The push notification is received since the Wi-Fi client device 16 has been connected to the cellular connection for Internet connectivity.

Alternatively, in the case of a network gateway Internet outage, a client or node device with the capability of supporting simultaneous interface Internet connections can change operation to act as a gateway to the Wi-Fi network 1500. As such, the client or node will provide gateway functions to other nodes and clients in the Wi-Fi network 1500. The Internet connectivity will be established and shared by the newly formed gateway to provide Internet access to the Wi-Fi network 1500 in a redundant fashion. In essence, this is a gateway failover mechanism.

Fault Isolation and Segmentation

Faults in the Wi-Fi network 1500 can be measured through many monitoring points. The following items may be monitored and reported to the administrator or user, such as through the GUI 1600, the mobile application, push notifications, etc. For example, speed and delay of the broadband ISP connection can be provided. If the speed is slow or the delay is long, it results in poor performance to the end clients and users. The DNS information can be provided. The DNS information used to translate Uniform Resource Locators (URLs) to Internet Protocol (IP) addresses for communications on the Internet 620. If the DNS is not operating correctly, the end user cannot use most Internet services. If an identified DNS is not operating, the address of the DNS server may be switch autonomously by the system to a known good DNS for processing of URL to IP address translations. This is a DNS failover mechanism.

The modem/gateway 18 in the Wi-Fi network 1500 is responsible for segmenting the Internet connection from the home network connection. If the modem/gateway 18 is unresponsive or fails to maintain a connection to the Internet 620, the action is required to recover the modem service. An Internet outage, which is denoted by the lack of ability to talk to websites or other content on the Internet 620, can be detection from monitoring inside the Wi-Fi network 1500 by checking connectivity to a well-known outside Internet address.

Throughput, delay, and packet loss are the cornerstone measurement parameters to determine if the correct amount of performance is being delivered to different nodes or clients. A home networking system should have the capability to measure each Key Performance Indicator (KPI), and in case the that the relative or absolute performance is below standard action can be taken to troubleshoot the problem.

The failure of a Client to connect to the Wi-Fi network 1500 because of invalid authentication credentials may be the sign of a security attack. A notification to the administrator of the failed attack and a blocking of access by the affected client can be implemented to help prevent unwanted access.

Guest Access

Figure 46:
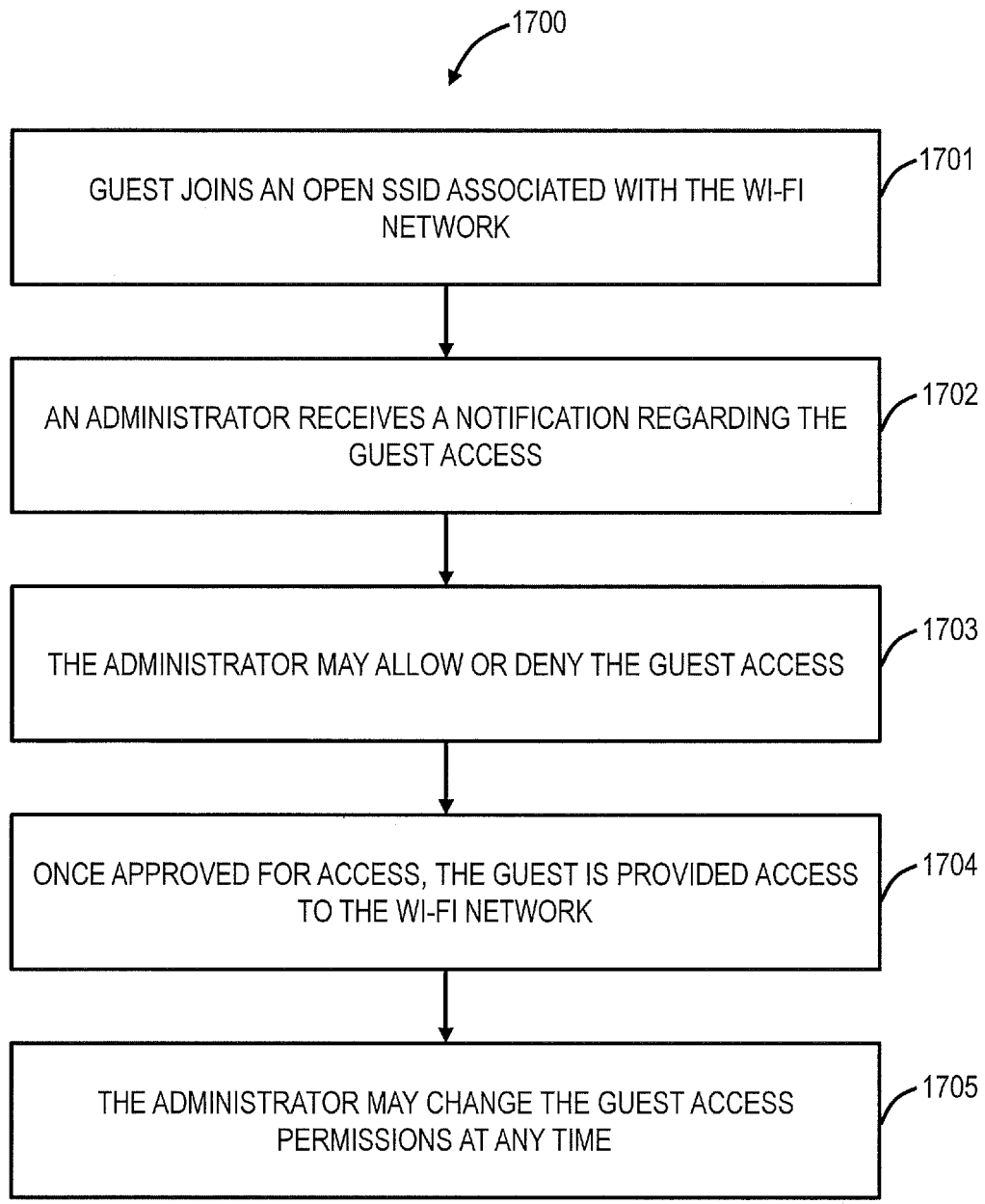
FIG. 46 is a flowchart of a guest access process for the Wi-Fi network of FIG. 44.

Referring to FIG. 46, in an exemplary embodiment, a flowchart illustrates a guest access process 1700 for the Wi-Fi network 1500. A guest may access the Wi-Fi network 1500 with the required permissions, which are provided by the owner or administrator of the Wi-Fi network 1500. For guest access, the Wi-Fi network 1500 can include an open Service Set Identifier (SSID), and a guest can join the open SSID (step 1701). The client device can inform the guest that they are a guest trying to access the Wi-Fi network 1500, such as via a web page. A request to access the Wi-Fi network 1500 is sent to an administrator. If desired or required, the requesting guest can add details about the request, including the guest's name and requirements for accessing the Wi-Fi network 1500.

The administrator receives a notification regarding the guest access (step 1702). The notification can be through the mobile application, text, email, or other mechanisms. The details about the guest can also be shown including the client type and hostname of the client. Additionally, any user added details could be displayed to the administrator. The administrator may allow or deny access to the Wi-Fi network 1500 based on the information provided (step 1703). If allowed, the administrator can set time limits and also limit the ability of the guest to access other clients on the Wi-Fi network 1500. Additionally, the administrator can limit the applications to be run by the client.

Once approved for access, the guest client device will gain access to the Wi-Fi network 1500 (step 1704). The client device will display an option to make the connection secure by way of installation of a certificate to the guest client device. If accepted, the certificate will install, and the guest client device will be re-connected to the same SSID with a secure, encrypted connection. At any time, the administrator may change the permissions or block access to the guest client device (step 1705).

Administrator-Initiated Access

Figure 47:
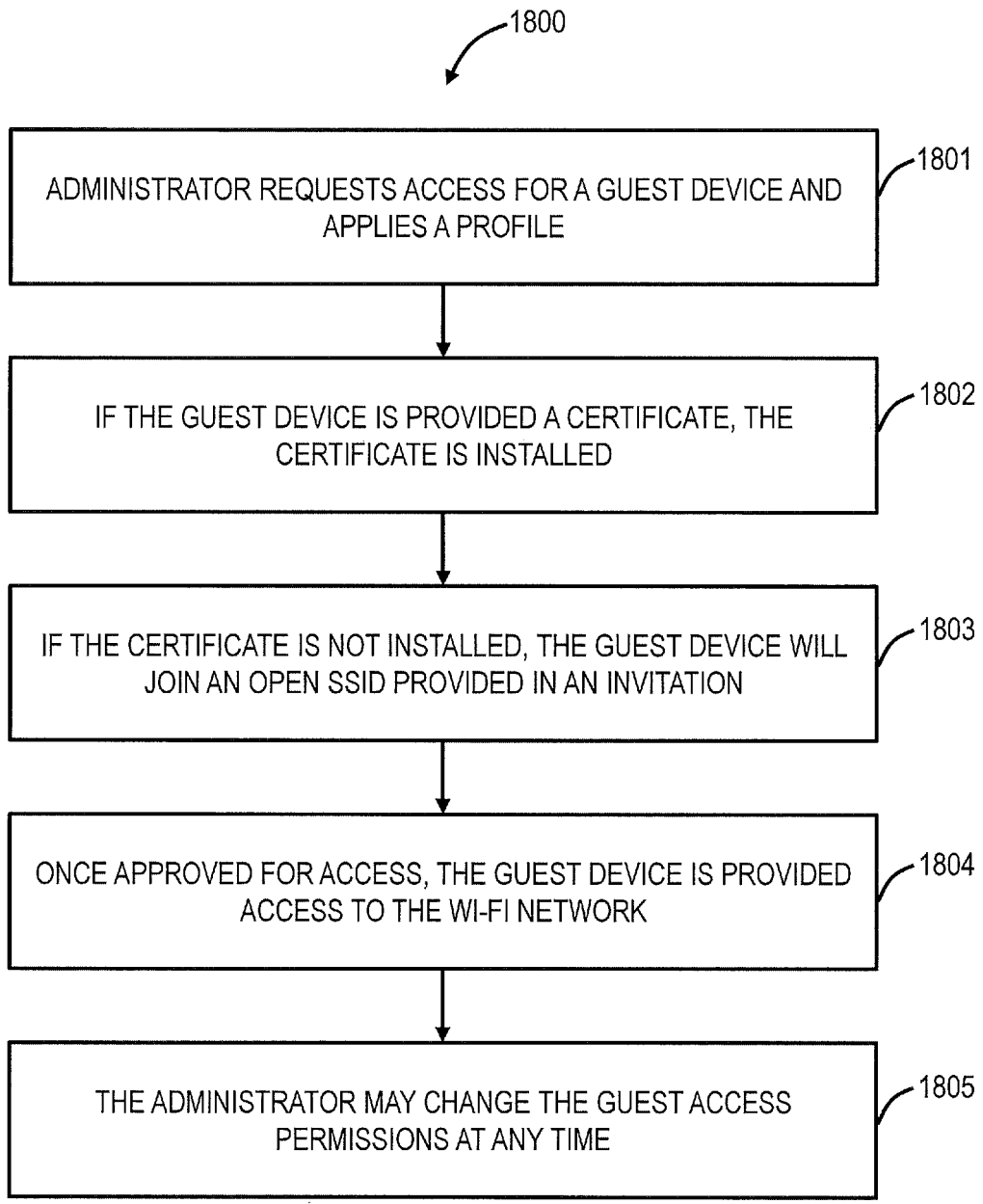
FIG. 47 is a flowchart of an administrator initiated guest access process for the Wi-Fi network of FIG. 44.

Referring to FIG. 47, in an exemplary embodiment, a flowchart illustrates an administrator initiated guest access process 1800 for the Wi-Fi network 1500. Also, the administrator may also invite a guest to access the Wi-Fi network 1500 by sending a text, email, in-app message or other similar communication technique. The administrator will request access for a guest device and apply a profile for the guest (step 1801). The profile provides information about the number of guest clients allowed, time limits, levels of access to other clients, bandwidth limits and speeds, requirements for encryption, allowed applications and other similar network access limitations. The invitation for the guest is sent to the user with either an URL link, a username, and password, or a certificate for access.

If the guest is sent a certificate, the certificate is installed on the client device (step 1802). When the client device is within the range of the Wi-Fi network 1500, the client device will securely join the Wi-Fi network 1500 with the credentials embedded in the certificate. If a certificate is not installed on the guest client device, the guest will join an open SSID provided in the invitation sent to the client device (step 1803). The guest client can then display the option to connect with the username/password or simply visit the URL provided in the invitation for access. A visit to the unique URL provided in the invitation is used as a "ticket" for entry to the network.

Once approved for access, the guest client device will gain access to the Wi-Fi network 1500 (step 1804). The client device will display an option to make the connection secure by way of installation of a certificate to the guest client device. If accepted, the certificate will install, and the guest client device will be re-connected to the same SSID with a secure, encrypted connection. At any time, the administrator may change the permissions or block access to the guest client device (step 1805). As an optional method, the administrator can send a text message, email, in-app invitation, or another such mechanism to share the SSID and Pre-Shared Key (PSK) of a guest network. With such an invitation, the guest can simply join the SSID and PSK of the Wi-Fi network 1500.

Authentication Based on Certificate

A certificate may be installed on a client device to gain access to the Wi-Fi network 1500 with varying level of control. The certificate contains authentication requirements to join a Wi-Fi network 1500 and is controlled by a centralized server, such as in the cloud 12 The profile from the certificate provides information about time limits, levels of access to other clients, bandwidth limits and speeds, requirements for encryption and other similar network access limitation. A certificate may be installed on a client device at any time, including during the manufacturing or distribution of the client. When the client is within the range of the target Wi-Fi network 1500, it can automatically connect in a secure fashion and be subjected to the profile administered by a centralized server. The profile may change or be revoked at any time.

A two-step process may be put into place for authentication and claiming by an administrator. In this case, after access to the Wi-Fi network 1500 is achieved with a certificate, the administrator may be required to perform a second step authentication by entering a code that is unique to the client to gain full access the Wi-Fi network 1500.

Adaptive Security

An adaptive firewall setting can be applied to each client in the Wi-Fi network 1500. Some clients require access to many ports and IP addresses to run a myriad of applications, such as a laptop computer or a cell phone. Other devices, such as Internet of Things (IoT) sensors, only need a small and usually fixed port range and IP address connectivity to pass their information to an outside server. The Wi-Fi network 1500 can adaptively change these security settings by limiting the ports and URLs or IP addresses the client is allowed to communicate with through the gateway. These security settings can be learned over time or be applied at the time of the initial connection on a per client connection. If a client is trying to deviate from the prescribed firewall settings, a warning can be sent to the administrator to assess the risk. Additionally, the administrator may change the firewall settings at any time from a centralized server.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method implemented by a cloud-based controller to control a Wi-Fi network comprising a plurality of access points, the method comprising:
obtaining and analyzing measurements received from the Wi-Fi network;

determining a configuration of the Wi-Fi network based on the measurements including the controller determining a topology to be applied to the Wi-Fi network, wherein determining the topology includes selecting an interconnectivity of the plurality of access points to one another via backhaul links that are wireless links, wherein the backhaul links form a tree topology with at least one access point of the plurality of access points being a gateway to the internet and the cloud-based controller via the internet, and selecting links between each of a plurality of client devices and corresponding access points of the plurality of access points; and providing the configuration to the Wi-Fi network for implementation thereof, wherein the configuration includes the determined topology.

2. The method of claim 1, wherein the backhaul links each comprise one or more of a channel and a channel width, and wherein the configuration further comprises determining the one or more of the channel and the channel width for each backhaul link based on the measurement.

3. The method of claim 1, wherein the selectively interconnected comprises at least two access points having no direct connection to one another and at least two backhaul links having different operating parameters comprising one or more of a channel, and a channel width.

4. The method of claim 1, wherein the determining the configuration is based on an optimization performed by the cloud-based controller.

5. The method of claim 1, further comprising:
obtaining additional measurements from a plurality of Wi-Fi networks;
performing analysis or learning on the measurements and the additional measurements; and
utilizing the analysis or learning for the determining.

6. The method of claim 1, further comprising:
initially configuring the plurality of access points through an onboarding process through the cloud-based controller, wherein the onboarding process utilizes in part a second network connection separate from the Wi-Fi network to the cloud-based controller.

7. The method of claim 1, further comprising:
providing a visualization of the topology of the Wi-Fi network to convey associated operational conditions via one or more of a webpage and a mobile application.

8. A cloud-based controller configured to control a Wi-Fi network comprising a plurality of access points, the cloud-based controller comprising:
a network interface communicatively coupled to the Wi-Fi network;
one or more processors communicatively coupled to the network interface; and
memory storing instructions that, when executed, cause the one or more processors to:
obtain and analyze measurements received from the Wi-Fi network;
determine a configuration of the Wi-Fi network based on the measurements-including the controller determining a topology to be applied to the Wi-Fi network, wherein determining the topology includes
selecting an interconnectivity of the plurality of access points to one another via backhaul links that are wireless links, wherein the backhaul links form a tree topology with at least one access point of the plurality of access points being a gateway to the internet and the cloud-based controller via the internet, and
selecting links between each of a plurality of client devices and corresponding access points of the plurality of access points; and
provide the configuration to the Wi-Fi network for implementation thereof, wherein the configuration includes the determined topology.

9. The cloud-based controller of claim 8, wherein the backhaul links each comprise one or more of a channel, a channel width, and a bandwidth, and wherein the configuration further comprises determining the one or more of a channel, a channel width, and a bandwidth for each backhaul link based on the measurements.

10. The cloud-based controller of claim 8, wherein the selectively interconnected comprises at least two access points having no direct connection to one another and at least two backhaul links having different operating parameters comprising one or more of a channel, a channel width, and a bandwidth.

11. The cloud-based controller of claim 8, wherein the configuration is determined based on an optimization performed by the cloud-based controller.

12. The cloud-based controller of claim 8, wherein the memory storing instructions that, when executed, further cause the one or more processors to:
obtaining additional measurements from a plurality of Wi-Fi networks;
performing analysis or learning on the measurements and the additional measurements; and
utilizing the analysis or learning for the determining.

13. The cloud-based controller of claim 8, wherein the memory storing instructions that, when executed, further cause the one or more processors to:
initially configure the plurality of access points through an onboarding process through the cloud-based controller, wherein the onboarding process utilizes in part a second network connection separate from the Wi-Fi network to the cloud-based controller.

14. The cloud-based controller of claim 8, wherein the memory storing instructions that, when executed, further cause the one or more processors to:
provide a visualization of the topology of the Wi-Fi network to convey associated operational conditions via one or more of a webpage and a mobile application.

15. A Wi-Fi network controlled by a cloud-based controller, the Wi-Fi network comprising:
a plurality of access points comprising at least one gateway node connected to a modem/router and one or more Wi-Fi nodes connected to the modem/router through the at least one gateway node, wherein each of the plurality of access points comprise a processor and memory storing instructions that, when executed, cause the processor to:
perform measurements from the Wi-Fi network;
provide the measurements to the cloud-based controller; and
receive and implement operational parameters from the cloud-based controller based on the measurements, the operational parameters including
a topology to be applied to the Wi-Fi network, and
an interconnectivity of the plurality of access points,
wherein the cloud-based controller determines a configuration of the Wi-Fi network based on the measurements including the cloud-based controller determining the topology to be applied to the Wi-Fi network, wherein determining the topology includes selecting the interconnectivity of the plurality of access points to one another via backhaul links that are wireless links, wherein the backhaul links form a tree topology with at least one access point of the plurality of access points being a gateway to the internet and the cloud-based controller via the internet, and selecting links between each of a plurality of client devices and corresponding access points of the plurality of access points, the cloud-based controller provides the configuration to the wi-fi network for implementation thereof, wherein the configuration includes the determined topology.

16. The Wi-Fi network of claim 15, wherein the backhaul links each comprise one or more of a channel, a channel width, and a bandwidth, and wherein the configuration further comprises determining the one or more of a channel, a channel width, and a bandwidth for each backhaul link based on the measurements.

17. The Wi-Fi network of claim 15, wherein the selectively interconnected comprises at least two access points having no direct connection to one another and at least two backhaul links having different operating parameters comprising one or more of a channel, a channel width, and a bandwidth.

18. The Wi-Fi network of claim 15, wherein the configuration is determined based on an optimization performed by the cloud-based controller.

19. The Wi-Fi network of claim 15, wherein the plurality of access points are initialed configured through an onboarding process through the cloud-based controller, wherein the onboarding process utilizes in part a second network connection separate from the Wi-Fi network to the cloud-based controller.

20. The Wi-Fi network of claim 15, wherein a visualization of the topology of the Wi-Fi network is provided to convey associated operational conditions via one or more of a webpage and a mobile application.

* * * * *